(12) United States Patent
Nielsen et al.

(10) Patent No.: US 9,185,176 B2
(45) Date of Patent: Nov. 10, 2015

(54) METHODS AND APPARATUS FOR MANAGING LOCATE AND/OR MARKING OPERATIONS

(75) Inventors: Steven Nielsen, North Palm Beach, FL (US); Curtis Chambers, Palm Beach Gardens, FL (US); Jeffrey Farr, Jupiter, FL (US)

(73) Assignee: CertusView Technologies, LLC, Palm Beach Gardens, FL (US)

(*) Notice: Subject to any disclaimer, the term of this patent is extended or adjusted under 35 U.S.C. 154(b) by 421 days.

(21) Appl. No.: 12/833,121

(22) Filed: Jul. 9, 2010

(65) Prior Publication Data

US 2010/0318402 A1 Dec. 16, 2010

Related U.S. Application Data

(63) Continuation of application No. 12/704,485, filed on Feb. 11, 2010, now Pat. No. 8,731,999.

(60) Provisional application No. 61/151,826, filed on Feb. 11, 2009.

(30) Foreign Application Priority Data

Feb. 10, 2010 (CA) ..................................... 2691780

(51) Int. Cl.
*G06Q 10/10* (2012.01)
*G06Q 50/16* (2012.01)
(Continued)

(52) U.S. Cl.
CPC ............... *H04L 67/24* (2013.01); *G06Q 10/06* (2013.01); *G06Q 10/063* (2013.01); *G06Q 10/06311* (2013.01); *G06Q 10/06393* (2013.01); *G06Q 10/06395* (2013.01); *G06Q 10/1097* (2013.01); *G06Q 50/10* (2013.01); *G06Q 50/165* (2013.01); *G01C 15/00* (2013.01)

(58) Field of Classification Search
CPC .. G01C 15/00; G01C 15/02; G06Q 10/06393; G06Q 10/0639; G06Q 10/06395; G06Q 50/165; G01V 15/00; G01V 3/08; G01V 3/083; G01V 3/12
See application file for complete search history.

(56) References Cited

U.S. PATENT DOCUMENTS 3,871,557 A 3/1975 Smrt
3,972,038 A 7/1976 Fletcher et al.
(Continued)

FOREIGN PATENT DOCUMENTS

CA 2386200 4/2000
CA 2435290 8/2002
(Continued)

OTHER PUBLICATIONS

CGA 3.0, "Common Ground Alliance, Best Practices Version 3.0," Mar. 2006, 100 pages.*

(Continued)

*Primary Examiner* — Ivan R Goldberg

(57) ABSTRACT

First ticket information describing a locate operation to be performed is electronically received, including image information and/or geospatial metadata relating to a dig area and/or a work site. Field information relating to the locate operation as at least partially performed and/or environmental information relating to the dig area and/or the work site is electronically received and processed to provide a quality assessment of the locate operation.

73 Claims, 13 Drawing Sheets

(51) Int. Cl.
*G01C 15/00* (2006.01)
*H04L 29/08* (2006.01)
*G06Q 10/06* (2012.01)
*G06Q 50/10* (2012.01)

(56) References Cited

U.S. PATENT DOCUMENTS

| | | | |
|---|---|---|---|
| 3,974,491 A | 8/1976 | Sipe | |
| 4,208,653 A | 6/1980 | Abe | |
| 4,251,813 A | 2/1981 | Carre | |
| 4,258,320 A | 3/1981 | Schonstedt | |
| 4,387,340 A | 6/1983 | Peterman | |
| 4,388,592 A | 6/1983 | Schonstedt | |
| 4,455,509 A | 6/1984 | Crum et al. | |
| 4,520,317 A | 5/1985 | Peterman | |
| 4,536,710 A | 8/1985 | Dunham | |
| 4,539,522 A | 9/1985 | Schonstedt | |
| 4,550,376 A | 10/1985 | Maciejczak | |
| 4,590,425 A | 5/1986 | Schonstedt | |
| 4,623,282 A | 11/1986 | Allen | |
| 4,638,289 A | 1/1987 | Zottnik | |
| 4,639,674 A | 1/1987 | Rippingale | |
| 4,712,094 A | 12/1987 | Bolson, Sr. | |
| 4,747,207 A | 5/1988 | Schonstedt et al. | |
| 4,803,773 A | 2/1989 | Schonstedt | |
| 4,818,944 A | 4/1989 | Rippingale | |
| 4,819,162 A | 4/1989 | Webb, Jr. et al. | |
| 4,839,623 A | 6/1989 | Schonstedt et al. | |
| 4,839,624 A | 6/1989 | Schonstedt | |
| 4,873,533 A | 10/1989 | Oike | |
| 4,899,293 A | 2/1990 | Dawson et al. | |
| 4,943,238 A | 7/1990 | Gregorio | |
| 4,970,683 A | 11/1990 | Harshaw et al. | |
| 4,972,319 A | 11/1990 | Delorme | |
| 4,984,279 A | 1/1991 | Kidney et al. | |
| 4,987,412 A | 1/1991 | Vaitekunas et al. | |
| 5,001,430 A | 3/1991 | Peterman et al. | |
| 5,006,806 A | 4/1991 | Rippingale et al. | |
| 5,014,008 A | 5/1991 | Flowerdew | |
| 5,017,873 A | 5/1991 | Rippingale et al. | |
| 5,025,150 A | 6/1991 | Oldham et al. | |
| 5,032,989 A | 7/1991 | Tornetta | |
| 5,043,666 A | 8/1991 | Tavernetti et al. | |
| 5,045,368 A | 9/1991 | Cosman et al. | |
| 5,065,098 A | 11/1991 | Salsman et al. | |
| 5,074,244 A | 12/1991 | Byers | |
| 5,093,622 A | 3/1992 | Balkman | |
| 5,097,211 A | 3/1992 | Schonstedt | |
| 5,103,920 A * | 4/1992 | Patton | 175/45 |
| 5,114,517 A | 5/1992 | Rippingale et al. | |
| 5,122,750 A | 6/1992 | Rippingale et al. | |
| 5,122,959 A | 6/1992 | Nathanson et al. | |
| 5,136,245 A | 8/1992 | Schonstedt | |
| 5,138,761 A | 8/1992 | Schonstedt | |
| 5,150,295 A | 9/1992 | Mattingly | |
| 5,164,607 A | 11/1992 | Weigert et al. | |
| 5,173,139 A | 12/1992 | Rippingale et al. | |
| 5,206,065 A | 4/1993 | Rippingale et al. | |
| 5,214,757 A | 5/1993 | Mauney et al. | |
| 5,231,355 A | 7/1993 | Rider et al. | |
| 5,239,290 A | 8/1993 | Schonstedt | |
| 5,260,659 A | 11/1993 | Flowerdew et al. | |
| 5,264,795 A | 11/1993 | Rider | |
| 5,267,147 A | 11/1993 | Harshaw et al. | |
| 5,276,613 A | 1/1994 | Schlumberger | |
| 5,293,911 A | 3/1994 | Akeel | |
| 5,311,195 A | 5/1994 | Mathis et al. | |
| 5,329,464 A | 7/1994 | Sumic et al. | |
| 5,361,029 A | 11/1994 | Rider et al. | |
| 5,365,163 A | 11/1994 | Satterwhite et al. | |
| 5,373,298 A | 12/1994 | Karouby | |
| 5,399,844 A | 3/1995 | Holland | |
| 5,414,462 A | 5/1995 | Veatch | |
| 5,430,379 A | 7/1995 | Parkinson et al. | |
| 5,444,364 A | 8/1995 | Satterwhite et al. | |
| 5,454,074 A | 9/1995 | Hartel et al. | |
| 5,467,271 A | 11/1995 | Abel et al. | |
| 5,471,143 A | 11/1995 | Doany | |
| 5,486,067 A | 1/1996 | Huynh | |
| 5,487,139 A | 1/1996 | Saylor et al. | |
| 5,517,419 A | 5/1996 | Lanckton et al. | |
| 5,519,329 A | 5/1996 | Satterwhite | |
| 5,519,809 A | 5/1996 | Husseiny et al. | |
| 5,529,432 A | 6/1996 | Huynh et al. | |
| 5,530,357 A | 6/1996 | Cosman et al. | |
| 5,543,931 A | 8/1996 | Lee et al. | |
| 5,568,162 A | 10/1996 | Samsel et al. | |
| 5,576,973 A | 11/1996 | Haddy | |
| 5,596,494 A | 1/1997 | Kuo | |
| 5,621,325 A | 4/1997 | Draper et al. | |
| 5,629,626 A | 5/1997 | Russell et al. | |
| 5,644,237 A | 7/1997 | Eslambolchi et al. | |
| 5,652,717 A | 7/1997 | Miller et al. | |
| 5,699,244 A | 12/1997 | Clark, Jr. et al. | |
| 5,717,922 A | 2/1998 | Hohensee et al. | |
| 5,738,525 A | 4/1998 | Davies | |
| 5,739,785 A | 4/1998 | Allison et al. | |
| 5,742,509 A | 4/1998 | Goldberg et al. | |
| 5,751,289 A | 5/1998 | Myers | |
| 5,764,127 A | 6/1998 | Hore et al. | |
| 5,769,370 A | 6/1998 | Ashjaee | |
| 5,815,411 A | 9/1998 | Ellenby et al. | |
| 5,819,859 A | 10/1998 | Stump et al. | |
| 5,828,219 A | 10/1998 | Hanlon et al. | |
| 5,848,373 A | 12/1998 | DeLorme et al. | |
| 5,864,632 A | 1/1999 | Ogawa et al. | |
| 5,913,201 A | 6/1999 | Kocur | |
| 5,916,300 A | 6/1999 | Kirk et al. | |
| 5,917,325 A | 6/1999 | Smith | |
| 5,918,565 A | 7/1999 | Casas | |
| 5,920,194 A | 7/1999 | Lewis et al. | |
| 5,920,846 A | 7/1999 | Storch et al. | |
| 5,955,667 A | 9/1999 | Fyfe | |
| 5,961,569 A | 10/1999 | Craport et al. | |
| 5,987,380 A | 11/1999 | Backman et al. | |
| 5,992,620 A | 11/1999 | Holtom | |
| 6,024,655 A | 2/2000 | Coffee | |
| 6,026,135 A | 2/2000 | McFee et al. | |
| 6,026,345 A | 2/2000 | Shah et al. | |
| 6,031,454 A | 2/2000 | Lovejoy et al. | |
| 6,032,530 A | 3/2000 | Hock | |
| 6,049,776 A | 4/2000 | Donnelly et al. | |
| 6,061,632 A | 5/2000 | Dreier | |
| 6,061,940 A | 5/2000 | Rice | |
| 6,074,693 A | 6/2000 | Manning | |
| 6,075,481 A | 6/2000 | Eslambolchi et al. | |
| 6,079,114 A | 6/2000 | Toews | |
| 6,101,087 A | 8/2000 | Sutton et al. | |
| 6,107,801 A | 8/2000 | Hopwood et al. | |
| 6,127,827 A | 10/2000 | Lewis | |
| 6,130,539 A | 10/2000 | Polak | |
| 6,138,906 A | 10/2000 | DeMayo | |
| 6,140,798 A | 10/2000 | Krieger | |
| 6,140,819 A | 10/2000 | Peterman et al. | |
| 6,148,262 A | 11/2000 | Fry | |
| 6,154,658 A | 11/2000 | Caci | |
| 6,169,517 B1 | 1/2001 | Eslambolchi et al. | |
| 6,169,958 B1 | 1/2001 | Nagasamy et al. | |
| 6,185,490 B1 | 2/2001 | Ferguson | |
| 6,188,777 B1 | 2/2001 | Darrell et al. | |
| 6,195,922 B1 | 3/2001 | Stump | |
| 6,206,282 B1 | 3/2001 | Hayes, Sr. et al. | |
| 6,217,253 B1 | 4/2001 | Eslambolchi et al. | |
| 6,234,218 B1 | 5/2001 | Boers | |
| 6,246,933 B1 | 6/2001 | Bague | |
| 6,262,720 B1 | 7/2001 | Jeffrey et al. | |
| 6,268,731 B1 | 7/2001 | Hopwood et al. | |
| 6,282,477 B1 | 8/2001 | Gudat et al. | |
| 6,294,022 B1 | 9/2001 | Eslambolchi et al. | |
| 6,297,736 B1 | 10/2001 | Lewis et al. | |
| 6,298,290 B1 | 10/2001 | Abe et al. | |
| 6,299,934 B1 * | 10/2001 | Manning | 427/137 |
| 6,301,533 B1 | 10/2001 | Markow | |
| 6,308,565 B1 | 10/2001 | French et al. | |

(56) References Cited

U.S. PATENT DOCUMENTS

| | | | |
|---|---|---|---|
| 6,320,518 B2 | 11/2001 | Saeki et al. |
| 6,327,533 B1 | 12/2001 | Chou |
| 6,330,503 B1 | 12/2001 | Sharp et al. |
| 6,337,693 B1 | 1/2002 | Roy et al. |
| 6,343,290 B1 | 1/2002 | Cossins et al. |
| 6,353,767 B1 | 3/2002 | Wakeman et al. |
| 6,356,082 B1 | 3/2002 | Alkire et al. |
| 6,360,931 B1 | 3/2002 | Morford |
| 6,362,778 B2 | 3/2002 | Neher |
| 6,363,320 B1 | 3/2002 | Chou |
| 6,375,038 B1 | 4/2002 | Daansen et al. |
| 6,378,220 B1 | 4/2002 | Baioff et al. |
| 6,390,336 B1 | 5/2002 | Orozco |
| 6,397,147 B1 | 5/2002 | Whitehead |
| 6,401,051 B1 | 6/2002 | Merriam |
| 6,407,550 B1 | 6/2002 | Parakulam et al. |
| 6,411,094 B1 | 6/2002 | Gard et al. |
| 6,414,629 B1 | 7/2002 | Curcio |
| 6,421,725 B1 * | 7/2002 | Vermilyea et al. ............ 709/224 |
| 6,426,872 B1 | 7/2002 | Sutton et al. |
| 6,430,496 B1 | 8/2002 | Smith et al. |
| 6,434,258 B2 | 8/2002 | Wiens |
| 6,437,708 B1 | 8/2002 | Brouwer |
| 6,459,266 B1 | 10/2002 | Fling |
| 6,459,988 B1 | 10/2002 | Fan et al. |
| 6,476,708 B1 | 11/2002 | Johnson |
| 6,490,524 B1 | 12/2002 | White et al. |
| 6,493,650 B1 | 12/2002 | Rodgers et al. |
| 6,496,137 B1 | 12/2002 | Johansson |
| 6,501,501 B1 | 12/2002 | Miyazawa |
| 6,512,312 B1 | 1/2003 | Herkenrath et al. |
| 6,526,352 B1 | 2/2003 | Johnson et al. |
| 6,526,443 B1 | 2/2003 | Goldsmith et al. |
| 6,526,526 B1 | 2/2003 | Dong et al. |
| 6,549,011 B2 | 4/2003 | Flatt |
| 6,552,548 B1 | 4/2003 | Lewis et al. |
| 6,557,738 B1 | 5/2003 | Meintzer |
| 6,585,133 B1 | 7/2003 | Brouwer |
| 6,587,851 B1 | 7/2003 | Ditcharo et al. |
| 6,600,420 B2 | 7/2003 | Goff et al. |
| 6,601,017 B1 | 7/2003 | Kennedy et al. |
| 6,606,557 B2 | 8/2003 | Kotzin |
| 6,617,856 B1 | 9/2003 | Royle et al. |
| 6,617,996 B2 | 9/2003 | Johansson et al. |
| 6,629,030 B2 | 9/2003 | Klausner et al. |
| D481,054 S | 10/2003 | Hennig |
| 6,633,163 B2 | 10/2003 | Fling |
| 6,650,293 B1 | 11/2003 | Eslambolchi et al. |
| 6,650,798 B2 | 11/2003 | Russell et al. |
| 6,674,276 B2 | 1/2004 | Wiesemann et al. |
| 6,693,585 B1 | 2/2004 | MacLeod |
| 6,704,644 B1 | 3/2004 | Kobayashi et al. |
| 6,710,741 B2 | 3/2004 | Tucker |
| 6,717,392 B2 | 4/2004 | Pearson |
| 6,723,375 B2 | 4/2004 | Zeck et al. |
| 6,728,662 B2 | 4/2004 | Frost et al. |
| 6,735,293 B2 | 5/2004 | Doherty et al. |
| 6,750,816 B1 | 6/2004 | Kunysz |
| 6,751,341 B2 | 6/2004 | Oosawa |
| 6,751,552 B1 | 6/2004 | Minelli |
| 6,751,553 B2 | 6/2004 | Young et al. |
| 6,751,554 B1 | 6/2004 | Asher et al. |
| 6,753,891 B1 | 6/2004 | Chohan et al. |
| 6,754,582 B1 | 6/2004 | Smith et al. |
| 6,769,462 B2 | 8/2004 | Larson et al. |
| 6,772,142 B1 | 8/2004 | Kelling et al. |
| 6,777,923 B2 | 8/2004 | Pearson |
| 6,778,128 B2 | 8/2004 | Tucker et al. |
| 6,792,079 B1 | 9/2004 | Boggs et al. |
| 6,798,319 B2 | 9/2004 | Tucker et al. |
| 6,799,116 B2 | 9/2004 | Robbins |
| 6,815,953 B1 | 11/2004 | Bigelow |
| 6,819,109 B2 | 11/2004 | Sowers et al. |
| 6,825,775 B2 | 11/2004 | Fling et al. |
| 6,825,793 B2 | 11/2004 | Taylor, Jr. et al. |
| 6,833,811 B2 | 12/2004 | Zeitfuss et al. |
| 6,836,231 B2 | 12/2004 | Pearson |
| 6,845,171 B2 | 1/2005 | Shum et al. |
| 6,850,161 B1 | 2/2005 | Elliott et al. |
| 6,850,843 B2 | 2/2005 | Smith et al. |
| 6,853,303 B2 | 2/2005 | Chen et al. |
| 6,853,905 B2 | 2/2005 | Barton |
| 6,865,484 B2 | 3/2005 | Miyasaka et al. |
| 6,876,945 B2 | 4/2005 | Emord |
| 6,882,912 B2 | 4/2005 | DiLodovico et al. |
| 6,895,356 B2 | 5/2005 | Brimhall et al. |
| 6,898,518 B2 | 5/2005 | Padmanabhan |
| 6,898,525 B1 | 5/2005 | Minelli |
| 6,898,550 B1 | 5/2005 | Blackadar et al. |
| 6,904,361 B1 | 6/2005 | Tallman et al. |
| 6,915,211 B2 | 7/2005 | Kram et al. |
| 6,915,955 B2 | 7/2005 | Jung et al. |
| 6,937,853 B2 | 8/2005 | Hall |
| 6,944,542 B1 | 9/2005 | Eschenbach |
| 6,949,052 B2 | 9/2005 | Millington et al. |
| 6,954,071 B2 | 10/2005 | Flatt et al. |
| 6,956,524 B2 | 10/2005 | Tucker et al. |
| 6,958,690 B1 * | 10/2005 | Asher et al. ................... 340/531 |
| 6,968,296 B2 | 11/2005 | Royle |
| 6,972,698 B2 | 12/2005 | Deguchi |
| 6,972,719 B1 | 12/2005 | Swope et al. |
| 6,973,291 B2 | 12/2005 | Bellows |
| 6,975,942 B2 | 12/2005 | Young et al. |
| 6,977,508 B2 | 12/2005 | Pearson et al. |
| 6,980,929 B2 | 12/2005 | Aronstam et al. |
| 6,983,036 B2 | 1/2006 | Esty et al. |
| 6,990,458 B2 | 1/2006 | Harrison et al. |
| 6,992,584 B2 | 1/2006 | Dooley et al. |
| 6,993,088 B2 | 1/2006 | Fling et al. |
| 6,996,210 B2 | 2/2006 | Esty et al. |
| 6,999,021 B2 | 2/2006 | Taylor, Jr. et al. |
| 7,003,138 B2 | 2/2006 | Wilson |
| 7,003,443 B2 | 2/2006 | Ford et al. |
| 7,003,475 B1 | 2/2006 | Friedland et al. |
| 7,009,519 B2 | 3/2006 | Leonard et al. |
| 7,016,855 B2 | 3/2006 | Eaton et al. |
| 7,038,454 B2 | 5/2006 | Gard et al. |
| 7,042,358 B2 | 5/2006 | Moore |
| 7,048,320 B2 | 5/2006 | Rubel et al. |
| 7,053,789 B2 | 5/2006 | Fling et al. |
| 7,054,741 B2 | 5/2006 | Harrison et al. |
| 7,057,383 B2 | 6/2006 | Schlapp et al. |
| 7,062,414 B2 | 6/2006 | Waite et al. |
| 7,079,591 B2 | 7/2006 | Fling et al. |
| 7,079,990 B2 | 7/2006 | Haller et al. |
| 7,091,852 B2 | 8/2006 | Mason et al. |
| 7,091,872 B1 | 8/2006 | Bigelow et al. |
| 7,110,142 B2 | 9/2006 | Mestha et al. |
| 7,111,318 B2 | 9/2006 | Vitale et al. |
| 7,113,124 B2 | 9/2006 | Waite |
| 7,114,648 B2 | 10/2006 | Ginskey et al. |
| 7,116,244 B2 | 10/2006 | Fling et al. |
| 7,120,564 B2 | 10/2006 | Pacey |
| 7,133,802 B2 | 11/2006 | Koch et al. |
| 7,136,765 B2 | 11/2006 | Maier et al. |
| 7,142,196 B1 | 11/2006 | Connor et al. |
| 7,143,130 B2 | 11/2006 | Lin |
| 7,162,367 B2 | 1/2007 | Lin et al. |
| 7,171,389 B2 | 1/2007 | Harrison |
| 7,197,214 B2 | 3/2007 | Elkins, II et al. |
| 7,216,034 B2 | 5/2007 | Vitikainen et al. |
| 7,233,394 B2 | 6/2007 | Odhner |
| 7,235,980 B2 | 6/2007 | Pearson et al. |
| 7,236,091 B2 | 6/2007 | Kiang et al. |
| 7,240,839 B2 | 7/2007 | Jung et al. |
| 7,245,215 B2 | 7/2007 | Gollu et al. |
| 7,266,571 B2 | 9/2007 | Botzer et al. |
| 7,269,002 B1 | 9/2007 | Turner et al. |
| 7,272,498 B2 | 9/2007 | Singh |
| 7,285,958 B2 | 10/2007 | Overby et al. |
| 7,289,890 B2 | 10/2007 | Mitchell et al. |
| 7,298,323 B2 | 11/2007 | Park |
| 7,298,483 B2 | 11/2007 | Jung et al. |
| 7,298,673 B2 | 11/2007 | Pappas et al. |

(56) References Cited

U.S. PATENT DOCUMENTS

| | | |
|---|---|---|
| 7,304,480 B1 | 12/2007 | Pearson et al. |
| 7,310,584 B2 | 12/2007 | Royle |
| 7,313,759 B2 | 12/2007 | Sinisi |
| 7,319,387 B2 | 1/2008 | Willson et al. |
| 7,323,969 B1 | 1/2008 | Delgado et al. |
| 7,324,905 B2 | 1/2008 | Droubie et al. |
| 7,331,340 B2 | 2/2008 | Barney |
| 7,333,631 B2 | 2/2008 | Roh et al. |
| 7,336,078 B1 | 2/2008 | Merewether et al. |
| 7,339,379 B2 | 3/2008 | Thompson et al. |
| 7,340,037 B1 | 3/2008 | Jean et al. |
| 7,342,537 B2 | 3/2008 | Pearson et al. |
| 7,345,617 B2 | 3/2008 | Friborg et al. |
| 7,346,531 B2 | 3/2008 | Jacobs |
| 7,353,110 B2 | 4/2008 | Kim |
| 7,353,938 B2 | 4/2008 | Moldolan |
| 7,356,406 B2 | 4/2008 | Harrison et al. |
| 7,356,421 B2 | 4/2008 | Gudmundsson et al. |
| 7,358,738 B2 | 4/2008 | Overby et al. |
| 7,359,821 B1 | 4/2008 | Smith et al. |
| 7,363,126 B1 | 4/2008 | Zhong et al. |
| 7,372,247 B1* | 5/2008 | Giusti et al. ............ 324/67 |
| 7,372,276 B2 | 5/2008 | Mulcahey |
| 7,379,015 B2 | 5/2008 | Workman |
| 7,379,879 B1 | 5/2008 | Sloo |
| 7,386,376 B2 | 6/2008 | Basir et al. |
| 7,392,320 B2 | 6/2008 | Bookman et al. |
| 7,392,486 B1 | 6/2008 | Gyde et al. |
| 7,396,177 B2 | 7/2008 | Lapstun et al. |
| 7,396,178 B2 | 7/2008 | Lapstun et al. |
| 7,398,184 B1 | 7/2008 | Chen |
| 7,400,976 B2 | 7/2008 | Young et al. |
| 7,403,012 B2 | 7/2008 | Worsley et al. |
| 7,403,853 B1 | 7/2008 | Janky et al. |
| 7,413,363 B2 | 8/2008 | Lapstun et al. |
| 7,432,938 B1 | 10/2008 | Reuter et al. |
| 7,433,830 B2 | 10/2008 | Ingman et al. |
| 7,439,866 B2 | 10/2008 | Wallner et al. |
| 7,441,249 B2 | 10/2008 | Adachi et al. |
| 7,447,509 B2 | 11/2008 | Cossins et al. |
| 7,448,048 B1 | 11/2008 | Nesamoney et al. |
| 7,457,762 B2 | 11/2008 | Wetzer et al. |
| 7,464,046 B2 | 12/2008 | Wilson et al. |
| 7,469,247 B2* | 12/2008 | Cossins et al. ............ 1/1 |
| 7,472,181 B2 | 12/2008 | Hollinger et al. |
| 7,482,973 B2 | 1/2009 | Tucker et al. |
| 7,487,106 B2 | 2/2009 | Levine et al. |
| 7,500,583 B1 | 3/2009 | Cox |
| 7,538,724 B1 | 5/2009 | Baillot |
| 7,586,433 B1 | 9/2009 | Johansson et al. |
| 7,612,682 B2 | 11/2009 | Staples et al. |
| 7,626,496 B1* | 12/2009 | Asher ............ 340/531 |
| 7,640,105 B2 | 12/2009 | Nielsen et al. |
| 7,773,095 B1* | 8/2010 | Badrak et al. ............ 345/619 |
| 8,127,865 B2 | 3/2012 | Watson et al. |
| 8,473,148 B2 | 6/2013 | Nielsen et al. |
| 8,480,332 B2 | 7/2013 | Miller |
| 8,532,341 B2 | 9/2013 | Nielsen et al. |
| 8,543,937 B2 | 9/2013 | Nielsen et al. |
| 8,612,148 B2 | 12/2013 | Nielsen et al. |
| 8,612,271 B2 | 12/2013 | Nielsen et al. |
| 8,612,276 B1 | 12/2013 | Nielsen et al. |
| 8,620,726 B2 | 12/2013 | Nielsen et al. |
| 8,626,571 B2 | 1/2014 | Nielsen et al. |
| 8,700,325 B2 | 4/2014 | Nielsen et al. |
| 2001/0029996 A1 | 10/2001 | Robinson |
| 2001/0048757 A1 | 12/2001 | Oosawa |
| 2002/0027521 A1 | 3/2002 | Clodfelter |
| 2002/0029161 A1 | 3/2002 | Brodersen |
| 2002/0032028 A1 | 3/2002 | Kaupe |
| 2002/0038076 A1 | 3/2002 | Sheehan et al. |
| 2002/0046259 A1 | 4/2002 | Glorikian |
| 2002/0052750 A1 | 5/2002 | Hirooka |
| 2002/0052755 A1 | 5/2002 | Whatley et al. |
| 2002/0055870 A1 | 5/2002 | Thomas |
| 2002/0077876 A1 | 6/2002 | O'Meara et al. |
| 2002/0078035 A1 | 6/2002 | Frank et al. |
| 2002/0124177 A1 | 9/2002 | Harper |
| 2002/0130806 A1 | 9/2002 | Taylor et al. |
| 2002/0143596 A1 | 10/2002 | Carmody |
| 2002/0145559 A1 | 10/2002 | Sullivan |
| 2002/0146272 A1 | 10/2002 | Conover |
| 2002/0153134 A1 | 10/2002 | Newman |
| 2002/0184235 A1* | 12/2002 | Young et al. ............ 707/104.1 |
| 2003/0012411 A1 | 1/2003 | Sjostrom et al. |
| 2003/0023476 A1 | 1/2003 | Gainey |
| 2003/0028676 A1 | 2/2003 | Pangrac et al. |
| 2003/0046003 A1 | 3/2003 | Smith et al. |
| 2003/0061211 A1 | 3/2003 | Shultz et al. |
| 2003/0064705 A1 | 4/2003 | Desiderio |
| 2003/0100316 A1 | 5/2003 | Odamura |
| 2003/0110184 A1* | 6/2003 | Gibson et al. ............ 707/104.1 |
| 2003/0125853 A1 | 7/2003 | Takagi et al. |
| 2003/0130820 A1 | 7/2003 | Lane |
| 2003/0168834 A1 | 9/2003 | Ulrich |
| 2003/0177027 A1 | 9/2003 | DiMarco |
| 2003/0177051 A1 | 9/2003 | Driscoll et al. |
| 2003/0184300 A1 | 10/2003 | Bigelow |
| 2003/0196585 A1 | 10/2003 | McDonald et al. |
| 2003/0212621 A1 | 11/2003 | Poulter |
| 2003/0216949 A1 | 11/2003 | Kram et al. |
| 2004/0006425 A1 | 1/2004 | Wood et al. |
| 2004/0030706 A1 | 2/2004 | Evans |
| 2004/0057795 A1 | 3/2004 | Mayfield et al. |
| 2004/0110515 A1 | 6/2004 | Blumberg et al. |
| 2004/0111313 A1 | 6/2004 | Ingman et al. |
| 2004/0168358 A1 | 9/2004 | Stump |
| 2004/0203909 A1 | 10/2004 | Koster |
| 2004/0210370 A1 | 10/2004 | Gudat et al. |
| 2004/0215701 A1 | 10/2004 | Vrajich |
| 2004/0220731 A1 | 11/2004 | Tucker et al. |
| 2004/0236620 A1 | 11/2004 | Chauhan et al. |
| 2004/0237077 A1 | 11/2004 | Cole et al. |
| 2005/0021428 A1 | 1/2005 | Costello |
| 2005/0033492 A1 | 2/2005 | Mendelson et al. |
| 2005/0033513 A1 | 2/2005 | Gasbarro |
| 2005/0033620 A1 | 2/2005 | Gloor et al. |
| 2005/0038825 A1 | 2/2005 | Tarabzouni et al. |
| 2005/0040222 A1 | 2/2005 | Robinson |
| 2005/0055142 A1 | 3/2005 | McMurtry et al. |
| 2005/0057745 A1 | 3/2005 | Bontje |
| 2005/0062475 A1 | 3/2005 | Nakanishi et al. |
| 2005/0094772 A1 | 5/2005 | Harrison et al. |
| 2005/0101334 A1 | 5/2005 | Brown et al. |
| 2005/0108523 A1 | 5/2005 | West |
| 2005/0125389 A1 | 6/2005 | Hazzard et al. |
| 2005/0192727 A1 | 9/2005 | Shostak et al. |
| 2005/0232475 A1 | 10/2005 | Floeder |
| 2005/0240649 A1 | 10/2005 | Elkington |
| 2005/0243084 A1 | 11/2005 | Smith et al. |
| 2005/0273346 A1 | 12/2005 | Frost |
| 2005/0278371 A1 | 12/2005 | Funk et al. |
| 2006/0015389 A1 | 1/2006 | Perham |
| 2006/0015475 A1 | 1/2006 | Birkner et al. |
| 2006/0026020 A1* | 2/2006 | Waite et al. ............ 705/1 |
| 2006/0031110 A1 | 2/2006 | Benbassat et al. |
| 2006/0055584 A1 | 3/2006 | Waite et al. |
| 2006/0073464 A1 | 4/2006 | Baldus et al. |
| 2006/0077095 A1* | 4/2006 | Tucker et al. ............ 342/357.08 |
| 2006/0085133 A1 | 4/2006 | Young et al. |
| 2006/0085396 A1* | 4/2006 | Evans et al. ............ 707/3 |
| 2006/0091888 A1 | 5/2006 | Holman et al. |
| 2006/0109131 A1 | 5/2006 | Sen et al. |
| 2006/0125644 A1 | 6/2006 | Sharp |
| 2006/0161349 A1 | 7/2006 | Cross et al. |
| 2006/0178812 A1 | 8/2006 | Affleck et al. |
| 2006/0178918 A1 | 8/2006 | Mikurak |
| 2006/0200305 A1 | 9/2006 | Sheha et al. |
| 2006/0206370 A1 | 9/2006 | Skopal |
| 2006/0208927 A1 | 9/2006 | Poor et al. |
| 2006/0212195 A1 | 9/2006 | Veith et al. |
| 2006/0217876 A1 | 9/2006 | Houri et al. |
| 2006/0229923 A1 | 10/2006 | Adi et al. |
| 2006/0235741 A1 | 10/2006 | Deaton et al. |

(56) References Cited

U.S. PATENT DOCUMENTS

| | | |
|---|---|---|
| 2006/0244454 A1 | 11/2006 | Gard et al. |
| 2006/0254820 A1 | 11/2006 | Cole et al. |
| 2006/0276198 A1 | 12/2006 | Michelon et al. |
| 2006/0282280 A1* | 12/2006 | Stotz et al. ................. 705/1 |
| 2006/0285913 A1 | 12/2006 | Koptis |
| 2006/0287900 A1 | 12/2006 | Fiore et al. |
| 2006/0289679 A1 | 12/2006 | Johnson et al. |
| 2007/0013379 A1 | 1/2007 | Staples et al. |
| 2007/0018632 A1 | 1/2007 | Royle |
| 2007/0044539 A1 | 3/2007 | Sabol et al. |
| 2007/0050232 A1 | 3/2007 | Chang et al. |
| 2007/0073610 A1 | 3/2007 | Marugabandhu et al. |
| 2007/0094034 A1 | 4/2007 | Berlin et al. |
| 2007/0094708 A1 | 4/2007 | Hess |
| 2007/0100496 A1 | 5/2007 | Forell |
| 2007/0100521 A1 | 5/2007 | Grae |
| 2007/0100768 A1 | 5/2007 | Boccon-Gibod et al. |
| 2007/0112936 A1 | 5/2007 | Harrison |
| 2007/0118545 A1 | 5/2007 | Chandrasekharan et al. |
| 2007/0127694 A1 | 6/2007 | Hajj et al. |
| 2007/0129817 A1 | 6/2007 | Cadiz et al. |
| 2007/0143676 A1 | 6/2007 | Chen |
| 2007/0150140 A1 | 6/2007 | Seymour |
| 2007/0155360 A1 | 7/2007 | An |
| 2007/0185746 A1 | 8/2007 | Chieu et al. |
| 2007/0191025 A1 | 8/2007 | McBrierty et al. |
| 2007/0195011 A1 | 8/2007 | Hatori et al. |
| 2007/0198992 A1 | 8/2007 | Mirlas et al. |
| 2007/0219722 A1 | 9/2007 | Sawyer et al. |
| 2007/0226004 A1 | 9/2007 | Harrison |
| 2007/0255529 A1 | 11/2007 | Biazetti et al. |
| 2007/0260569 A1 | 11/2007 | Biger et al. |
| 2007/0288159 A1 | 12/2007 | Skelton |
| 2007/0288195 A1 | 12/2007 | Waite et al. |
| 2007/0294258 A1 | 12/2007 | Caldwell et al. |
| 2008/0001009 A1 | 1/2008 | Young |
| 2008/0010338 A1 | 1/2008 | Curtis et al. |
| 2008/0017416 A1 | 1/2008 | Watson |
| 2008/0021863 A1 | 1/2008 | Evans et al. |
| 2008/0025614 A1 | 1/2008 | Hintz et al. |
| 2008/0042410 A1 | 2/2008 | Breed et al. |
| 2008/0077290 A1 | 3/2008 | Weinmann et al. |
| 2008/0084329 A1 | 4/2008 | Davies |
| 2008/0103695 A1 | 5/2008 | Whiting |
| 2008/0114683 A1 | 5/2008 | Neveu et al. |
| 2008/0120129 A1 | 5/2008 | Seubert et al. |
| 2008/0125942 A1 | 5/2008 | Tucker et al. |
| 2008/0133128 A1 | 6/2008 | Koch |
| 2008/0137589 A1 | 6/2008 | Barrett |
| 2008/0141281 A1 | 6/2008 | Ramsey et al. |
| 2008/0161996 A1 | 7/2008 | Chang et al. |
| 2008/0162242 A1 | 7/2008 | Schneur et al. |
| 2008/0167911 A1 | 7/2008 | Hatakeda |
| 2008/0180319 A1 | 7/2008 | Islam et al. |
| 2008/0180322 A1 | 7/2008 | Islam et al. |
| 2008/0186166 A1 | 8/2008 | Zhou et al. |
| 2008/0194268 A1 | 8/2008 | Koch |
| 2008/0208657 A1 | 8/2008 | Chessell et al. |
| 2008/0228294 A1* | 9/2008 | Nielsen et al. ................. 700/58 |
| 2008/0235658 A1 | 9/2008 | Adi et al. |
| 2008/0245299 A1* | 10/2008 | Nielsen et al. ................. 118/712 |
| 2008/0288267 A1 | 11/2008 | Asher et al. |
| 2008/0294988 A1 | 11/2008 | Nicholas et al. |
| 2008/0299534 A1 | 12/2008 | Richardson |
| 2009/0005977 A1 | 1/2009 | Chung et al. |
| 2009/0013928 A1* | 1/2009 | Nielsen et al. ................. 118/305 |
| 2009/0043504 A1 | 2/2009 | Bandyopadhyay et al. |
| 2009/0051515 A1 | 2/2009 | Fujinawa et al. |
| 2009/0073191 A1 | 3/2009 | Smith et al. |
| 2009/0085568 A1 | 4/2009 | Cole |
| 2009/0121933 A1 | 5/2009 | Tucker et al. |
| 2009/0157746 A1 | 6/2009 | More et al. |
| 2009/0184823 A1 | 7/2009 | Tessier |
| 2009/0201178 A1 | 8/2009 | Nielsen et al. |
| 2009/0201311 A1 | 8/2009 | Nielsen et al. |
| 2009/0202101 A1 | 8/2009 | Nielsen et al. |
| 2009/0202110 A1 | 8/2009 | Nielsen et al. |
| 2009/0202111 A1 | 8/2009 | Nielsen et al. |
| 2009/0202112 A1 | 8/2009 | Nielsen et al. |
| 2009/0204238 A1 | 8/2009 | Nielsen et al. |
| 2009/0204466 A1 | 8/2009 | Nielsen et al. |
| 2009/0204614 A1 | 8/2009 | Nielsen et al. |
| 2009/0204625 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210284 A1 | 8/2009 | Nielsen et al. |
| 2009/0210285 A1 | 8/2009 | Nielsen et al. |
| 2009/0210297 A1 | 8/2009 | Nielsen et al. |
| 2009/0210298 A1 | 8/2009 | Nielsen et al. |
| 2009/0223355 A1 | 9/2009 | Manders |
| 2009/0233573 A1 | 9/2009 | Gray |
| 2009/0237408 A1 | 9/2009 | Nielsen et al. |
| 2009/0238414 A1 | 9/2009 | Nielsen et al. |
| 2009/0238415 A1 | 9/2009 | Nielsen et al. |
| 2009/0238416 A1 | 9/2009 | Nielsen et al. |
| 2009/0238417 A1 | 9/2009 | Nielsen et al. |
| 2009/0241045 A1 | 9/2009 | Nielsen et al. |
| 2009/0241046 A1 | 9/2009 | Nielsen et al. |
| 2009/0265430 A1 | 10/2009 | Bechtel |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0033684 A1 | 2/2010 | Thiebaud |
| 2010/0034483 A1 | 2/2010 | Giuffrida |
| 2010/0084532 A1 | 4/2010 | Nielsen et al. |
| 2010/0085054 A1 | 4/2010 | Nielsen et al. |
| 2010/0085185 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0091200 A1 | 4/2010 | Vigouroux |
| 2010/0094553 A1 | 4/2010 | Nielsen et al. |
| 2010/0097224 A1 | 4/2010 | Prodanovich |
| 2010/0117654 A1 | 5/2010 | Nielsen et al. |
| 2010/0146454 A1 | 6/2010 | Sugahara |
| 2010/0164787 A1 | 7/2010 | Khosravy et al. |
| 2010/0170453 A1 | 7/2010 | Betzer-Zilevitch |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |

(56) References Cited

U.S. PATENT DOCUMENTS

| | | |
|---|---|---|
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0285211 A1 | 11/2010 | Nielsen et al. |
| 2010/0318401 A1 | 12/2010 | Nielsen et al. |
| 2010/0318465 A1 | 12/2010 | Nielsen et al. |
| 2010/0324967 A1 | 12/2010 | Nielsen et al. |
| 2011/0006772 A1 | 1/2011 | Olsson |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0095885 A9 | 4/2011 | Nielsen et al. |
| 2011/0131081 A1 | 6/2011 | Nielsen et al. |
| 2011/0135163 A1 | 6/2011 | Nielsen et al. |
| 2011/0137769 A1 | 6/2011 | Nielsen et al. |
| 2011/0236588 A1 | 9/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2013/0006718 A1 | 1/2013 | Nielsen et al. |
| 2013/0085670 A1 | 4/2013 | Nielsen et al. |
| 2013/0101180 A1 | 4/2013 | Nielsen et al. |
| 2013/0103318 A1 | 4/2013 | Nielsen et al. |
| 2013/0116855 A1 | 5/2013 | Nielsen et al. |
| 2013/0135343 A1 | 5/2013 | Nielsen et al. |
| 2013/0147637 A1 | 6/2013 | Nielsen et al. |
| 2013/0162431 A1 | 6/2013 | Nielsen et al. |
| 2013/0174072 A9 | 7/2013 | Nielsen et al. |
| 2013/0182009 A1 | 7/2013 | Nielsen et al. |
| 2013/0186333 A1 | 7/2013 | Nielsen et al. |
| 2013/0194303 A1 | 8/2013 | Nielsen et al. |
| 2013/0231984 A1 | 9/2013 | Nielsen et al. |
| 2013/0233883 A1 | 9/2013 | Nielsen et al. |
| 2013/0251894 A1 | 9/2013 | Nielsen et al. |
| 2013/0265138 A1 | 10/2013 | Nielsen et al. |
| 2013/0268199 A1 | 10/2013 | Nielsen et al. |
| 2013/0287500 A1 | 10/2013 | Miller |
| 2013/0315449 A1 | 11/2013 | Nielsen et al. |
| 2014/0022272 A1 | 1/2014 | Nielsen et al. |
| 2014/0035587 A1 | 2/2014 | Nielsen et al. |
| 2014/0074970 A1 | 3/2014 | Nielsen et al. |
| 2014/0122149 A1 | 5/2014 | Nielsen et al. |
| 2014/0278661 A1 | 9/2014 | Nielsen et al. |
| 2014/0304041 A1 | 10/2014 | Nielsen et al. |
| 2014/0321717 A1 | 10/2014 | Nielsen et al. |
| 2014/0334878 A1 | 11/2014 | Miller |
| 2014/0347396 A1 | 11/2014 | Nielsen et al. |

FOREIGN PATENT DOCUMENTS

| | | |
|---|---|---|
| CA | 2458050 | 3/2003 |
| CA | 2510111 | 7/2004 |
| CA | 2641355 | 8/2007 |
| EP | 100324 A1 | 2/1984 |
| EP | 522862 A1 | 1/1993 |
| EP | 0636393 A1 | 2/1995 |
| EP | 683401 A2 | 11/1995 |
| EP | 890927 A2 | 1/1999 |
| EP | 1281816 A2 | 2/2003 |
| EP | 1521331 A2 | 4/2005 |
| EP | 1635299 A2 | 3/2006 |
| EP | 1679232 A1 | 7/2006 |
| EP | 1726722 A1 | 11/2006 |
| EP | 1852365 A1 | 11/2007 |
| GB | 2266863 A | 11/1993 |
| JP | 7128061 | 5/1995 |
| JP | 7128061 A | 5/1995 |
| JP | 11072348 | 3/1999 |
| JP | 11072348 A | 3/1999 |
| JP | 2001043471 | 2/2001 |
| JP | 2001043471 A | 2/2001 |
| JP | 2001319016 | 11/2001 |
| JP | 2001319016 A | 11/2001 |
| JP | 2005327228 | 11/2005 |
| JP | 2005327228 A | 11/2005 |
| JP | 2006003206 | 1/2006 |
| JP | 2006003206 A | 1/2006 |
| JP | 2006189930 | 7/2006 |
| JP | 2006189930 A | 7/2006 |
| JP | 2006236292 | 9/2006 |
| JP | 2006236292 A | 9/2006 |
| WO | WO-9112119 | 8/1991 |
| WO | WO-9424584 | 10/1994 |
| WO | WO-9516827 | 6/1995 |
| WO | WO-9629572 | 9/1996 |
| WO | WO-9844364 | 10/1998 |
| WO | WO-9854600 | 12/1998 |
| WO | WO-9854601 | 12/1998 |
| WO | WO-9900679 | 1/1999 |
| WO | WO-0228541 | 4/2002 |
| WO | WO-2004100044 A1 | 11/2004 |
| WO | WO-2004102242 A1 | 11/2004 |
| WO | WO-2005052627 A2 | 6/2005 |
| WO | WO2006013338 | 2/2006 |
| WO | WO-2006015310 A2 | 2/2006 |
| WO | WO-2006069383 A2 | 6/2006 |
| WO | WO-2006136776 A1 | 12/2006 |
| WO | WO-2006136777 A1 | 12/2006 |
| WO | WO-2007014072 A1 | 2/2007 |
| WO | WO-2007067898 A2 | 6/2007 |
| WO | WO-2007128050 A1 | 11/2007 |
| WO | WO-2008112461 A1 | 9/2008 |

OTHER PUBLICATIONS

CGA, "Common Ground Alliance, Best Practices Version 3.0," Mar. 2006, 100 pages.*
Binder 1: "Virginia Utility Protection Service, Inc. Response to US Patent Application Publication . . . ," pp. DY0001-DY0755, Nov. 3, 2010.
Binder 2: "Patent US 2009 0237408," pp. DY0756-DY1271, Nov. 3, 2010.
Binder 3: "Patent US 2009 0238414," pp. DY1272-DY2210, Nov. 3, 2010.
Binder 4: "Patent US 2009 0238415," pp. DY2211-DY3308, Nov. 3, 2010.

(56) References Cited

OTHER PUBLICATIONS

Binder 5: "Patent US 2009 0238416," pp. DY3309-DY3889, Nov. 3, 2010.
Binder 6: "Patent US 2009 0238417," pp. DY3890-DY4133, Nov. 3, 2010.
Binder 7: "Patent US 2009 0241045," pp. DY4134-DY4276, Nov. 3, 2010.
Binder 8: "Patent US 2009 0241046," pp. DY4277-DY4499, Nov. 3, 2010.
R. Pevarski, Letter from the Virginia Utility Protection Service, Inc., dated Apr. 7, 2010.
H.L. Smith, Letter dated Oct. 27, 2010.
H.L Smith, Letter dated Jan. 14, 2011, with two attachments each dated Jan. 5, 2011.
360 Scheduling, 360 Concepts Guide 4.9.6 User Guide, 360 Technologies Ltd., Nottingham, UK, 2005-2008, 99 pages.
Alabama 1 Call, Annual Operations Report, 2005, 32 pages, selected pages from website http://www.al1call.com, printed on Apr. 2, 2009 (original publication date unknown).
Alabama 1 Call, GeoRemote, Remote Ticket Entry Manual, 35 pages, selected pages from website http://www.al1call.com, printed on Apr. 2, 2009 (original publication date unknown).
Alabama 1 Call, Guidelines and Requirements, 1 page, http://www.al1call.com/rte_proc.html, printed on Apr. 14, 2009 (original publication date unknown).
Bearden, T., "New Identification Technology Raises Concerns over Privacy," PBS Online NewsHour Report, Aug. 17, 2006, pp. 1-5, http://www.pbs.org/newshour/bb/science/july-dec06/rfid_08-17.html.
Blue Stakes of Utah Utility Notification Center, Inc., Association Newsletter, vol. 1, No. 1, 8 pages, Nov. 1, 2005.
Blue Stakes of Utah Utility Notification Center, Inc., Association Newsletter, vol. 1, No. 2, 5 pages, Jul. 15, 2006.
Blue Stakes of Utah Utility Notification Center, Inc., Association Newsletter, vol. 3, No. 1, 7 pages, Nov. 2007.
Blue Stakes of Utah Utility Notification Center, Inc., Association Newsletter, vol. 4, No. 1, pp. 1-8, Nov. 2008.
Blue Stakes of Utah Utility Notification Center, Inc., Association Newsletter, vol. 5, No. 1, 7 pages, Dec. 2009.
Carey, B., "Tracking Shoes," Chicago Tribune Online Edition, Jan. 29, 2007, pp. 1-3, http://www.chicagotribune.com/services/site/premium/access-registered.intercept.
Case Study: Wireless mash-up keeps track of Vegas' pipes, TechWorld, http://howto.techworld.com/mobile-wireless/2297/case-study-wireless-mash-up-keeps tra . . . , printed Dec. 16, 2009 (original publication date unknown), 2 pages.
CGA, Common Ground Alliance, Best Practices, Version 1.0, Apr. 2003, 93 pages.
CGA, Common Ground, Study of One-Call Systems and Damage Prevention Best Practices, Aug. 1999, 262 pages.
DigSafely New York, i-Notice, http://www.ufpo.org/excv/Inotice/, (original publication date unknown), printed Jun. 5, 2010, 4 pages.
Eastern Virginia Damage Prevention Committee, Meeting Minutes, Mar. 26, 2009 and May 12, 2009, 6 pages.
ESRI Corporate Introduction, http://www.esri.com/library/brochures/pdfs/corporate-intro.pdf, printed on Dec. 9, 2009 (original publication date unknown).
Fox, G. et al., "GPS Provides Quick, Accurate Data for Underground Utility Location," as featured in Apr. 2002 issue of Trenchless Technology, http://www.woolpert.com/asp/articles/GPS-Provides.asp, Sep. 14, 2007, pp. 1 and 2.
Fredericksburg Area Damage Prevention Committee, Meeting Minutes, Dec. 2009.
Georgia UPC EDEN, Web Entry Instruction Manual, www.gaupc.org, Jan. 22, 2009, 60 pages.
Gopher State One Call—History and Background, http://www.gopherstateonecall.org/history.aspx, printed on Dec. 12, 2009 (original publication date unknown), 2 pages.
Gopher State One Call—Virtual Polygon Fact Sheet, http://www.gopherstateonecall.org/docs/Virtual%20Polygon%20Fact%20Sheet.pdf, printed on Dec. 16, 2009 (original publication date unknown), 4 pages.
GPS Technology Enhancing Underground Utility Locating, Underground Construction Magazine, Apr. 2010, 3 pages.
Hanneman, J., "Notification and the NMOC Map System," http://nmonecall.org/articles.htm, printed on Dec. 16, 2009 (original publication date unknown), 10 pages.
Illinois One-Call System, NEWTIN Remote Ticket Entry User's Manual, Jun. 12, 2007, 29 pages.
International Search Report (Partial), Application Serial No. PCT/US2009/005401, Mar. 3, 2010.
International Search Report and Written Opinion, Application Serial No. PCT/2009/05416, Jun. 7, 2010.
International Search Report and Written Opinion, Application Serial No. PCT/2009/05443, Apr. 5, 2010.
International Search Report and Written Opinion, Application Serial No. PCT/2010/000130, May 18, 2010.
International Search Report and Written Opinion, Application Serial No. PCT/2010/000131, Apr. 23, 2010.
International Search Report and Written Opinion, Application Serial No. PCT/2010/000343, 11 pages.
International Search Report and Written Opinion, Application Serial No. PCT/2010/000389, 11 pages.
International Search Report and Written Opinion, Application Serial No. PCT/2010/00378 , Apr. 20, 2010.
International Search Report and Written Opinion, Application Serial No. PCT/US2008/55796, Oct. 14, 2008.
International Search Report and Written Opinion, Application Serial No. PCT/US2008/55798, Jul. 28, 2008.
International Search Report and Written Opinion, Application Serial No. PCT/US2009/000859, Apr. 14, 2009.
International Search Report and Written Opinion, Application Serial No. PCT/US2009/005299, Dec. 22, 2009.
International Search Report and Written Opinion, Application Serial No. PCT/US2009/005348, Mar. 2, 2010.
International Search Report and Written Opinion, Application Serial No. PCT/US2009/005359, Feb. 8, 2010.
International Search Report and Written Opinion, Application Serial No. PCT/US2009/005401, Jun. 18, 2010, 18 pages.
International Search Report and Written Opinion, Application Serial No. PCT/US2009/005413, Feb. 8, 2010.
International Search Report and Written Opinion, Application Serial No. PCT/US2009/005444, Feb. 8, 2010.
International Search Report and Written Opinion, Application Serial No. PCT/US2009/01707, May 14, 2009, 13 pages.
International Search Report and Written Opinion, Application Serial No. PCT/US2010/000997, Jun. 15, 2010.
International Search Report and Written Opinion, Application Serial No. PCT/US2010/000998, Jun. 29, 2010.
IRTH Internet Manual, Arizona Bluestake, Call Before you Dig, http://www.azbluestake.com/main/download/IRTHNetFeatures.pdf, (original publication date unknown), 47 pages.
IRTH Internet Manual, Georgia Utilities Protection Center, Feb. 16, 2006, 20 pages.
IRTH One Call Centers, Underground Utility Damage Prevention, Ticket Management, http://www.irth.com/SOLUTIONS/IRTH_ONE_CALL/index.aspx, (original publication date unknown), 2 pages.
Letter from Norfield Data Products to Wolf Greenfield & Sacks, P.C., May 5, 2010, 2 pages.
MALA Application Note—Using MALA GPR systems with GPS equipment, Printed Matter No. 2894, 5 pages, www.malags.se, printed Apr. 9, 2010 (original publication date unknown).
MALA Application Note—Visualizing GPR data in Google Earth using MALA GPS Mapper, Printed Matter No. 2896, 3 pages, www.malags.se, printed Apr. 9, 2010 (original publication date unknown).
MALA GPS Mapper—Processing, 1 page, http://www.malags.se/Downloads/Software/processing/MALA-GPS-Mapper.aspx, printed on Apr. 9, 2010 (original publication date unknown).
MALA GPS Mapper—Product Releases, Sep. 19, 2007, 1 page, http://www.malags.se/News-and-Events/Product-Releases/MALA-GPS-Mapper.aspx, printed Apr. 9, 2010.

(56) References Cited

OTHER PUBLICATIONS

MALA Object Mapper—Processing, 1 page, http://www.malags.se/Downloads/Software/Processing/Object-Mapper.aspx, printed Apr. 9, 2010 (original publication date unknown).
North Carolina One-Call Center, Newtin Remote Ticket Entry Application Tutorial, Sep. 17, 2009, 24 pages.
North Carolina One-Call Center, Newtin Remote Ticket Entry Quick Map Tutorial, Nov., 2008, 13 pages.
Notice of Allowance dated Nov. 6, 2009 from Co-Pending U.S. Appl. No. 11/685,602.
NTDPC One-Call Mapping Notification Processes, http://www.ntdpc.com/ntdpc/faces/ntscf.jsp, (original publication date unknown), 12 pages.
Office Action dated Jun. 16, 2010 from Co-Pending Canadian Application No. 2,691,707, filed Feb. 10, 2010.
Office Action dated Nov. 18, 2009 from Co-Pending Canadian Application No. 2,623,466, filed Mar. 4, 2008.
Office Action dated Nov. 23, 2009 from Co-Pending Canadian Application No. 2,623,761, filed Mar. 4, 2008.
Office Action dated Apr. 28, 2009 from Co-Pending U.S. Appl. No. 11/685,602.
Office Action dated Sep. 17, 2009 from Co-Pending U.S. Appl. No. 11/685,602.
One Call Concepts Inc.—Company News & Executive Profiles, BNET Industries, http://resources.bnet.com/topic/one_call+concepts+inc..html, printed on Dec. 15, 2009 (original publication date unknown), 6 pages.
One Call Concepts Inc.—Prism Software, http://www.occinc.com/services/prism_software.asp, printed on Dec. 16, 2009 (original publication date unknown), 1 page.
Pevarski, R., 'Virginia Pilot Project: Technology Meets Damage Prevention, http://www.excavationsafetyonline.com/esg/guidePDFs/2009_2009_ESG_Page_9.pdf, printed on Nov. 3, 2009, 1 page.
Pickus, J., "Call USA—Automating "Call Before You Dig" Processes for a Major Utility," GITA's Annual Conference on Apr. 25-28, 2004, 19 pages.
Pickus, J., "Internet GIS for the Municipality," Las Vegas Water District, http://spatialnews.geocomm.com/geonetcom/seminar3.html, printed Dec. 16, 2009 (original publication date unknown), 3 pages.
Polaris Workforce Solutions, 2 pages, http://www.polarisworkforce.com, printed on Apr. 26, 2010 (original publication date unknown).
Schutzberg, A., "Autodesk Positions Itself for 2008 and Beyond," Location Intelligence Articles, Feb. 22, 2008, http://www.locationintelligence.net/articles/2693.html, printed Dec. 16, 2009, 4 pages.
Stocking, A., "Betting on Technology," Mar. 2007, http://www.re-sources.autodesk.com/files/government/customer_stories/A137-LVTBVWD_Municipal_Sewer_and_Water_article.pdf, 3 pages.
Trimble Navigation Limited, "H-Star Technology Explained," pp. 1-9, 2005, www.trimble.com.
Utility Notification Center—Membership Details, http://www.callbeforeyoudig.org/himember.htm, printed on Dec. 12, 2009 (original publication date unknown), 12 pages.
Utility Notification Center of Colorado, Annual Report for Fiscal Year 2004, 41 pages.
Utility Notification Center of Colorado, Annual Report for Fiscal Year 2005, 39 pages.
Utility Notification Center of Colorado, Annual Report for Fiscal Year 2006, 49 pages.
Utility Notification Center of Colorado, Annual Report for Fiscal Year 2007, 44 pages.
Utility Notification Center of Colorado, Annual Report for Fiscal Year 2008, 39 pages.
Virginia Pilot Project for One-call Location Technology, Project Plan, Aug. 2006, 28 pages.
Virginia Pilot Project, Incorporating GPS Technology to Enhance One-Call Damage Prevention, Phase I—Electronic White Lining Project Report, Nov. 2007, 50 pages.
Co-pending U.S. Appl. No. 12/704,485, filed Feb. 11, 2010.
Co-pending U.S. Appl. No. 12/833,103, filed Jul. 9, 2010.
Co-pending U.S. Appl. No. 12/833,117, filed Jul. 9, 2010.
Co-pending U.S. Appl. No. 12/833,127, filed Jul. 9, 2010.
U.S. Appl. No. 12/204,454, filed Sep. 4, 2008, Nielsen et al.
U.S. Appl. No. 12/364,339, filed Feb. 2, 2009, Nielsen et al.
U.S. Appl. No. 12/432,849, filed Apr. 30, 2009, Nielsen et al.
U.S. Appl. No. 12/432,860, filed Apr. 30, 2009, Nielsen et al.
U.S. Appl. No. 12/432,870, filed Apr. 30. 2009, Nielsen et al.
U.S. Appl. No. 12/432,878, filed Apr. 30, 2009, Nielsen et al.
U.S. Appl. No. 12/432,909, filed Apr. 30, 2009, Nielsen et al.
U.S. Appl. No. 12/493,109, filed Jun. 26, 2009, Nielsen et al.
U.S. Appl. No. 12/537,732, filed Aug. 7, 2009, Nielsen et al.
U.S. Appl. No. 12/537,856, filed Aug. 7, 2009, Nielsen et al.
U.S. Appl. No. 12/537,894, filed Aug. 7, 2009, Nielsen et al.
U.S. Appl. No. 12/537,917, filed Aug. 7, 2009, Nielsen et al.
U.S. Appl. No. 12/571,356, filed Sep. 30, 2009, Nielsen et al.
U.S. Appl. No. 12/572,202, filed Oct. 1, 2009, Nielsen et al.
U.S. Appl. No. 12/572,260, filed Oct. 1, 2009, Nielsen et al.
U.S. Appl. No. 12/850,187, filed Aug. 4, 2010, Nielsen et al.
U.S. Appl. No. 12/850,712, filed Aug. 5, 2010, Nielsen et al.
CGA, Common Ground Alliance, Best Practices, Version 3.0, Mar. 2006, 100 pages.
CGA, Common Ground Alliance, Best Practices, Version 5.0, Mar. 2008, http://web.archive.org/web/20101009040317/http://www.commongroundalliance.com/Content/NavigationMenu/Best_Practices/Best_Practices_2008/BP_5.0_March2008_Fial.pdf.
Charlton, B.G. et al., "Auditing as a tool of public policy—The misuse of quality assurance techniques in the UK university expansion," Final draft of a paper published in European Political Science 2002; 2: 24-35.
GPS Visualizer: Free geocoder: Convert address to coordinates, http://web.archive.org/web/20070304090412/http://www.gpsvisualizer.com/geocoding.html, Mar. 2007, 1 page.
Haas, J. et al., "Feed the FLAME—Utility Integrates Field Applications," GeoWorld, Mar. 2007, 5 pages, online: Systems Integration Articles/Enspiria Solutions.
International Search Report and Written Opinion, Application No. PCT/2010/00406, Aug. 30, 2010.
International Search Report and Written Opinion, Application No. PCT/US2009/03810, Aug. 17, 2010.
Office Action dated Feb. 1, 2011 from Canadian Application No. 2,691,707.
Office Action dated Apr. 28, 2011 from U.S. Appl. No. 12/204,454.
Office Action dated Jul. 8, 2010 from Canadian Application No. 2,691,780, filed Feb. 10, 2010.
Office Action dated Sep. 26, 2011 from Canadian Application No. 2,739,090.
Office Action dated Sep. 26, 2011 from Canadian Application No. 2,739,110.
Office Action dated Sep. 27, 2011 from Canadian Application No. 2,739,094.
Office Action dated Oct. 11, 2011 from U.S. Appl. No. 12/432,849.
Office Action dated Oct. 11, 2011 from U.S. Appl. No. 12/432,878.
Office Action dated Oct. 11, 2011 from U.S. Appl. No. 12/432,909.
Office Action dated Nov. 21, 2011 from U.S. Appl. No. 12/204,454.
Office Action dated Dec. 6, 2011 from U.S. Appl. No. 12/432,870.
Office Action dated Dec. 7, 2011 from U.S. Appl. No. 12/537,856.
Office Action dated Dec. 9, 2011 from U.S. Appl. No. 12/493,109.
Office Action dated Dec. 13, 2011 from U.S. Appl. No. 12/537,894.
Office Action dated Dec. 22, 2011 from U.S. Appl. No. 12/537,732.
One Call Concepts Locating Services, Inc., Point Positive Utility Mapping & GIS, http://www.occls.com/Default.aspx?content=pointpositive, original publication date unknown, retrieved Sep. 21, 2011, 1 page.
Pelican Corp., beforeUdig mobile, http://www.pelicancorp.com/index.php?option=com_content&view=article&id=145&Itemid=133, original publication date unknown, printed Aug. 30, 2011, 1 page.
Pelican Corp., DigSAFE OneCall Key Capabilities, http://www.pelicancorp.com/index.php?option=com_content&view=article&id=104&Itemid=121, original publication date unknown, printed Aug. 30, 2011, 2 pages.

(56) References Cited

OTHER PUBLICATIONS

Pelican Corp., DigSAFE Pro Automated Plan Response Server, http://www.pelicancorp.com/index.php?option=com_content&view=article&id=48&Itemid=68, original publication date unknown, printed Aug. 30, 2011, 2 pages.
Pelican Corp., DigSAFE Pro Automation Workflow, http://www.pelicancorp.com/index.php?option=com_content&view=article&id=119&Itemid=124, original publication date unknown, printed Aug. 30, 2011, 2 pages.
Pelican Corp., DigSAFE Pro New and Updated features for version 2.4, http://www.pelicancorp.com/index.php?option=com_content&view=article&id=151&Itemid=91, original publication date unknown, printed Aug. 30, 2011, 2 pages.
Pelican Corp., How beforeUdig works, http://www.pelicancorp.com/index.php?option=com_content&view=article&id=114&Itemid=105, original publication date unknown, printed Aug. 30, 2011, 1 page.
Pelican Corp., Using beforeUdig, http://www.pelicancorp.com/index.php?option=com_content&view=article&id=115&Itemid=106, original publication date unknown, printed Aug. 30, 2011, 1 page.
Stahovich, David M. et al., "Automated and Integrated Call Before You Dig," Proceedings of GITA 2005, GITA's 18th Annual Conference, Mar. 6-9, 2005, Denver, CO, online: GIS for Oil & Gas Conference 2002 <http://www.gisdevelopment.net/proceedings/gita/2005/papers/76.pdf>.
Tetra Tech NUS, "Standard Operation Procedures," Dec. 2003 [retrieved on Jul. 27, 2010, http://htl.mclinc.org/%5CWillowGroveNASAdminRecord%5CPdfs%5CFinal21345_appendA.pdf>, 315 pages.
Whiting, P., "No role for quality scores in systematic reviews of diagnostic accuracy studies," BMC Medical Research Methodology, 2005, 5:19, 9 pages.
U.S. Appl. No. 12/571,408, filed Sep. 30, 2009, Nielsen et al.
CARDNO TBE, "Locating Underground Utilities Before Construction," Airport Facilities, Fall 2004, http://www.subsurfaceutilityengineering.com/articles/Locating_Utilities.asp, 2 pages.
Notice of Allowance dated Apr. 17, 2012 from U.S. Appl. No. 12/432,870.
Office Action dated Feb. 14, 2012 from U.S. Appl. No. 12/833,103.
Office Action dated Feb. 29, 2012 from U.S. Appl. No. 12/704,485.
Office Action dated Feb. 29, 2012 from U.S. Appl. No. 12/833,117.
Office Action dated Feb. 29, 2012 from U.S. Appl. No. 12/833,127.
Office Action dated Mar. 19, 2012 from U.S. Appl. No. 12/204,454.
Office Action dated Apr. 4, 2012 from U.S. Appl. No. 12/572,202.
Office Action dated May 9, 2012 from U.S. Appl. No. 12/432,909.
Office Action dated May 11, 2012 from Australian Application No. 2009300343.
Office Action dated May 22, 2012 from U.S. Appl. No. 12/432,849.
Office Action dated May 22, 2012 from U.S. Appl. No. 12/572,260.
Office Action dated May 22, 2012 from U.S. Appl. No. 12/432,878.
Office Action dated May 31, 2012 from Australian Application No. 2009300323.
Office Action dated Jun. 1, 2012 from Australian Application No. 2009300342.
Office Action dated Jun. 14, 2012 from U.S. Appl. No. 12/432,860.
Office Action dated Jul. 9, 2012 from U.S. Appl. No. 12/493,109.
Office Action dated Jul. 12, 2012 from U.S. Appl. No. 12/537,856.
Office Action dated Jul. 16, 2012 from Canadian Application No. 2,691,780.
Office Action dated Jul. 26, 2012 from Canadian Application No. 2,712,126.
Office Action dated Apr. 24, 2013 from U.S. Appl. No. 12/432,909.
Office Action dated Apr. 29, 2013 from U.S. Appl. No. 12/432,849.
Office Action dated Jul. 26, 2013 from Canadian Application No. 2,706,195.
Office Action dated Jul. 8, 2013 from U.S. Appl. No. 12/840,467.
Bauer, S. et al., "Quantification of groundwater contamination in an urban area using integral pumping tests," Journal of Contaminant Hydrology; vol. 75, Issues 3-4; Dec. 2004, pp. 183-213.
Holder, T. et al., A new approach for source zone characterization: the Neckar Valley study. Groundwater Quality: Remediation and Protection, IAHS Publication, vol. 250, IAHS Press, Wallingford, Oxfordshire, UK, pp. 49-55.
Maqsood, I et al., Simulation-based risk assessment of contaminated sites under remediation scenarios, planning periods, and land-use patterns-a Canadian case study, Stoch Environ Res Risk Assess 2005, 19:146-157.
Mike Herbert, Karel Kovar, Universitat Tubingen Geological Institute "Groundwater Quality: Remediation and Projection" IAHS Publication No. 250, Proceedings of the GQ conference held in Tubingen, German from Sep. 21 to 25 (1998).
Office Action dated Jun. 3, 2013 from Canadian Application No. 2,691,780.
Office Action dated Jun. 20, 2013 from U.S. Appl. No. 12/833,127.
Patent Examination Report No. 2, Australian Application No. 2009300342, Jul. 1, 2013.
Schwarz, R. et al., 1998 Groundwater risk assessment at contaminated sites: a new investigation approach. In: Herbert, M., Kovar, K. (Eds.), GQ'98 Groundwater Quality: Remediation and Protection, IAHS Publication, vol. 250, pp. 68-71.
Notice of Allowance dated Jun. 21, 2013 from U.S. Appl. No. 12/572,260.
Office Action dated Jun. 19, 2013 from U.S. Appl. No. 12/704,485.
Patent Examination Report No. 2, Australian Application No. 2009300323, May 29, 2013.
Office Action dated Jun. 20, 2013 from U.S. Appl. No. 12/833,117.
Office Action dated Aug. 21, 2013 from Canadian Application No. 2,739,110.
Office Action dated Aug. 29, 2013 from U.S. Appl. No. 13/465,524.
Notice of Allowance dated Aug. 21, 2013 from U.S. Appl. No. 12/850,187.
Office Action dated Oct. 9, 2013 from U.S. Appl. No. 13/186,116.
Weld County: Department of Public Works, "Permits and Applications—Public Works," available online Jun. 7, 2010 at http://www.co.weld.co.us/Departments/PublicWorks/Permits/Applications.html.
Office Action dated Oct. 10, 2013 from U.S. Appl. No. 12/850,712.
Notice of Allowance dated May 20, 2013 from U.S. Appl. No. 12/432,860.
Office Action dated May 23, 2013 from U.S. Appl. No. 12/572,202.
U.S. Appl. No. 14/075,011, filed Nov. 8, 2013, Nielsen et al.
Office Action dated Mar. 26, 2014 from U.S. Appl. No. 12/537,917.
Office Action dated Mar. 7, 2014 from U.S. Appl. No. 12/432,878.
Office Action dated Mar. 26, 2014 from U.S. Appl. No. 12/204,454.
Office Action dated Apr. 9, 2014 from U.S. Appl. No. 12/537,732.
Office Action dated Sep. 24, 2013 from Canadian Application No. 2,739,094.
Office Action dated Oct. 16, 2013 from Canadian Application No. 2,691,780.
Office Action dated Aug. 29, 2013 from Canadian Application No. 2,739,090.
Office Action dated Sep. 24, 2013 from Canadian Application No. 2,739,090.
Office Action dated Oct. 8, 2013 from Canadian Application No. 2,692,110.
Notice of Allowance dated Nov. 26, 2013 from U.S. Appl. No. 12/833,103.
Office Action dated Nov. 12, 2013 from Canadian Application No. 2,712,126.
Notice of Allowance dated Dec. 16, 2013 from U.S. Appl. No. 12/704,485.
Common Ground Alliance, Mar. 2008, "Best Practices Version 5.0", archived online: CGA | Best Practices 2008 <http://web.archive.org/web/20101009040317/http://www.commongroundalliance.com/Content/NavigationMenu/Best_Practices_2008/BP_5.0_March2008_Final.pdf[Best Practices 5.0].
Office Action dated Feb. 11, 2014 from Canadian Application No. 2,729,590.
Office Action dated Feb. 11, 2014 from U.S. Appl. No. 12/432,849.

(56) References Cited

OTHER PUBLICATIONS

Office Action dated Feb. 20, 2014 from Canadian Application No. 2,691,780.
Turner, R., "Standard Operating Procedures," *Appendix A for Sampling and Analysis Plan for Interim Groundwater Monitoring Site 3—Ninth Street Landfill* (Tetra Tech NUS, 2008), retrieved online at: Horsham Township Library: Willow Grove Naval Air Station Administrative Record Index <http://htl.mclinc.org/%5CWillowGroveNASAdminRecord%5CPdfs%5CFnial21345_appendA.pdf.
Office Action dated Jan. 15, 2014 from U.S. Appl. No. 12/432,909.
Office Action dated Jul. 17, 2014 from U.S. Appl. No. 12/537,894.
Office Action dated Aug. 4, 2014 from U.S. Appl. No. 12/833,127.
Office Action dated May 22, 2014 from U.S. Appl. No. 12/850,712.
Office Action dated May 23, 2014 from U.S. Appl. No. 12/537,894.
Office Action dated Jun. 10, 2014 from U.S. Appl. No. 13/465,524.
Office Action dated Jul. 30, 2014 from U.S. Appl. No. 12/572,202.
Office Action dated Jul. 31, 2014 from U.S. Appl. No. 12/833,117.
Office Action dated Jun. 19, 2013 from U.S. Appl. No. 12/833,103.
Office Action dated Oct. 31, 2013 from U.S. Appl. No. 12/572,202.
U.S. Appl. No. 14/579,223, filed Dec. 22, 2014, Nielsen et al.
Office Action dated Feb. 11, 2015 from U.S. Appl. No. 12/493,109.
Office Action dated Dec. 18, 2014 from U.S. Appl. No. 12/537,917.
Notice of Allowance dated Oct. 24, 2014 from U.S. Appl. No. 14/075,011.
Office Action dated Jan. 12, 2015 from U.S. Appl. No. 12/571,356.
Office Action dated Nov. 19, 2014 from U.S. Appl. No. 12/204,454.
Office Action dated Sep. 29, 2014 from Canadian Application No. 2,691,780.
Office Action dated Sep. 2, 2014 from Canadian Application No. 2,729,590.
Patent Examination Report dated Sep. 5, 2014 from Australian Application No. 2010358572.
S&N Locating Services, LLC's and S&N Communications, Inc.'s First Amended Answer, Affirmative Defenses, and Counterclaims to Plaintiff's First Amended Complaint filed Jan. 23, 2015; Case No. 2:13-cv-346 (MSD) (TEM); *CertusView Technologies, LLC v. S&N Locating Services, LLC et al.*, (Eastern District of Virginia).
CertusView's Objections to The Magistrate Judge's Order Allowing S&N's Amended Answer and Counterclaims filed Feb. 2, 2015; Case No. 2:13-cv-346 (MSD) (TEM); *CertusView Technologies, LLC v. S&N Locating Services, LLC et al.*, (Eastern District of Virginia).
Office Action dated Apr. 8, 2015 from U.S. Appl. No. 12/432,878.
Notice of Allowance dated Apr. 8, 2015 from U.S. Appl. No. 14/665,518.
Office Action dated Apr. 8, 2015 from U.S. Appl. No. 12/204,454.
Office Action dated Mar. 20, 2015 from Canadian Application No. 2,739,110.
Office Action dated Mar. 17, 2015 from Canadian Application No. 2,712,126.
Office Action dated Mar. 17, 2015 from Canadian Application No. 2,739,090.
First Action Interview Pre-Interview Communication dated Apr. 23, 2015 from U.S. Appl. No. 14/332,352.
Grant, Anthony M., Workplace, Executive and Life Coaching: An Annotated Bibliography from the Behavioural Science Literature, Coaching Publications from 1937 to Jul. 2008, 87 pages.
Office Action dated Apr. 24, 2015 from Canadian Application No. 2,776,434.
Office Action dated May 7, 2015 from U.S. Appl. No. 12/537,894.
Office Action dated Jun. 5, 2015 from U.S. Appl. No. 12/537,856.
Section 330523-1 Guidelines for Utility Horizontal Directional Borings, published on Oct. 26, 2007 at www.nashville.gov, 9 pages.
Notice of Filing of Defendants' Second Amended Answer and Counterclaims filed Jun. 12, 2015; Case No. 2:13-cv-346 (MSD) (TEM); *CertusView Technologies, LLC v. S&N Locating Services, LLC et al.*, (Eastern District of Virginia).
S&N Locating Services, LLC's and S&N Communications, Inc.'s Second Amended answer, Affirmative Defenses, and Counterclaims to Plaintiff's First Amended Complaint filed Jun. 12, 2015; Case No. 2:13-cv-346 (MSD) (TEM); *CertusView Technologies, LLC v. S&N Locating Services, LLC et al.*, (Eastern District of Virginia).
Opinion and Order Following Motion for Judgment on Pleadings, Jan. 21, 2015; Case 2:13-cv-00346-MSD-LRLVAED *CertusView Technologies, LLC v. S&N Locating Services*; (Eastern District of Virginia).
Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit A to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-1 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J-2 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-3 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J-4 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-5 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-6 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-7 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J-8 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-9 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-10 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-11 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).

(56) References Cited

OTHER PUBLICATIONS

Exhibit J-12 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-13 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-14 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-15 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-16 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-17 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-18 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-19 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-20 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-21 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-22 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
Exhibit J-23 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).
CertusView's Response in Opposition to S&N's Motion for Exceptional Case Finding and Attorneys' Fees filed Feb. 27, 2015; Case 2:13-cv-00346-MSD-TEM; *CertusView Technologies, LLC* v. *S&N Locating Services, LLC et al.*, (Eastern District of Virginia).
Reply in Support of Defendants' Motion for Exceptional Case Finding and Attorneys' Fees filed Mar. 9, 2015; Case 2:13-cv-00346-MSD-TEM; *CertusView Technologies, LLC* v. *S&N Locating Services, LLC et al.*, (Eastern District of Virginia).
Memorandum Order regarding Functional Equivalency Objections and Sanctions Objections filed Mar. 11, 2015; Case 2:13-cv-00346-MSD-TEM; *CertusView Technologies, LLC* v. *S&N Locating Services, LLC et al.*, (Eastern District of Virginia).
Office Action dated Mar. 25, 2015 from U.S. Appl. No. 14/063,417.
Office Action dated Mar. 20, 2015 from U.S. Appl. No. 12/572,202.
Office Action dated Mar. 20, 2015 from U.S. Appl. No. 12/833,117.
Office Action dated Mar. 19, 2015 from U.S. Appl. No. 12/833,127.
Office Action dated Feb. 9, 2015 from Canadian Application No. 2,729,590.
Office Action dated Jul. 7, 2015 from Canadian Application No. 2,739,094.
Patent Examination Report dated Jun. 29, 2015 from Australian Application No. 2014201054.
Memorandum in Support of CertusView's Motion for Summary Judgment on S&N's Inequitable Conduct Counterclaims filed Jul. 22, 2015; Case 2:13-cv-00346-MSD-TEM; *CertusView Technologies, LLC* v. *S&N Locating Services, LLC et al.*, (Eastern District of Virginia) (Parts 1, 2, 3 and 4).
Memorandum in Support of S&N's Response to CertusView's Motion for Summary Judgment on S&N's Inequitable Conduct Counterclaims filed Jul. 29, 2015; Case 2:13-cv-00346-MSD-TEM; *CertusView Technologies, LLC* v. *S&N Locating Services, LLC et al.*, (Eastern District of Virginia).
CertusView's Reply in Support of its Motion for Summary Judgment on S&N's Inequitable Conduct Counterclaims filed Aug. 3, 2015; Case 2:13-cv-00346-MSD-TEM; *CertusView Technologies, LLC* v. *S&N Locating Services, LLC et al.*, (Eastern District of Virginia).
Memorandum Order filed Aug. 7, 2015; Case 2:13-cv-00346-MSD-TEM; *CertusView Technologies, LLC* v. *S&N Locating Services, LLC et al.*, (Eastern District of Virginia)
Office Action dated Sep. 1, 2015 from Canadian Application No. 2,897,462.
Office Action dated Aug. 5, 2015 from U.S. Appl. No. 13/465,524.
Supplemental Notice of Allowability dated Aug. 31, 2015 from U.S. Appl. No. 12/572,202.
Notice of Allowance and Issue Fee Due dated Jul. 31, 2015 from U.S. Appl. No. 12/571,356.
Examiners Answer to Appeal Brief dated Aug. 28, 2015 from U.S. Appl. No. 12/543,849.
Examiners Answer to Appeal Brief dated Aug. 20, 2015 from U.S. Appl. No. 12/432,909.
Examiners Answer to Appeal Brief dated Aug. 20, 2015 from U.S. Appl. No. 12/537,732.
Office Action dated Aug. 11, 2015 from U.S. Appl. No. 12/537,917.
Notice of Allowance dated Aug. 7, 2015 from U.S. Appl. No. 12/572,202.

\* cited by examiner

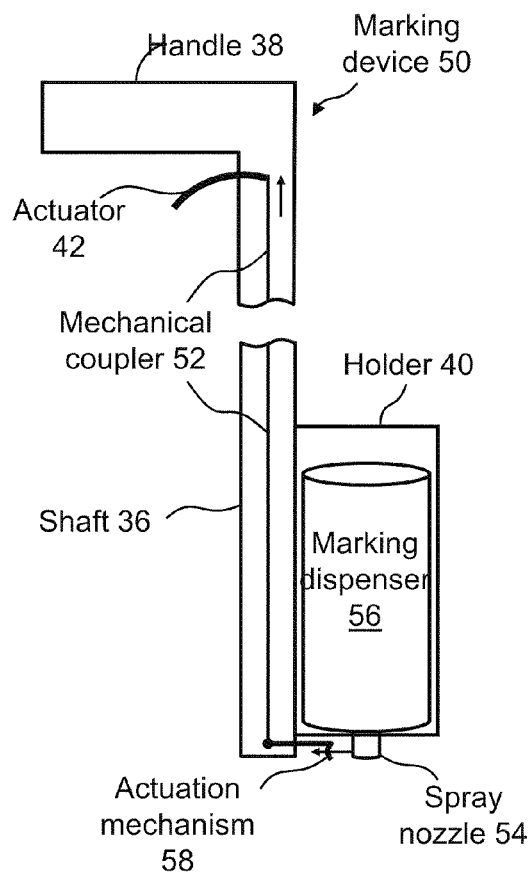
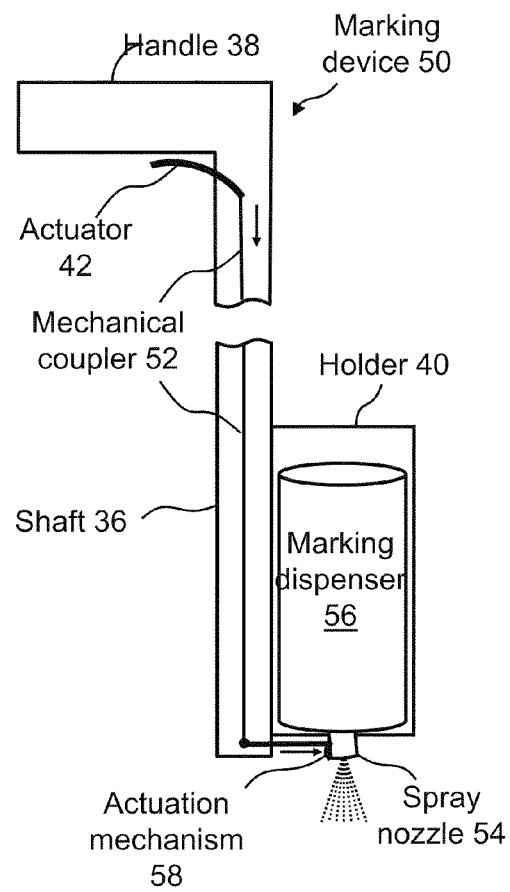
FIG. 3A
(Prior Art)
FIG. 3B
(Prior Art)

METHODS AND APPARATUS FOR MANAGING LOCATE AND/OR MARKING OPERATIONS

CROSS-REFERENCE TO RELATED APPLICATION

The application claims the benefit, under 35 U.S.C. §120, as a continuation (CON) of U.S. Non-provisional application Ser. No. 12/704,485, entitled "Management System, and Associated Methods and Apparatus, for Providing Improved Visibility, Quality Control and Audit Capability for Underground Facility Locate and/or Marking Operations," filed Feb. 11, 2010.

U.S. Ser. No. 12/704,485 claims a priority benefit, under 35 U.S.C. §119(a), to Canadian application serial no. 2,691,780, entitled "Management System, and Associated Methods and Apparatus, for Providing Improved Visibility, Quality Control and Audit Capability for Underground Facility Locate and/or Marking Operations," filed on Feb. 10, 2010.

U.S. Ser. No. 12/704,485 claims a priority benefit, under 35 U.S.C. §119(e), to U.S. provisional application Ser. No. 61/151,826, entitled "Management System for Providing Improved Visibility, Quality Control and Audit Capability for Underground Facility Locate Applications," filed on Feb. 11, 2009.

Each of the above-identified applications is hereby incorporated herein by reference.

BACKGROUND

Field service operations may be any operation in which companies dispatch technicians and/or other staff to perform certain activities, for example, installations, services and/or repairs. Field service operations may exist in various industries, examples of which include, but are not limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site. In some instances, a locate operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

FIG. 1 illustrates an example in which a locate operation is initiated as a result of an excavator 110 providing an excavation notice to a one-call center 120. An excavation notice also is commonly referred to as a "locate request," and may be provided by the excavator to the one-call center via an electronic mail message, information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Using the information provided in a locate request for planned excavation or design projects, the one-call center identifies certain underground facilities that may be present at the indicated work site. For this purpose, many one-call centers typically maintain a collection "polygon maps" which indicate, within a given geographic area over which the one-call center has jurisdiction, generally where underground facilities may be found relative to some geographic reference frame or coordinate system.

Polygon maps typically are provided to the one-call centers by underground facilities owners within the jurisdiction of the one call center ("members" of the one-call center). A one-call center first provides the facility owner/member with one or more maps (e.g., street or property maps) within the jurisdiction, on which are superimposed some type of grid or coordinate system employed by the one-call center as a geographic frame of reference. Using the maps provided by the one-call center, the respective facilities owners/members draw one or more polygons on each map to indicate an area within which their facilities generally are disposed underground (without indicating the facilities themselves). These polygons themselves do not precisely indicate geographic locations of respective underground facilities; rather, the area enclosed by a given polygon generally provides an over-inclusive indication of where a given facilities owner's underground facilities are disposed. Different facilities owners/members may draw polygons of different sizes around areas including their underground facilities, and in some instances such polygons can cover appreciably large geographic regions (e.g., an entire subdivision of a residential area), which may further obfuscate the actual/precise location of respective underground facilities.

Based on the polygon maps collected from the facilities owners/members, the one-call center may in some instances create composite polygon maps to show polygons of multiple different members on a single map. Whether using single member or composite polygon maps, the one-call center examines the address or location information provided in the locate request and identifies a significant buffer zone around an identified work site so as to make an over-inclusive identification of facilities owners/members that may have underground facilities present (e.g., to err on the side of caution). In particular, based on this generally over-inclusive buffer zone around the identified work site (and in some instances significantly over-inclusive buffer zone), the one-call center consults the polygon maps to identify which member polygons intersect with all or a portion of the buffer zone so as to notify these underground facility owners/members and/or their agents of the proposed excavation or design project. Again, it should be appreciated that the buffer zones around an indicated work site utilized by one-call centers for this purpose typically embrace a geographic area that includes but goes well beyond the actual work site, and in many cases the geographic area enclosed by a buffer zone is significantly larger than the actual dig area in which excavation or other similar activities are planned. Similarly, as noted above, the area enclosed by a given member polygon generally does not provide a precise indication of where one or more underground facilities may in fact be found.

In some instances, one-call centers may also or alternatively have access to various existing maps of underground facilities in their jurisdiction, referred to as "facilities maps." Facilities maps typically are maintained by facilities owners/members within the jurisdiction and show, for respective different utility types, where underground facilities purportedly may be found relative to some geographic reference frame or coordinate system (e.g., a grid, a street or property map, GPS latitude and longitude coordinates, etc.). Facilities maps generally provide somewhat more detail than polygon maps provided by facilities owners/members; however, in some instances the information contained in facilities maps may not be accurate and/or complete. For at least this reason, whether using polygon maps or facilities maps, as noted above the one-call center utilizes a significant buffer zone around an identified work site so as to make an over-inclusive identification of facilities owners/members that may have underground facilities present.

Once facilities implicated by the locate request are identified by a one-call center (e.g., via the polygon map/buffer zone process), the one-call center generates a "locate request ticket" (also known as a "locate ticket," or simply a "ticket"). The locate request ticket essentially constitutes an instruction to inspect a work site and typically identifies the work site of the proposed excavation or design and a description of the dig area, typically lists on the ticket all of the underground facilities that may be present at the work site (e.g., by providing a member code for the facility owner whose polygon falls within a given buffer zone), and may also include various other information relevant to the proposed excavation or design (e.g., the name of the excavation company, a name of a property owner or party contracting the excavation company to perform the excavation, etc.). The one-call center sends the ticket to one or more underground facility owners 140 and/or one or more locate service providers 130 (who may be acting as contracted agents of the facility owners) so that they can conduct a locate and marking operation to verify a presence or absence of the underground facilities in the dig area. For example, in some instances, a given underground facility owner 140 may operate its own fleet of locate technicians (e.g., locate technician 145), in which case the one-call center 120 may send the ticket to the underground facility owner 140. In other instances, a given facility owner may contract with a locate service provider to receive locate request tickets and perform a locate and marking operation in response to received tickets on their behalf.

Upon receiving the locate request, a locate service provider or a facility owner (hereafter referred to as a "ticket recipient") may dispatch a locate technician to the work site of planned excavation to determine a presence or absence of one or more underground facilities in the dig area to be excavated or otherwise disturbed. A typical first step for the locate technician includes utilizing an underground facility "locate device," which is an instrument or set of instruments (also referred to commonly as a "locate set") for detecting facilities that are concealed in some manner, such as cables and pipes that are located underground. The locate device is employed by the technician to verify the presence or absence of underground facilities indicated in the locate request ticket as potentially present in the dig area (e.g., via the facility owner member codes listed in the ticket). This process is often referred to as a "locate operation."

In one example of a locate operation, an underground facility locate device is used to detect electromagnetic fields that are generated by an applied signal provided along a length of a target facility to be identified. In this example, a locate device may include both a signal transmitter to provide the applied signal (e.g., which is coupled by the locate technician to a tracer wire disposed along a length of a facility), and a signal receiver which is generally a hand-held apparatus carried by the locate technician as the technician walks around the dig area to search for underground facilities. FIG. 2 illustrates a conventional locate device 1500 (indicated by the dashed box) that includes a transmitter 1505 and a locate receiver 1510. The transmitter 1505 is connected, via a connection point 1525, to a target object (in this example, underground facility 1515) located in the ground 1520. The transmitter generates the applied signal 1530, which is coupled to the underground facility via the connection point (e.g., to a tracer wire along the facility), resulting in the generation of a magnetic field 1535. The magnetic field in turn is detected by the locate receiver 1510, which itself may include one or more detection antenna (not shown). The locate receiver 1510 indicates a presence of a facility when it detects electromagnetic fields arising from the applied signal 1530. Conversely, the absence of a signal detected by the locate receiver generally indicates the absence of the target facility.

In yet another example, a locate device employed for a locate operation may include a single instrument, similar in some respects to a conventional metal detector. In particular, such an instrument may include an oscillator to generate an alternating current that passes through a coil, which in turn produces a first magnetic field. If a piece of electrically conductive metal is in close proximity to the coil (e.g., if an underground facility having a metal component is below/near the coil of the instrument), eddy currents are induced in the metal and the metal produces its own magnetic field, which in turn affects the first magnetic field. The instrument may include a second coil to measure changes to the first magnetic field, thereby facilitating detection of metallic objects.

In addition to the locate operation, the locate technician also generally performs a "marking operation," in which the technician marks the presence (and in some cases the absence) of a given underground facility in the dig area based on the various signals detected (or not detected) during the locate operation. For this purpose, the locate technician conventionally utilizes a "marking device" to dispense a marking material on, for example, the ground, pavement, or other surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

FIGS. 3A and 3B illustrate a conventional marking device 50 with a mechanical actuation system to dispense paint as a marker. Generally speaking, the marking device 50 includes a handle 38 at a proximal end of an elongated shaft 36 and resembles a sort of "walking stick," such that a technician may operate the marking device while standing/walking in an upright or substantially upright position. A marking dispenser holder 40 is coupled to a distal end of the shaft 36 so as to contain and support a marking dispenser 56, e.g., an aerosol paint can having a spray nozzle 54. Typically, a marking dispenser in the form of an aerosol paint can is placed into the holder 40 upside down, such that the spray nozzle 54 is proximate to the distal end of the shaft (close to the ground, pavement or other surface on which markers are to be dispensed).

In FIGS. 3A and 3B, the mechanical actuation system of the marking device 50 includes an actuator or mechanical trigger 42 proximate to the handle 38 that is actuated/triggered by the technician (e.g., via pulling, depressing or squeezing with fingers/hand). The actuator 42 is connected to a mechanical coupler 52 (e.g., a rod) disposed inside and along a length of the elongated shaft 36. The coupler 52 is in turn connected to an actuation mechanism 58, at the distal end of the shaft 36, which mechanism extends outward from the shaft in the direction of the spray nozzle 54. Thus, the actuator 42, the mechanical coupler 52, and the actuation mechanism 58 constitute the mechanical actuation system of the marking device 50.

FIG. 3A shows the mechanical actuation system of the conventional marking device 50 in the non-actuated state, wherein the actuator 42 is "at rest" (not being pulled) and, as a result, the actuation mechanism 58 is not in contact with the spray nozzle 54. FIG. 3B shows the marking device 50 in the actuated state, wherein the actuator 42 is being actuated (pulled, depressed, squeezed) by the technician. When actuated, the actuator 42 displaces the mechanical coupler 52 and the actuation mechanism 58 such that the actuation mechanism contacts and applies pressure to the spray nozzle 54, thus causing the spray nozzle to deflect slightly and dispense paint. The mechanical actuation system is spring-loaded so that it automatically returns to the non-actuated state (FIG. 3A) when the actuator 42 is released.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process. At the same time, in some contexts a locate operation is identified separately from a marking operation, wherein the former relates more specifically to detection-related activities and the latter relates more specifically to marking-related activities.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the entity who dispatched the technician (e.g., locate contractor, facility owner, municipality, etc.) may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

SUMMARY

Entities that oversee the performance of locate operations, such as locate contractors, facility owners, and municipalities, may manage locate technician work forces of various sizes. Applicants have recognized and appreciated that even for relatively modest-sized technician work forces, implementing and performing meaningful oversight and quality control activities in a timely fashion in connection with locate operations may be difficult; for example, each technician may be assigned numerous locate tickets to complete during the course of a given time period, and may cover appreciable geographic territory.

Conventionally, at best there are limited oversight and/or quality control activities in connection with underground facility locate operations, and in many instances there are no quality control activities whatsoever. As a result, in some cases locate operations may not even be performed pursuant to issued tickets (e.g., technicians don't go to work sites); in other instances, poor performance, increased risk of damage to facilities, and/or a failure to comply with various regulations or contract requirements may go undetected, thereby adversely affecting customer satisfaction. Perhaps more importantly, locate operations that are not in fact performed pursuant to issued tickets, or poorly performed and/or poorly managed locate operations, may jeopardize public safety and/or the safety of workers in and around work sites, and may lead to wide scale utility outages having dramatic economic impact on businesses and communities. Additionally, the time, effort and cost that is associated with re-performing work in the field requiring correction and/or improvement of poorly performed locate operations may be unacceptable.

Moreover, data and infrastructure generally is lacking to facilitate tracking activities and processes in conventional underground facility locate operations and other field service operations. Consequently, in order to provide improved oversight and quality control, improved instrumentation is required so as to acquire and communicate relevant data pertaining to operations, as well as computer-implemented methods (e.g., computing devices executing software applications) for effectively and efficiently acquiring, analyzing and processing relevant data, and communicating relevant information pursuant to such analysis at multiple operational levels (e.g., regulators, auditors, management, supervisors, technicians) and/or with all interested parties (excavators or other requesting parties, one-call centers and their members, municipalities, facility owners, locate contractors, locate technicians).

Accordingly, a need exists for ways of providing oversight, quality control and proof of compliance with applicable regulations and relevant customer-supplier agreements in field service applications in order to remove uncertainty, improve customer satisfaction, identify and reduce the number of poorly performed field calls, and improve management's visibility into the activities of its distributed workforce operations. More specifically, a need exists for improved approaches to quality control in the underground facility locate industry in order to improve customer satisfaction, prove performance of relevant customer-supplier agreements, insure compliance with applicable federal, state or local regulations and reduce the risk of damage to underground facilities due to poorly performed underground facility locate operations.

In view of the foregoing, various embodiments disclosed herein relate to inventive systems, methods and apparatus for managing locate operations (i.e., locate and/or marking operations) to identify (e.g., detect and/or mark) a presence or absence of one or more underground facilities within a dig area. In various aspects described herein, the systems, methods and apparatus according to the present invention provide a holistic approach to management and oversight of locate operations in one or more of the following ways:

Improving initial requests to perform locate operations (e.g., by including image information and/or geospatial metadata relating to the work site/dig areas in which operations are to be performed);

Intelligently processing and assessing locate requests (e.g., assessing work scope, risk, complexity, etc., and appropriately allocating available technician resources);

Effectively and efficiently dispatching technicians in response to requests (e.g., based on multi-day performance windows, shift information relating to available technician resources, technician skill set and history, job complexity, etc.);

Providing process guides to technicians to facilitate locate operations (e.g., locally displaying ticket information on locating equipment used in the field, and/or providing checklists or workflows for performing operations);

Acquiring a host of information regarding the performance of locate operations and their environs (e.g., via improved intelligent instrumentation employed by technicians) and/or generating "electronic manifests" of locate operations;

Assessing the quality (e.g., completeness, accuracy, efficiency) of locate operations during performance of operations (e.g., in essentially real-time) and/or upon completion of operations;

Archiving information regarding locate operations and their quality assessments to facilitate auditing of same;

Communicating relevant information to one or more parties associated with locate operations—in particular, apprising requesting parties of the status of ongoing locate operations, confirming with requesting parties that operations have been performed and are completed, and providing requesting parties and/or other interested parties (e.g., regulators, auditors, damage investigators and assessors, etc.) with detailed information regarding the performance of the operation and a quality assessment of same; and Enabling facility owners, locate service providers/contractors, one-call centers, and/or excavators to comply with any applicable reporting requirements regarding their respective activities, facilities, and/or geographic areas under their jurisdiction.

In some exemplary implementations, an improved locate request including image data (and optionally non-image data/information associated with the image data) is electronically created (e.g., by a requesting party, such as an excavator, property owner, facility owner, regulatory authority, damage investigator, etc.), in which one or more dig areas at a work site are identified by one or more dig area indicators superimposed on an image of the work site, so as to create a marked-up image. Such a request may form the basis of a locate request ticket to be forwarded to one or more parties that may have underground facilities in an area surrounding the work site (e.g., via a one-call center polygon map process as discussed above), in which the locate request ticket includes accompanying image data for the dig area indicator(s) and/or the marked-up image itself.

In some implementations, a party receiving such a ticket may parse the ticket to extract relevant information, and/or perform a comprehensive assessment process based on information extracted from the ticket (i.e., "ticket information"), to provide information that can be used to improve activity scheduling, resource allocation, quality control, and/or regulatory compliance. In some aspects, a ticket assessment process may establish the integrity, accuracy, and/or completeness of ticket information in connection with specified location of planned excavation, and provide assessments relating to scope of work (amount and nature of work), complexity involved, duration (amount of time required), risk (potential liability for damages), business value (penalty and/or profitability), and skill/certification requirements for technicians in performing the operation.

In another aspect of the inventive embodiments discussed herein, ticket assessment outcomes may be employed to inform a scheduling process for dispatching technicians. More generally, according to exemplary scheduling processes relating to the management systems and methods disclosed herein, scheduling of technicians and allocation of technicians to particular locate operations may be based at least in part on one or more of: performance deadlines for the operations and relevant shift times of available technicians; various parameters relating to the operations themselves (job performance information and/or quality assessment information), technicians (e.g., historical efficiencies, particular skills/certification, security clearance), and/or relevant environmental conditions (e.g., weather, traffic); ticket assessment outcomes (e.g., risk information; penalty or profitability information; complexity information; technician skill/certification requirements); contractual obligations between the entity dispatching technicians and responsible for/overseeing the locate operations, and one or more parties for which the operation(s) is/are being performed; statutory and/or regulatory requirements, such as wage and hour compliance for resources (e.g., availability of resources for scheduling complies with applicable wage and hour statutes/regulations), and/or the time and/or manner in which a given operation needs to be performed pursuant to applicable statutes/regulations.

In yet other embodiments of management systems and methods, a process guide may be provided to a technician, once dispatched, to facilitate performance of the locate operation. For example, ticket information (which may include an original locate request ticket issued by a one-call center, a work order derived from one or more locate request tickets, or other process guide) may be displayed and/or processed on one or more pieces of locating equipment used in the field by a technician, and/or one or more other computing devices (e.g., tablet computer, personal digital assistant, smart phone, or other portable/handheld computing device). As part of performing the locate operation, the technician may provide some input to generate an electronic record or log of technician activity during the operation. In one exemplary implementation, a process guide in the form of a checklist may be generated (e.g., based at least in part on the ticket information), either at a remote computer and then downloaded to the locating equipment, or generated at the locate equipment itself, and displayed locally to the technician as a guide to perform and verify various aspects of the operation(s). In another exemplary implementation, a set of instructions or "workflow" may be generated (either remotely or on the locate equipment) to guide the technician through a sequence of steps to perform the locate operation. Performance via a process guide (e.g., checklist or workflow) may be interactive in that the technician may provide input, or automated/semi-automated by analyzing various information collected by the locating equipment with respect to the ticket information and/or other available information germane to the operation(s).

With respect to information collected by locating equipment, in various implementations of the inventive concepts disclosed herein, a technician may employ one more pieces of "intelligent locating equipment," e.g., one or more of a marking device, a locate transmitter, a locate receiver, or a combined locate and marking device, that is configured to acquire, store, process, analyze and/or transmit a variety of information germane to the locate operation. In exemplary aspects, such intelligent locating equipment typically comprises a communication interface, memory, one or more processors, a user interface/display device, and one or more input devices/sensors for acquiring various information germane to the operation. Acquired information may be logged into an electronic record stored in memory, analyzed/processed in any of a variety of manners, and/or transmitted to one or more other devices (e.g., remote computers, other locating equipment, etc.). In some implementations, multiple pieces of intelligent locating equipment may be communicatively coupled to each other, as well as one or more other computing devices, and work in tandem to acquire, analyze or otherwise process various information collected in connection with the locate operation.

For example, intelligent locating equipment may be configured with a location tracking system to acquire geo-location data relating to where underground facilities are detected and/or marked. Locate devices may be configured with processor-controlled detection electronics to receive signals relating to facility detection and to analyze one or more characteristics of such signals. Marking devices may be configured with marking material detection mechanisms to provide various information relating to characteristics of marking material dispensed to mark ground, pavement or other surfaces. Both locate and marking devices may be equipped with various environmental and/or operational sensors to acquire information relating to environmental conditions in and around the area of use and/or storage of the locating equipment, and/or operational conditions of the locate equipment itself. Additionally, both locate and marking devices may include one or more input devices to acquire information relating to landmarks in and around the work site. Further, one or both of the user interface and the communication interface of such intelligent locating equipment may serve as conduits for receiving various information relating to the operation; for example, as discussed above, ticket information or other service-related information may be received via the communication interface, and/or entered in via a user interface, and such information may also be logged into an electronic record of the locate operation.

Whether intelligent locating equipment is utilized in the field by a technician, or conventional locating equipment is employed (e.g., as discussed above in connection with FIGS. 2 and 3), in other aspects of the inventive systems, methods and apparatus disclosed herein, an electronic manifest of a locate operation is generated during and/or upon completion of the locate operation to memorialize various aspects of the work performed. In one example of an electronic manifest, a technician may utilize a computing device (e.g., a tablet computer or PC disposed in the technician's vehicle, a portable/handheld device such as personal digital assistant or smart phone, the intelligent locating equipment itself, etc.) to access an electronic manifest application, which provides a digital image of the work site and its surroundings to the technician (via a display of the computing device), together with a drawing tool that allows the technician to mark-up the image to indicate where facilities were detected and/or marked, where landmarks were detected and/or marked, and the like. The electronic manifest application also may be configured to include with the image information, and in some instances allow the technician to provide, other graphic or text based information regarding the operation (e.g., date and timestamp for the locate operation, geographic location/geo-coordinates of the work site/dig area, identifier(s) for the locate technician, facility owner(s), and/or the locate company, etc.).

In some implementations in which the technician employs one or more pieces of intelligent locating equipment, information stored in one or more electronic records of the locating equipment, or information generated in real-time by the locating equipment, may be passed to the electronic manifest application and used to automatically populate/mark-up an image with electronic detection marks, electronic locate marks, and/or electronic landmarks indicating where facilities/landmarks were detected and/or marked. In the event that no underground facilities are found (e.g., a "clear"), in some instances one or more physical locate marks may nonetheless be applied to the dig area to indicate the absence of an underground facility, and as such one or more electronic locate mark indicators may be added to the electronic manifest; however, in other instances, no physical locate marks may be applied to the dig area in the event of a "clear," and accordingly in some cases no electronic locate mark indicators may be added to the electronic manifest in the event of a "clear." In yet another aspect, the image used by the electronic manifest application to create an electronic manifest may be derived from image information included with the original locate request, which image information may include information relating to one or more dig area indicators; in this manner, visual information regarding the locate operation as performed may be superimposed upon an image that includes the dig area indicator(s) provided as part of the original locate request, so as to generate an electronic manifest.

In some implementations, an electronic manifest generated either manually by a technician via a drawing tool, or automatically populated at least in part with information acquired via intelligent locating equipment, may accompany or constitute a "completed" electronic locate request ticket. For purposes of the present disclosure, a "completed" electronic locate request ticket refers to an electronic communication generated by a technician indicating that a locate operation has been attempted or performed, at least to some extent. Accordingly, it should be appreciated that a "completed" ticket does not necessarily imply that a locate operation itself was successfully performed in its entirety (as dictated by one or more locate request tickets), but that it was at least initiated and attempted in some fashion. For example, a technician may be dispatched to a work site, may begin performing a locate operation, and may encounter some unforeseen impediment to completing the operation, or some condition or circumstance that warrants special action or attention. Accordingly, the technician may generate a "completed" ticket that reflects the attempted operation but in some manner reflects the anomalous situation attendant to the attempted locate operation. In any event, according to various embodiments, an electronic manifest, including a marked-up image, and/or any of the data/information associated with the image contents, may be provided as part of, or an attachment to, a completed locate request ticket so as to augment the information content provided pursuant to the locate operation.

In yet other aspects of the inventive systems, methods and apparatus disclosed herein, completed tickets may be reviewed, in essentially real-time during performance of a locate operation, and/or at any time following attempt/completion of a locate operation, to provide a quality assessment of the locate operation (e.g., an assessment of the completeness, accuracy, and/or efficiency of the operation). Quality assessment processes according to various embodiments may be primarily under the discretion of a human reviewer, albeit facilitated in some respects by computer-aided display of information, and electronic record keeping and communication functions associated with the quality assessment result(s). In other embodiments, information related to a locate operation (e.g., electronic manifest information accompanying or constituting a completed ticket) is electronically analyzed such that a quality assessment is based at least in part on some predetermined criteria and/or metrics that facilitate an automated determination of quality assessment. In one aspect, if the locate operation represented by the completed ticket complies with a predetermined quality standard (e.g., based on predetermined criteria and/or metrics), the locate operation may be "approved" (e.g., a quality assessment process/engine may generate an "approved completed locate request ticket"). In another aspect, real-time quality assessment during performance of a locate operation may facilitate identification of risks or problems that may be flagged for proactive corrective action (e.g., immediately, or as soon as practicable).

In yet other aspects, various quality assessment functions may be implemented in a centralized or distributed fashion. For example, in one implementation, a central server or other computing device(s) operated by a locate service provider or other entity may collect relevant information from the field relating to locate operations and perform quality assessments of same. In another implementation, intelligent locating equipment may be configured to perform some degree of quality assessment local to the work site; for example, intelligent locating equipment may be configured to acquire information about the locate operation and its environs, compare elements of acquired information to various criteria relating to functionality and/or use of the locating equipment, and/or one or more environmental conditions proximate to the locating equipment and/or work site in which it is being used, and provide one or more local alerts (e.g., visual, audible, and/or tactile indications) to a technician to indicate any detected out-of-tolerance conditions. Such locally detected conditions also may be transmitted by intelligent locating equipment to one or more other pieces of intelligent locate equipment in the area, and or one or more remote computing devices, for further and/or corroborative quality assessment or other analysis. In this fashion, a host of quality assessment functionality may be facilitated at various organizational levels, and/or amongst multiple distributed computing resources.

In other aspects, any information acquired in connection with the locate operation (e.g., electronic records acquired by intelligent locating equipment, electronic manifests), as well as quality assessment results, may be archived (e.g., in a database and/or central data store) for future reference/access by various parties that may be interested in such information (e.g., excavators, one-call centers, facility owners, locate contractors, municipalities, regulatory authorities, damage investigators/assessors, insurance companies, etc.). In particular, any information relating to an approved completed locate request ticket may be electronically transmitted and/or electronically stored so as to provide a searchable, secure, and unalterable electronic record of the locate operation (e.g., using any of a variety of conventionally available encryption algorithms, such as TripleDES/TDEA, or the Blowfish keyed symmetric block cipher). Such an electronic record provides for improved visibility, quality control and audit capability for underground facility locate operations.

In yet other embodiments of management systems and methods according to the present invention, at one or more points during the processes discussed above, one or more "positive response" notifications indicating a status of the locate operation and/or disposition of the technician, and/or more detailed information about the progress of the locate operation, may be electronically transmitted and/or stored so as to inform at least one party associated with requesting the operation of the status of the operation and/or details thereof. In one aspect, a requesting party may designate a particular format, content, and/or method of receiving notifications regarding the locate operation. In another aspect, a computer-generated GUI may be provided to facilitate submission of locate requests, generation of image information to indicate one or more dig areas on a digital image of a work site as part of a locate request, and/or selection of notifications and preferences for same. In yet another aspect, a requesting party may provide an acknowledgement of receipt (e.g., a "return receipt") for one or more received notifications.

In sum, one embodiment of the present invention is directed to an apparatus for managing a locate operation. The locate operation comprises identifying, in response to a locate request ticket, a presence or an absence of at least one underground facility within a dig area, wherein at least a portion of the dig area may be excavated or disturbed during excavation activities. The apparatus comprises a communication interface, a memory to store processor-executable instructions, and a processing unit coupled to the communication interface and the memory. Upon execution of the processor-executable instructions by the processing unit, the processing unit: controls the communication interface to electronically receive the locate request ticket identifying the dig area, the locate request ticket including image data associated with the dig area, wherein the image data includes a marked-up image of a geographic area including the dig area, the marked-up image including at least one dig area indicator to provide an indication of the dig area; controls the communication interface to transmit the locate request ticket to at least one locate personnel device; controls the communication interface to receive from the at least one locate personnel device a completed locate request ticket, the completed locate request ticket including an updated marked-up image, the updated marked-up image including the at least one dig area indicator and at least one locate mark indicator to digitally represent a location of at least one physical locate mark applied to the dig area during the locate operation; processes the completed locate request ticket and electronically marks the completed locate request ticket as approved if the locate operation represented by the completed locate request ticket complies with a predetermined quality standard, so as to provide an approved completed locate request ticket; and controls the communication interface and/or the memory to electronically transmit and/or electronically store information relating to the approved completed locate request ticket so as to provide a searchable electronic record of the locate operation.

Another embodiment is directed to at least one computer-readable medium encoded with instructions that, when executed on at least one processing unit, perform a method for managing a locate operation. The locate operation comprises identifying, in response to a locate request ticket, a presence or an absence of at least one underground facility within a dig area, wherein at least a portion of the dig area may be excavated or disturbed during excavation activities. The method comprises: A) electronically receiving the locate request ticket identifying the dig area, the locate request ticket including image data associated with the dig area, wherein the image data includes a marked-up image of a geographic area including the dig area, the marked-up image including at least one dig area indicator to provide an indication of the dig area; B) transmitting the locate request ticket received in A) to at least one locate personnel device; C) receiving from the at least one locate personnel device a completed locate request ticket, the completed locate request ticket including an updated marked-up image, the updated marked-up image including the at least one dig area indicator and at least one locate mark indicator to digitally represent a location of at least one physical locate mark applied to the dig area during the locate operation; D) electronically marking the completed locate request ticket as approved if the locate operation represented by the completed locate request ticket complies with a predetermined quality standard, so as to provide an approved completed locate request ticket; and E) electronically transmitting and/or electronically storing information relating to the approved completed locate request ticket so as to provide a searchable electronic record of the locate operation.

Another embodiment is directed to a method for managing a locate operation. The locate operation comprises identifying, in response to a locate request ticket, a presence or an absence of at least one underground facility within a dig area, wherein at least a portion of the dig area may be excavated or disturbed during excavation activities. The method comprises: A) electronically receiving the locate request ticket identifying the dig area, the locate request ticket including image data associated with the dig area, wherein the image data includes a marked-up image of a geographic area including the dig area, the marked-up image including at least one dig area indicator to provide an indication of the dig area; B) transmitting the locate request ticket received in A) to at least one locate personnel device; C) receiving from the at least one locate personnel device a completed locate request ticket, the completed locate request ticket including an updated marked-up image, the updated marked-up image including the at least one dig area indicator and at least one locate mark indicator to digitally represent a location of at least one physical locate mark applied to the dig area during the locate operation; D) electronically marking the completed locate request ticket as approved if the locate operation represented by the completed locate request ticket complies with a predetermined quality standard, so as to provide an approved completed locate request ticket; and E) electronically transmitting and/or electronically storing information relating to the approved completed locate request ticket so as to provide a searchable electronic record of the locate operation.

Another embodiment is directed to an apparatus for managing a locate operation. The locate operation comprises identifying, in response to a locate request ticket, a presence or an absence of at least one underground facility within a dig area, wherein at least a portion of the dig area may be excavated or disturbed during excavation activities. The apparatus comprises a communication interface; a memory to store processor-executable instructions; and a processing unit coupled to the communication interface and the memory. Upon execution of the processor-executable instructions by the processing unit, the processing unit: A) controls the communication interface to electronically receive the locate request ticket identifying the dig area, the locate request ticket including image data associated with the dig area, wherein the image data includes a marked-up image of a geographic area including the dig area, the marked-up image including at least one dig area indicator to provide an indication of the dig area; B) controls the communication interface to transmit the locate request ticket to at least one locate personnel device; C) controls the communication interface to receive from the at least one locate personnel device a completed locate request ticket, the completed locate request ticket including image data and non-image data associated with the locate operation, the non-image data including at least one of: a timestamp for the locate operation; geographic information associated with the dig area; and at least one identifier for a locate technician and/or a locate company; D) processes the completed locate request ticket and electronically marks the completed locate request ticket as approved if the locate operation represented by the completed locate request ticket complies with a predetermined quality standard, so as to provide an approved completed locate request ticket; and E) controls the communication interface and/or the memory to electronically transmit and/or electronically store information relating to the approved completed locate request ticket so as to provide a searchable electronic record of the locate operation.

Another embodiment is directed to a method for performing a locate operation. The locate operation comprises identifying, in response to at least one locate request ticket, a presence or an absence of at least one underground facility within a dig area, wherein at least a portion of the dig area may be excavated or disturbed during excavation activities. The method comprises: A) electronically receiving the at least one locate request ticket identifying the dig area, the at least one locate request ticket including image data associated with the dig area, wherein the image data includes at least one marked-up image of a geographic area including the dig area, the at least one marked-up image including at least one dig area indicator to provide an indication of the dig area; B) inspecting the dig area based at least in part on the at least one dig area indicator in the at least one marked-up image received in A) so as to determine the presence or the absence of the at least one underground facility; C) if the presence of the at least one underground facility is determined, using a marking device to physically mark the dig area with at least one physical locate mark to indicate the presence of the at least one underground facility; D) adding to the at least one marked-up image at least one locate mark indicator to digitally represent a location of the at least one physical locate mark on the at least one marked-up image, together with the at least one dig area indicator, so as to generate a completed locate request ticket including the at least one marked-up image; E) reviewing the completed locate request ticket and, if the locate operation represented by the completed locate request ticket complies with a predetermined quality standard, electronically marking the completed locate request ticket as approved so as to provide an approved completed locate request ticket; and F) electronically transmitting and/or electronically storing information relating to the approved completed locate request ticket so as to provide a searchable electronic record of the locate operation. In one aspect, prior to D), the method comprises: D1) electronically receiving from the marking device location information regarding the location of the at least one physical locate mark applied in C), wherein D) comprises adding the at least one locate mark indicator to the at least one marked-up image based at least in part on the location information received in D1).

Another embodiment is directed to a method for performing a locate operation. The locate operation comprises identifying, in response to at least one locate request ticket, a presence or an absence of at least one underground facility within a dig area, wherein at least a portion of the dig area may be excavated or disturbed during excavation activities. The method comprises: A) electronically receiving the at least one locate request ticket identifying the dig area, the at least one locate request ticket including image data associated with the dig area, wherein the image data includes at least one marked-up image of a geographic area including the dig area, the at least one marked-up image including at least one dig area indicator to provide an indication of the dig area; B) adding to the at least one marked-up image at least one locate mark indicator to digitally represent a location of the at least one physical locate mark on the at least one marked-up image, together with the at least one dig area indicator, so as to generate a completed locate request ticket including the at least one marked-up image; C) reviewing the completed locate request ticket and, if the locate operation represented by the completed locate request ticket complies with a predetermined quality standard, electronically marking the completed locate request ticket as approved so as to provide an approved completed locate request ticket; and D) electronically transmitting and/or electronically storing information relating to the approved completed locate request ticket so as to provide a searchable electronic record of the locate operation.

Another embodiment is directed to an apparatus for managing a locate operation. The locate operation comprises identifying, in response to a locate request ticket, a presence or an absence of at least one underground facility within a dig area, wherein at least a portion of the dig area may be excavated or disturbed during excavation activities. The apparatus comprises: a communication interface; a memory to store processor-executable instructions; and a processing unit coupled to the communication interface and the memory. Upon execution of the processor-executable instructions by the processing unit, the processing unit: generates the locate request ticket identifying the dig area, the locate request ticket including image data associated with the dig area, wherein the image data includes a marked-up image of a geographic area including the dig area, the marked-up image including at least one dig area indicator to provide an indication of the dig area; controls the communication interface to transmit the locate request ticket to at least one locate personnel device; controls the communication interface to receive from the at least one locate personnel device a completed locate request ticket, the completed locate request ticket including an updated marked-up image, the updated marked-up image including the at least one dig area indicator and at least one locate mark indicator to digitally represent a location of at least one physical locate mark applied to the dig area during the locate operation; processes the completed locate request ticket and electronically marks the completed locate request ticket as approved if the locate operation represented by the completed locate request ticket complies with a predetermined quality standard, so as to provide an approved completed locate request ticket; and controls the communication interface and/or the memory to electronically transmit and/or electronically store information relating to the approved completed locate request ticket so as to provide a searchable electronic record of the locate operation.

Another embodiment is directed to at least one computer-readable medium encoded with instructions that, when executed on at least one processing unit, perform a method for managing a locate operation. The locate operation comprises identifying, in response to a locate request ticket, a presence or an absence of at least one underground facility within a dig area, wherein at least a portion of the dig area may be excavated or disturbed during excavation activities. The method comprises: A) generating the locate request ticket identifying the dig area, the locate request ticket including image data associated with the dig area, wherein the image data includes a marked-up image of a geographic area including the dig area, the marked-up image including at least one dig area indicator to provide an indication of the dig area; B) transmitting the locate request ticket received in A) to at least one locate personnel device; C) receiving from the at least one locate personnel device a completed locate request ticket, the completed locate request ticket including an updated marked-up image, the updated marked-up image including the at least one dig area indicator and at least one locate mark indicator to digitally represent a location of at least one physical locate mark applied to the dig area during the locate operation; D) electronically marking the completed locate request ticket as approved if the locate operation represented by the completed locate request ticket complies with a predetermined quality standard, so as to provide an approved completed locate request ticket; and E) electronically transmitting and/or electronically storing information relating to the approved completed locate request ticket so as to provide a searchable electronic record of the locate operation.

Another embodiment is directed to a method for managing a locate operation. The locate operation comprises identifying, in response to a locate request ticket, a presence or an absence of at least one underground facility within a dig area, wherein at least a portion of the dig area may be excavated or disturbed during excavation activities. The method comprises: A) generating the locate request ticket identifying the dig area, the locate request ticket including image data associated with the dig area, wherein the image data includes a marked-up image of a geographic area including the dig area, the marked-up image including at least one dig area indicator to provide an indication of the dig area; B) transmitting the locate request ticket received in A) to at least one locate personnel device; C) receiving from the at least one locate personnel device a completed locate request ticket, the completed locate request ticket including an updated marked-up image, the updated marked-up image including the at least one dig area indicator and at least one locate mark indicator to digitally represent a location of at least one physical locate mark applied to the dig area during the locate operation; D) electronically marking the completed locate request ticket as approved if the locate operation represented by the completed locate request ticket complies with a predetermined quality standard, so as to provide an approved completed locate request ticket; and E) electronically transmitting and/or electronically storing information relating to the approved completed locate request ticket so as to provide a searchable electronic record of the locate operation.

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device for detecting and/or inferring the presence or absence of any facility, including without limitation, any underground facility. In various examples, a locate device may include both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory. In the case of a locate device or other locate mechanism (e.g., to physically locate a facility or other feature), actuation may cause a detected signal strength, signal frequency, depth, or other information relating to the locate operation to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The following U.S. published applications are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled, "Marker Detection Mechanisms for use in Marking Devices And Methods of Using Same;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;" and U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The present disclosure, both as to its organization and manner of operation, together with further objectives and advantages, may be best understood by reference to the following description, taken in connection with the accompanying drawings as set forth below. The drawings are not necessarily to scale, emphasis instead generally being placed upon illustrating the principles of various inventive embodiments.

FIGS. 3A and 3B illustrate a conventional marking device in an actuated and non-actuated state, respectively;

DETAILED DESCRIPTION

Figure 1:
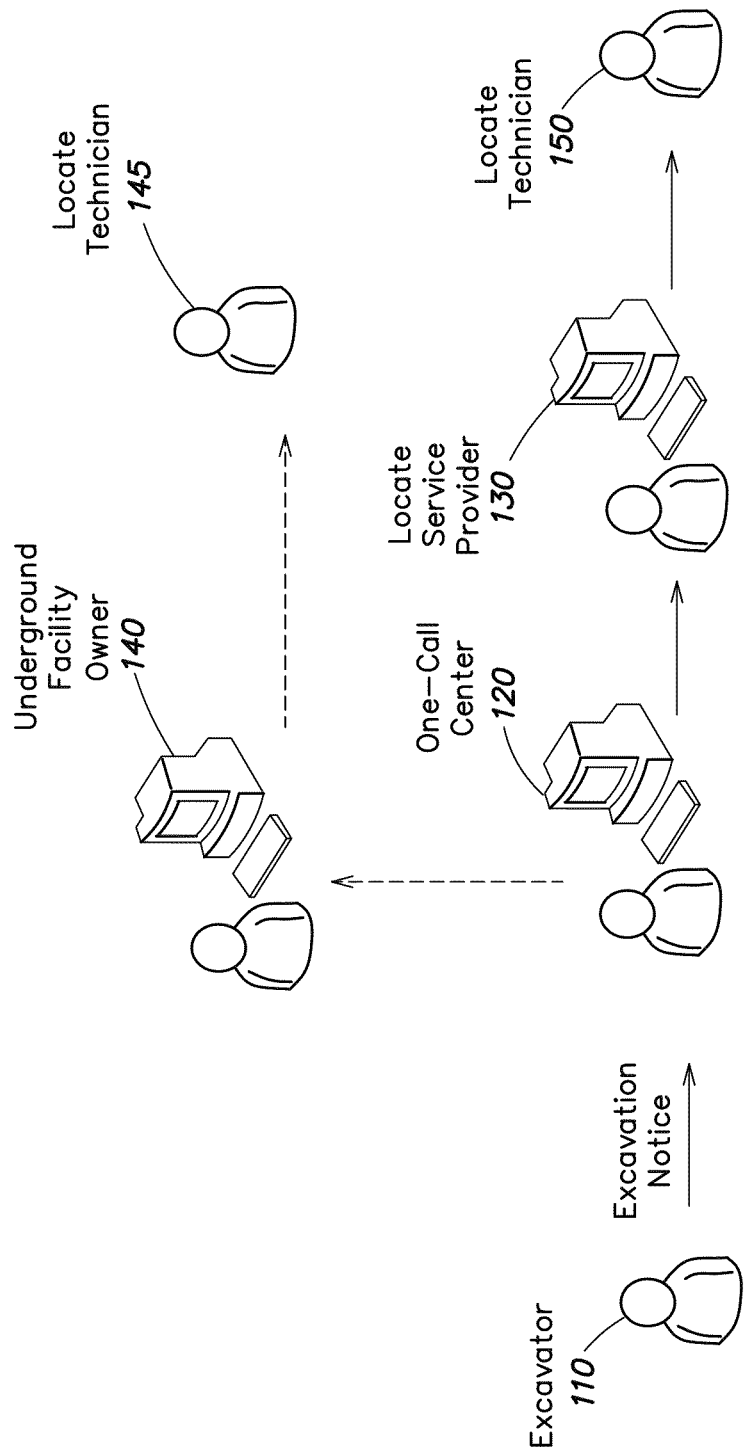
FIG. 1 shows an example in which a locate and marking operation is initiated as a result of an excavator providing an excavation notice to a one-call center.

Various embodiments of the present invention relate to a management system, and associated methods and apparatus, for providing increased visibility, improved quality control, proof of compliance and/or significant audit capability for underground facility locate operations. In various aspects described in detail herein, such systems, methods and apparatus in some instances employ improved instrumentation for performing locate operations to facilitate data acquisition, storage and analysis, as well as an improved communication infrastructure amongst various parties/entities with interest in, or otherwise related to, locate operations. Example of such parties/entities include, but are not limited to, excavators, property owners, municipalities, facility owners, locate contractors, regulatory authorities, industry associations (e.g., industry consortia or alliances), insurance companies, damage investigators (assessors/adjustors), and auditors.

In particular, facilities locate management systems and associated methods and apparatus according to various embodiments disclosed herein provide communication infrastructure, software applications and computing devices, and various instruments for providing oversight and quality control across substantially the full scope of the underground facility locate process. Methods and apparatus disclosed herein encompass a broad management process associated with locate operations, which process may include, but is not limited to, one or more of: 1) submission of locate requests to a one-call center; 2) generation of locate request tickets ("tickets") based on locate requests, and transmission of such tickets to various parties (locate contractors/service providers, utility owners, municipalities overseeing locate operations in their jurisdiction, technicians in the field, etc.); 3) assessment of locate request tickets to appropriately allocate technician resources; 4) dispatching of technicians to perform locate operations pursuant to tickets; 5) provision of process guides and/or locally displayed information to facilitate technician performance of operations; 6) acquisition of various information in connection with performance of locate operations (and providing such information in conjunction with, or as part of, a "completed" ticket); 7) quality assessment of operations (e.g., by processing "completed" tickets); 8) archiving of information relating to the locate operations and/or assessment of same; and 9) communication of relevant information to one or more parties associated with the operations (e.g., apprising parties requesting locate operations of the status of operations and/or various information germane to performance). In various exemplary implementations, one or more steps of the management process utilize automated applications and instruments for electronically documenting the work performed, processing and/or analyzing the electronic information, and verifying the work performed in underground facility locate operations.

Following below are more detailed descriptions of various concepts related to, and embodiments of, inventive systems, methods and apparatus for managing locate operations. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

I. Overview

Figure 4:
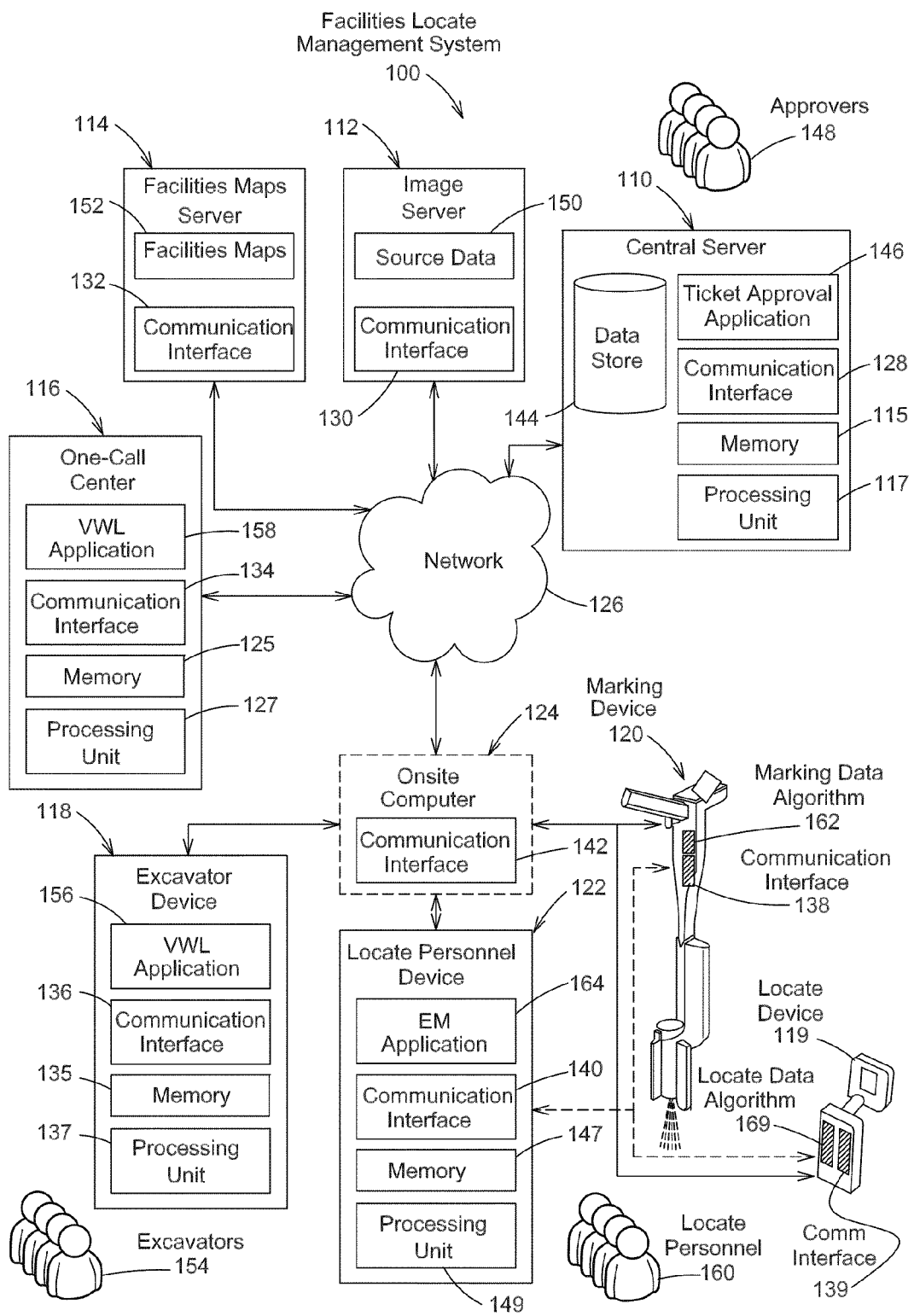
FIG. 4 illustrates a functional block diagram of an example of a facilities locate management system for use in underground facility locate operations, according to one embodiment of the present invention.

FIG. 4 illustrates a functional block diagram of an example of a facilities locate management system 100, according to one embodiment of the present invention, for managing underground facility locate operations. In various aspects, the facilities locate management system 100 includes one or more of various instrumentation (e.g., locating equipment, such as one or more marking devices, one or more locate devices, etc.) and computing devices (e.g., one or more computers, servers, portable/handheld computing devices, etc.), and utilizes available network infrastructure to provide communication of information amongst respective elements of the system and various parties relating to locate operations, from which relevant information may be acquired and/or to which information may be provided. While FIG. 4 illustrates a number of elements/parties that may exchange information with each other as part of implementing the management system 100, it should be appreciated that not all of the elements/parties shown in FIG. 4 are necessarily required to implement the various embodiments discussed herein of managements systems, and associated methods and apparatus. In particular, in various embodiments, different elements shown in FIG. 4, in a variety of combinations, may be employed to realize a particular implementation of a management system according to the present invention.

In general, as shown in FIG. 4, facilities locate management system 100 may include, but is not limited to, a central server 110, one or more locate devices 119, one or more marking devices 120, one or more combined locate and marking devices (not shown), one or more locate personnel devices 122, and an "onsite" computer 124 (e.g., a computing device that may be present at a work site/dig area, e.g., a tablet computer in a vehicle of the technician, a docking station located in the technician's vehicle for securing one or more pieces of locating equipment during transport, etc.). Other elements that may form part of the system 100 or communicate with the system 100 include, but are not limited to, an image server 112, a facilities maps server 114, a one-call center 116, and one or more excavator devices 118. A network 126 provides the communication link between any and/or all elements/entities relating to the facilities locate management system 100. For example, network 126 provides the communication network by which information may be exchanged between central server 110, image server 112, facilities maps server 114, one-call center 116, excavator device(s) 118, locate device(s) 119, marking device(s) 120, locate personnel device(s) 122, and onsite computer(s) 124. Network 126 may be, for example, any local area network (LAN) and/or wide area network (WAN) for connecting to the Internet.

In order to connect to network 126, each element/entity of or communicating with facilities locate management system 100 includes one or more communication interfaces to provide a communication link to and from each entity. For example, a communication interface 128 of central server 110, a communication interface 130 of image server 112, a communication interface 132 of facilities maps server 114, a communication interface 134 of one-call center 116, a communication interface 136 of excavator device 118, a communication interface 138 of marking device 120, a communication interface 139 of locate device 119, a communication interface 140 of locate personnel device 122, and a communication interface 142 of onsite computer 124 may be used in order to provide connectivity to network 126.

Communication interfaces 128, 130, 132, 134, 136, 138, 139, 140, and 142 may be any wired and/or wireless communication interfaces by which information may be exchanged between any entities of facilities locate management system 100. Example wired communication interfaces may include, but are not limited to, USB ports, RS232 connectors, RJ45 connectors, Ethernet, and any combinations thereof. Example wireless communication interfaces may include, but are not limited to, Bluetooth® technology, Wi-Fi, Wi-Max, IEEE 802.11 technology, radio frequency (RF), LAN, WAN, Internet, shared wireless access protocol (SWAP), Infrared Data Association (IrDA) compatible protocols and other types of wireless networking protocols, and any combinations thereof.

As also shown in FIG. 4, each element/entity of facilities locate management system 100 generally includes a memory (e.g., one or more computer-readable storage media) to store processor-executable instructions as well as other data (e.g., see memory 115, 125, 135, 147, 186). Each entity also includes one or more processing units (e.g., a microprocessor, microcontroller, FPGA, etc.; see processing units 117, 127, 137, 149, 184) communicatively coupled to the communication interface and the memory, wherein upon execution of the processor-executable instructions by the processing unit, the processing unit performs a variety of functions as set forth in greater detail below for respective elements/entities. Generally speaking, many of the functionalities described herein and attributed to various elements/entities of or in communication with the management system shown in FIG. 4 may be encoded as processor-executable instructions stored in/on one or more computer-readable storage media.

Facilities locate management system 100 is not limited to the applications and instruments shown in FIG. 4. Any equipment, software or data store that may be useful in an underground facilities locate and/or mapping operation may be included in facilities locate management system 100. Furthermore, the configuration of facilities locate management system 100 is not limited to one instance only of central server 110, image server 112, facilities maps server 114, one-call center 116, excavator device 118, locate device 119, marking device 120, locate personnel device 122, onsite computer 124, as shown in FIG. 4. The system configuration of facilities locate management system 100 that is shown in FIG. 4 is exemplary only. Facilities locate management system 100 may include one or more instances of central server 110, image server 112, facilities maps server 114, one-call center 116, excavator device 118, marking device 120, locate personnel device 122, and onsite computer 124.

Figure 5:
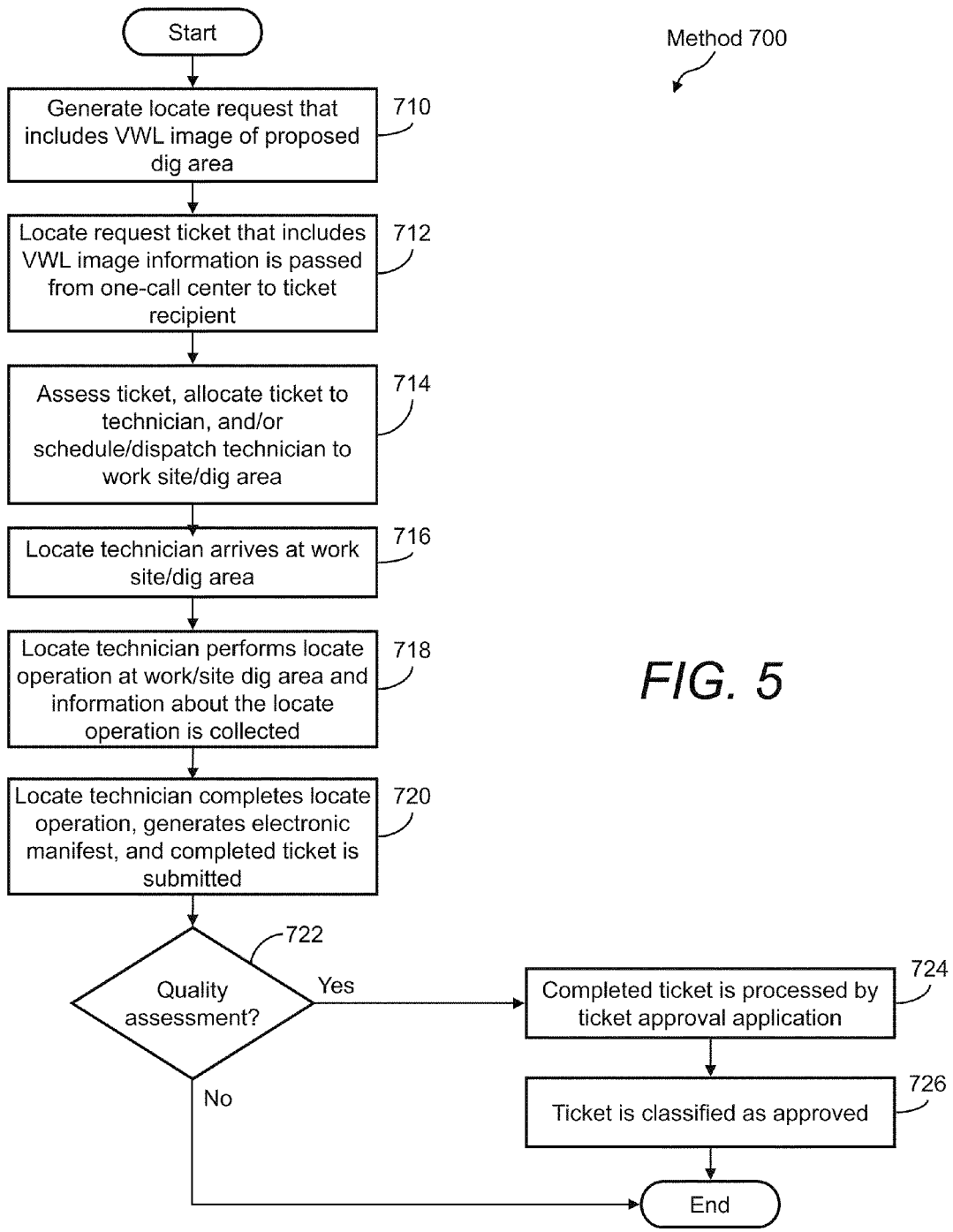
FIG. 5 illustrates a flow chart of a method for managing a locate operation, according to one embodiment of the present invention.

Before providing additional details of respective elements/entities of, or in communication with, the facilities locate management system 100 shown in FIG. 4, FIG. 5 provides a flow chart to graphically illustrate various functionalities that may be generally implemented by such a facilities locate management system, according to various embodiments of the present invention. In particular, FIG. 5 provides a flow chart of an exemplary method 700 for managing a locate operation, that may be implemented in whole or part by a facilities locate management system according to the various concepts disclosed herein.

In the method outlined in FIG. 5, at step 710, a locate request that includes a virtual white line (VWL) image and/or a project request that includes a series of VWL images of the proposed work site(s)/dig area(s), is generated by a party requesting a locate operation (a "requesting party"), and submitted to a one-call center. For example, with reference again to FIG. 4, a certain excavator 154 may use a VWL application 156, as discussed in further detail below, to generate a VWL image and/or series of VWL images and then submit a locate request and/or project request, respectively, to a certain one-call center 116. In exemplary implementations, the VWL image may include a digital image of a geographic area surrounding the work site(s), and may include one or more "dig area indicators" superimposed on the digital image to create a marked-up image indicating one or more dig areas for proposed/planned excavation. In some implementations, rather than or together with the VWL image itself, metadata relating to image contents, i.e., one or more dig area indicators, may be included as part of the locate request.

At step 712, a locate request ticket that includes a VWL image and/or information relating to a VWL image (e.g., metadata for one or more dig area indicators), and/or a project ticket that includes a series of VWL images and/or information relating to the images, is generated by the one-call center 116 and transmitted from the one-call center to a party referred to herein as a "ticket recipient." Examples of ticket recipients include, but are not limited to, one or more locate companies/locate service providers, facility owners (responsible for their own locate operations), and municipalities (also responsible for their own locate operations). For example, in one embodiment, with reference again to FIG. 4, the locate request ticket that is generated in step 710 is transmitted from the one-call center 116 to central server 110 that is maintained/operated by a ticket recipient (e.g., a certain locate company that is to perform the locate operation).

At step 714, one or more applications executing on the central server 110 of the ticket recipient may process incoming tickets to assess various aspects of the requested locate operation (e.g., work scope, risk, complexity, etc.), may consult various information relating to available technician resources (e.g., shift information, technician skill set and history, certification, security clearance, etc.), and may allocate, schedule, and appropriately dispatch one or more technicians to perform a locate operation pursuant to the received ticket. Dispatched technicians may be provided with "ticket information," e.g., various relevant information derived from the received locate request ticket to facilitate performance of the locate operation, upon dispatch, during travel to a work site, upon arrival to the work site, and/or upon use of locating equipment.

At step 716, the locate technician that was dispatched in step 714 arrives at the work site/dig area indicated in the ticket information.

At step 718, the locate technician performs the locate operation at the work site/dig area according to the ticket information. As noted earlier, it should be appreciated that during a given locate operation, underground facilities may or may not be found at the dig area, but that given either a presence or absence of facilities, the performance of the locate operation, including an inspection of the dig area, may be verified as completed by the locate technician. To this end, at step 720, and also with reference again to FIG. 4, the technician may complete an electronic manifest of the locate operation, in which the technician uses a computing device (e.g., locate personnel device 122 or onsite computer 124) to execute an electronic manifest (EM) application 164. Upon execution of the EM application, a digital image of the work site and its surroundings may be received and displayed by the computing device and, using a drawing tool provided by the EM application, the technician may place one or more electronic indications on the digital image to reflect various aspects of the work performed during the locate operation. In step 720, the technician may generate (e.g., transmit back to the central server 110 of the ticket recipient) a "completed" ticket, which may include or have attached thereto the electronic manifest and or information relating to same (e.g., a completed ticket may include one or both of image data and non-image data relating to the locate operation).

At decision step 722, it is determined whether the completed ticket of the current locate operation is to be subjected to a quality assessment process, which may be performed at least in part, for example, at the central server of the ticket recipient. If the completed ticket is to undergo a quality assessment process, method 700 may proceed to step 724; if not, method 700 may proceed to the end.

At step 724, with reference again to FIG. 4, the completed ticket of the current locate operation may be processed by ticket approval application 146 executing on the central server 110. If the completed ticket passes the quality assessment process satisfactorily, method 700 may proceed directly to step 726 with no further action. If, however, the completed ticket does not pass the quality assessment process satisfactorily, some form of quality control action may be taken (e.g., the technician may be re-dispatched to the work site, one or more supervisors may be dispatched to the work site, etc.).

At step 726, the completed ticket of the current locate operation is classified as "approved." In this way, the quality of the locate operation may be certified. While not shown explicitly in FIG. 5, any information relating to the locate operations, such as any information contained in the electronic manifest, and or any quality assessment outcomes resulting from the ticket approval process, may be archived to a data store (e.g., data store 144 of central server 110), and/or may be communicated to any one or more elements/entities shown in FIG. 4 to provide status and/or other information relating to the locate operation. Thus, an approved completed locate request ticket may provide a searchable electronic record of a locate operation, and such a searchable electronic record may provide for improved visibility, quality control and audit capability for underground facility locate operations.

It should be appreciated that while the method 700 provides one exemplary process for managing a locate operation according to the present invention, the underlying functionalities encompassed by the method 700 may be performed by any of the various entities shown in FIG. 4 and associated with the locate operation. For example, rather than a one-call center receiving a locate request including a VWL image from an excavator, the one-call center may receive non-image related information from an excavator or other requesting party and itself generate a locate request ticket including a VWL image, which may then be passed on to a ticket recipient (e.g., a locate company) for performance of the locate operation. Similarly, a locate company may receive non-image related information directly from an excavator or other requesting party regarding a locate operation, and itself generate a locate request ticket including a VWL image, which is then dispatched to technicians to perform the locate operation.

Additionally, as noted above, the one-call center, excavator, or some entity other than the locate company may operate/oversee the central server 110 or a server with similar functionalities, such that various functions attributed above to the central server 110 may instead be performed/managed by the one-call center, excavator, or other entity. For example, in one exemplary implementation, the one-call center (or other entity) may receive information from a locate technician or locate company regarding the performance of a locate operation and the presence or absence of underground facilities, and the one-call center itself may generate an EM image of the locate operation based on this received information, provide relevant non-image data with the image data, and mark a locate request ticket as completed. Furthermore, the one-call center (or other entity) may perform/manage a ticket approval process for ensuring compliance of the locate operation with a predetermined quality standard, and then store and/or transmit approved completed locate request tickets as searchable electronic records.

Having generally outlined a method of managing locate operations according to various embodiments of the present invention, additional details of the various elements/entities illustrated in FIG. 4 are now provided.

I. Excavators/Requesting Parties

With reference again to FIG. 4, one or more excavators 154, or other parties requesting locate operations ("requesting parties") may be associated with (e.g., in communication with) facilities locate management system 100, and one or more excavator devices 118 used by requesting parties may in some implementations constitute part of a facilities locate management system. While the following discussion focuses on an excavator as an exemplary requesting party for purposes of illustration, it should be appreciated that the invention is not limited in this respect. Furthermore, it should be appreciated that one or more excavator devices 118 need not necessarily form part of the locate management system 100 in some implementations, but merely may be in communication with other elements of the systems (e.g., via the network 126).

As noted above, an excavator or other requesting party generally submits a locate request to a one-call center. When a locate request is submitted by an excavator 154 to a one-call center, such as one-call center 116, it may be beneficial for the excavator to indicate the particular geographic location of the proposed excavation in a permanent and reproducible manner. The dig area thusly identified indicates to a locate technician the extent of the boundaries where a locate operation is to be performed at the request of the excavator. Physical white lines, that may include chalk or paint on the surface of the ground, may be used to physically delimit a dig area. However, these physical white lines provide only a temporary indication of the dig area, as physical white lines may deteriorate or be eliminated over time by certain events such as precipitation, excessive pedestrian or vehicle traffic, erosion, the excavation process, or numerous other events. Consequently, each excavator 154 may utilize an excavator device 118 that has a "virtual white line" (VWL) application 156 installed thereon.

Excavator device 118 may be a computing device, such as portable computer, a personal computer, a general purpose computer, a tablet device, a personal digital assistant (PDA), a cellular radiotelephone, a mobile computing device, a touch-screen device, a touchpad device, or generally any device including, or connected to, a processor and a display. Preferably, excavator device 118 is a portable computing device, such as laptop computer or tablet device.

VWL application 156 that resides on excavator device 118 may be a drawing application, which, in excavation applications, may be used by the excavator 154 as a dig area marking tool. More specifically, VWL application 156 may be used by the excavator 154 to add markings to a displayed input image (e.g., which input image may be represented by source data 150 retrieved from image server 112 or facilities maps server 114) to indicate the dig area, thereby creating a marked-up image. For example, VWL application 156 may be used in order to superimpose over or otherwise display one or more dig area indicators on the digital image to indicate the dig area. As used herein, a "dig area indicator" may include one or more lines, drawing shapes, shades, points, symbols, coordinates, data sets, or other indicators to indicate or delimit on a digital image the dig area in which excavation is planned.

Figure 6A:
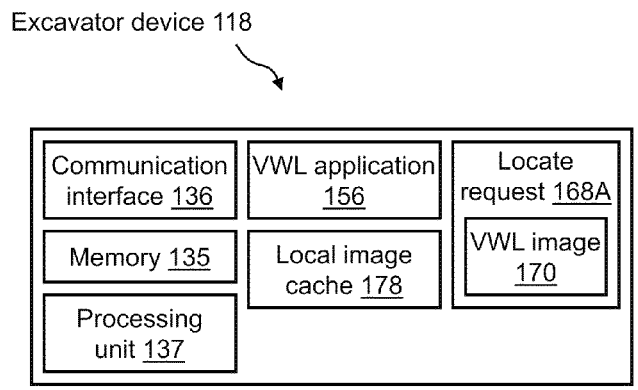
FIG. 6A illustrates a functional block diagram that shows additional details of an excavator device of the facilities locate management system of FIG. 4, according to one embodiment of the present invention.
Figure 6B:
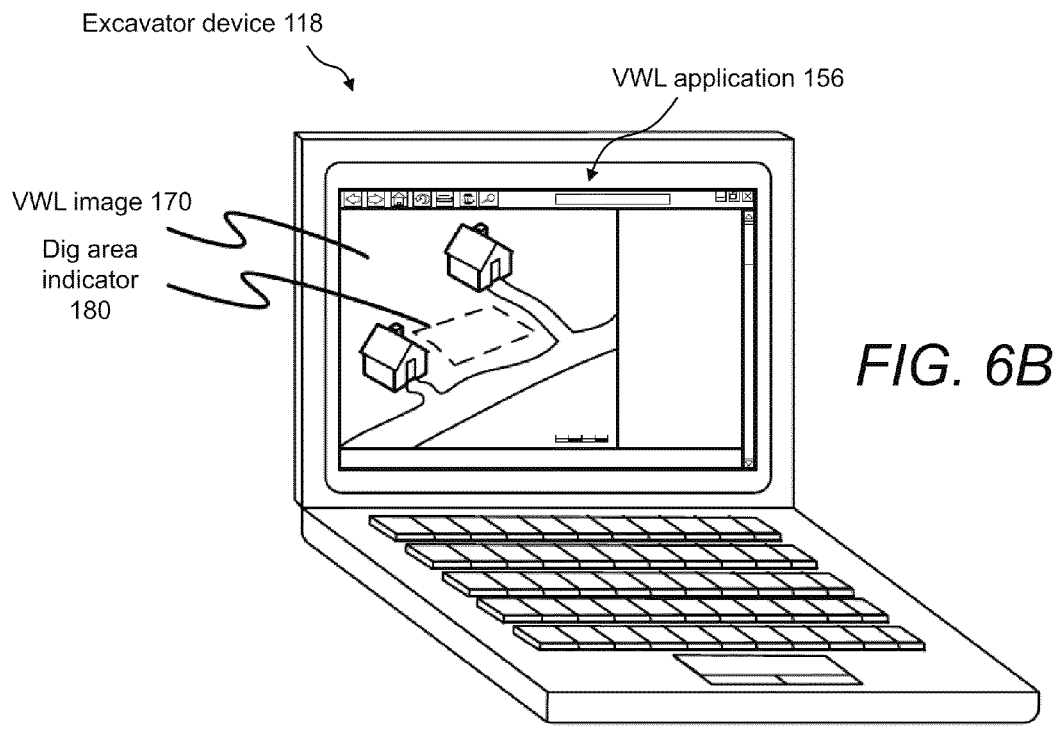
FIG. 6B illustrates an example of a virtual white lines (VWL) application when in use on the excavator device shown in FIG. 6A, according to one embodiment of the present invention.

FIGS. 6A and 6B provide additional details of excavator device 118 and the components thereof. The VWL application 156 may be implemented, for example, as described in: U.S. patent application Ser. No. 12/366,853 filed Feb. 6, 2009, entitled "Virtual white lines for delimiting planned excavation sites;" U.S. patent application Ser. No. 12/475,905 filed Jun. 1, 2009, entitled "Virtual white lines for delimiting planned excavation sites of staged excavation projects;" U.S. patent application Ser. No. 12/422,364 filed Apr. 13, 2009, entitled "Virtual white lines (VWL) application for indicating a planned excavation or locate path." Each of these patent applications is hereby incorporated by reference herein in its entirety.

FIG. 6A illustrates a functional block diagram that shows additional details of excavator device 118 of the facilities locate management system of the present disclosure. FIG. 6A shows communication interface 136 and VWL application 156 of FIG. 4, as well as a memory and a processing unit. Excavator device 118 may be used by an excavator 154 to generate a locate request 168A. Associated with the current locate request 168A may be a certain VWL image 170 that is generated by the excavator 154 using VWL application 156 (e.g., stored in the memory and executed by the processing unit). An example of VWL application 156 when in use is shown with reference to FIG. 6B.

A local image cache 178 of excavator device 118 may be used to store, for example, source data 150 from image server 112 and/or from central server 110 (discussed in further detail below). Source data 150 may be used by VWL application 156 to display one or more input images that may be marked up (e.g., with a dig area indicator 180) to indicate a dig area and thereby create VWL image 170, which may also be stored in local image cache 178.

FIG. 6B illustrates an example of VWL application 156 when in use on excavator device 118 by, for example, a certain excavator 154. In this example, excavator device 118 is a portable computer that has VWL application 156 executing thereon. FIG. 6B shows a graphical user interface (GUI) of VWL application 156 that may be presented to the user via the display of excavator device 118. More specifically, a certain source data 150 that corresponds to the location of the current proposed excavation is read into VWL application 156 and displayed on excavator device 118. The excavator 154 may then use various drawing tools (e.g., color pallet, lines, shapes, etc.) that are provided on the GUI of VWL application 156 in order to electronically sketch one or more dig area indicators 180, which are provided in this example to delimit the dig area.

In one example, one or more dig area indicators 180 that are placed upon the displayed input image represented by source data 150 may be dotted or dashed lines (e.g., rendered in the color white) as shown in FIG. 6B. When the sketch of the dig area indicator(s) 180 on the displayed input image is complete for the current proposed dig area, the marked up image is saved as a VWL image 170. This VWL image 170, and/or any underlying information/metadata regarding the image contents (e.g., geo-location coordinates representing the one or more dig area indicators), is associated with (e.g., attached to or included in) the current locate request 168A, which may then be transmitted to one-call center 116 for processing in order to initiate a locate operation.

II. Image Server

With reference again to FIG. 4, image server 112 may be any computer device for storing and providing source data 150 for input images of geographic areas including a work site/dig area. Such input images may be displayed on a display device at any of the elements/entities associated with the management system 100 (e.g., an excavator device 118, a locate personnel device 122, optional onsite computers 124, etc.). As discussed above, source data provided by the image server may be used to create VWL images; additionally, as discussed in greater detail below, an input image of a geographic area may be electronically marked-up to not only provide a digital representation of the dig area itself, but alternatively or also a digital representation of one or more electronic detection marks indicating where facilities are detected by a locate device, and/or one or more electronic locate marks indicating where physical locate marks were applied to ground, pavement or other surface during a marking operation.

For purposes of the present disclosure, an input image is any image represented by source data 150 that may be electronically processed (e.g., the source data is in a computer-readable format) to display the image on a display device. An input image may include any of a variety of paper/tangible image sources that are scanned (e.g., via an electronic scanner) or otherwise converted so as to create source data (e.g., in various formats such as XML, PDF, JPG, BMP, etc.) that can be processed to display the input image. An input image also may include an image that originates as source data or an electronic file without necessarily having a corresponding paper/tangible copy of the image (e.g., an image of a "real-world" scene acquired by a digital still frame or video camera or other image acquisition device, in which the source data, at least in part, represents pixel information from the image acquisition device).

In some exemplary implementations, input images according to the present disclosure may be created, provided, and/or processed by a geographic information system (GIS) that captures, stores, analyzes, manages and presents data referring to (or linked to) location, such that the source data representing the input image includes pixel information from an image acquisition device (corresponding to an acquired "real world" scene or representation thereof), and/or spatial/geographic information ("geo-encoded information"). In this manner, a GIS provides a framework for data manipulation and display of images that may facilitate one or more of (a) location verification, (b) location correlation, (c) locational relationships, (d) district coding, (e) route analysis, (f) area analysis and (g) mapping/display creation, for example.

In view of the foregoing, various examples of input images and source data 150 representing input images according to the present disclosure, to which the inventive concepts disclosed herein may be applied, include but are not limited to:

Manual "free-hand" paper sketches of the geographic area (which may include one or more buildings, natural or man-made landmarks, property boundaries, streets/intersections, public works or facilities such as street lighting, signage, fire hydrants, mail boxes, parking meters, etc.);

Various maps indicating surface features and/or extents of geographical areas, such as street/road maps, topographical maps, military maps, parcel maps, tax maps, town and county planning maps, call-center and/or facility polygon maps, virtual maps, etc. (such maps may or may not include geo-encoded information);

Facility maps illustrating installed underground facilities, such as gas, power, telephone, cable, fiber optics, water, sewer, drainage, etc. Facility maps may also indicate street-level features (streets, buildings, public facilities, etc.) in relation to the depicted underground facilities. Examples of facility maps include CAD drawings that may be created and viewed with a GIS to include geo-encoded information (e.g., metadata) that provides location information (e.g., infrastructure vectors) for represented items on the facility map;

Architectural, construction and/or engineering drawings and virtual renditions of a space/geographic area (including "as built" or post-construction drawings);

Land surveys, i.e., plots produced at ground level using references to known points such as the center line of a street to plot the metes and bounds and related location data regarding a building, parcel, utility, roadway, or other object or installation;

A grid (a pattern of horizontal and vertical lines used as a reference) to provide representational geographic information (which may be used "as is" for an input image or as an overlay for an acquired "real world" scene, drawing, map, etc.);

"Bare" data representing geo-encoded information (geographical data points) and not necessarily derived from an acquired/captured real-world scene (e.g., not pixel information from a digital camera or other digital image acquisition device). Such "bare" data may be nonetheless used to construct a displayed input image, and may be in any of a variety of computer-readable formats, including XML); and Photographic renderings/images, including street level, topographical, satellite, and aerial photographic renderings/images, any of which may be updated periodically to capture changes in a given geographic area over time (e.g., seasonal changes such as foliage density, which may variably impact the ability to see some aspects of the image).

It should also be appreciated that source data 150 representing an input image may be compiled from multiple data/information sources; for example, any two or more of the examples provided above for input images and source data representing input images, or any two or more other data sources, can provide information that can be combined or integrated to form source data that is electronically processed to display an image on a display device.

Image server 112 may be associated with the same, or a different, party that maintains central server 110. For example, image server 112 may be associated with a party that provides source data 150 for a fee. As noted above, source data 150 from image server 112 may include geo-coding or other geographical identification metadata and may be provided in any computer-readable format, such as JPEG file interchange format (JPEG), tagged image file format (TIFF), portable document format (PDF), graphics interchange format (GIF), bitmap (BMP), portable network graphics (PNG), Windows® metafile (WMF), and/or the like. In addition, source data 150 from image server 112 may include a combination of images or overlays, such as overlays of street names, regions, landmark descriptions, and/or other information about areas displayed in an image. Source data 150 from image server 112 may be supplied by a third-party provider if the coverage area of the third-party image provider overlaps with the desired area of the user.

III. Facilities Maps Server

As noted above, the source data 150 provided by image server 112 may encompass data representing facility maps. However, in some implementations a dedicated server, such as facilities maps server 114, may be included in the management system 100 shown in FIG. 4 to specifically provide source data representing facilities maps 152. Like the more general image server 112, the facilities maps server 114 may be any computer device for storing and providing facilities maps 152, or an electronic database of facilities map information, relating to the geographic location of any physical plant of any type of utility. Facilities maps server 114 may be associated with the same, or a different, party that maintains central server 110 and/or image server 112. In one example, one or more facilities maps servers 114 are maintained by the owner of the facilities.

Facilities maps 152 are any electronic representation of the geographic location, type, number, and/or other attributes of a facility or facilities. Facilities maps may be supplied by various facility owners and may indicate the geographic location of the facility lines (e.g., pipes, cables, and the like) owned and/or operated by the facility owner. For example, facilities maps may be supplied by the owner of the gas facilities, power facilities, telecommunications facilities, water and sewer facilities, and so on.

Facilities maps may be provided in any of a variety of different formats. As facilities maps often are provided by facility owners of a given type of facility, typically a set of facilities maps includes a group of maps covering a particular geographic region and directed to showing a particular type of facility disposed/deployed throughout the geographic region.

One facilities map of such a set of maps is sometimes referred to in the relevant arts as a "plat."

An electronic facilities map may in some instances simply be an electronic conversion (i.e., a scan) of a paper facilities map that includes no other information (e.g., electronic information) describing the content of the map, other than what is printed on the paper maps. Alternatively, however, more sophisticated facilities maps also are available which include a variety of electronic information, including geographic information and other detailed information, regarding the contents of various features included in the maps. In particular, facilities maps may be formatted as geographic information system (GIS) map data, in which map features (e.g., facility lines and other features) are represented as shapes and/or lines, and the metadata that describes the geographic locations and types of map features is associated with the map features. In some examples, a GIS map data may indicate a facility line using a straight line (or series of straight lines), and may include some symbol or other annotation (e.g., a diamond shape) at each endpoint of the line to indicate where the line begins and terminates. From the foregoing, it should be appreciated that in some instances in which the geo-locations of two termination or end-points of a given facility line may be provided by the map, the geo-location of any point on the facility line may be determined from these two end-points.

Examples of a wide variety of environmental landmarks and other features that may be represented in GIS facilities map data include, but are not limited to: landmarks relating to facilities such as pedestal boxes, utility poles, fire hydrants, manhole covers and the like; one or more architectural elements (e.g., buildings); and/or one or more traffic infrastructure elements (e.g., streets, intersections, curbs, ramps, bridges, tunnels, etc.). GIS facilities map data may also include various shapes or symbols indicating different environmental landmarks relating to facilities, architectural elements, and/or traffic infrastructure elements.

Examples of information provided by metadata include, but are not limited to, information about the geo-location of various points along a given line, the termination points of a given line (e.g., the diamond shapes indicating the start and end of the line), the type of facility line (e.g., facility type and whether the line is a service line or main), geo-location of various shapes and/or symbols for other features represented in the map (environmental landmarks relating to facilities, architectural elements, and/or traffic infrastructure elements), and type information relating to shapes and/or symbols for such other features.

The GIS map data and metadata may be stored in any of a variety of ways. For example, in some embodiments, the GIS map data and metadata may be organized into files, where each file includes the map data and metadata for a particular geographic region. In other embodiments, the GIS map data and metadata may be stored in database and may be indexed in the database by the geographical region to which the map data and metadata corresponds.

Facilities maps may include additional information that may be useful to facilitate a locate and/or marking operation. For example, various information that may be included in a legend of the facilities map, or otherwise associated with the facilities map (e.g., included in the metadata or otherwise represented on the map), may include, but is not limited to, a date of the facilities map (e.g., when the map was first generated/created, and/or additional dates corresponding to updates/revisions), a number of revisions to the facilities map (e.g., revision number, which may in some instances be associated with a date), one or more identifiers for a source, creator, owner and/or custodian of the facilities map (e.g., the owner of the facility type represented in the map), various text information (e.g., annotations to update one or more aspects or elements of the map), and any other legend information that may be included or represented in the map.

For facilities maps in electronic form, a variety of digital formats of facilities maps may be used including, but not limited to, a vector image format that is the typical output format of computer-aided design (CAD) tools. In one example, some facilities maps may be in a DWG ("drawing") format, which is a format that used for storing two and three dimensional design data and metadata, and is a native used by several CAD packages including AutoCAD, Intellicad, and PowerCAD. However, those skilled in the art will recognize that facilities maps may be in any of several vector and/or raster image formats, such as, but not limited to, DWG, DWF, DGN, PDF, TIFF, MFI, PMF, and JPG.

As noted above, in some instances in which facilities maps are in a vector image format, a certain line on the facilities map may be represented by a starting point geo-location, an ending point geo-location, and metadata about the line (e.g., type of line, depth of line, width of line, distance of line from a reference point (i.e., tie-down), overhead, underground, line specifications, etc.). According to one embodiment of the present invention as discussed in greater detail below, to facilitate display of facilities map information relating to multiple different types of facilities, each vector image may be assembled in layers, in which respective layers correspond, for example, to different types of facilities (e.g., gas, water, electric, telecommunications, etc.). In one aspect of such an embodiment, each layer is, for example, a set of vector images that are grouped together in order to render the representation of the certain type of facility.

IV. One-Call Centers

With reference again to FIG. 4, and as discussed above in connection with FIG. 1, one-call center 116 may be any organization, entity, and/or system that receives and/or processes locate requests, and/or transmits an underground facility locate request ticket to a ticket recipient. The locate request ticket may be any communication or instruction to perform an underground facility locate operation. One-call centers are generally owned, controlled, or funded by underground facility owners, such as telephone companies, cable television multiple system operators, electric utilities, gas utilities, or others. One-call center operations may be managed as a non-profit entity or outsourced to a for-profit firm. Excavators, such as excavators 154, are required to notify one-call centers in advance of their excavation activities and identify through the locate request the dig area where individual excavating activities will be performed. Locate requests include information supplied by the excavator to the one-call center regarding the specific geographic location of the dig area, date, time, purpose of excavation, and so on. The locate request ticket, in turn, requires activity from an underground facility owner to perform a locate operation in the specified dig area. The dig area may be any specified geographic area within which excavation may occur.

Figure 7:
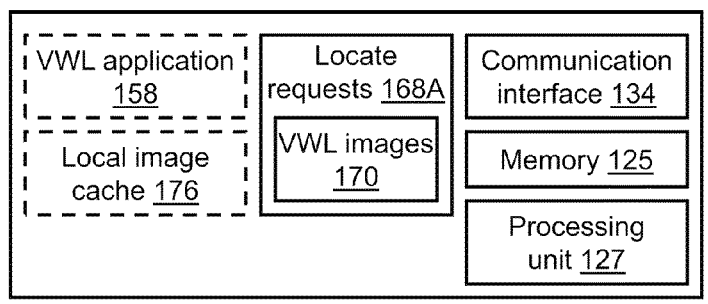
FIG. 7 illustrates a functional block diagram that shows additional details of a one-call center of the facilities locate management system of FIG. 4, according to one embodiment of the present invention.

FIG. 7 illustrates a functional block diagram that shows additional details of one-call center 116. As with the excavator devices 118, it should be appreciated that in some embodiments, the one-call center 116 does not necessarily form part of the facilities locate management system 100 shown in FIG. 4, but is merely an entity that communicates with the facilities locate management system (as the one-call center and the facilities locate management system may be operated by different entities). In other embodiments, however, the one-call center may form part of the facilities locate management system (e.g., the one-center may be managed by the same party operating the central server 110).

FIG. 7 shows communication interface 134 and VWL application 158 of FIG. 4. One-call center 116 processes the locate requests 168A that are submitted by excavators 154 using their respective excavator devices 118. In this example, locate requests 168A are in electronic form. Each locate request 168A may include a respective VWL image 170 and/or data/information relating thereto (as described above in connection with FIGS. 6A and 6B). Again, VWL images 170 may be generated by excavators 154 using VWL application 156 via their respective excavation devices 118. Optionally, VWL images 170 may be generated by personnel at one-call center 116 using VWL application 158.

When optional VWL application 158 is present at one-call center 116, one-call center 116 may additionally include a local image cache 176. Stored in local image cache 176 may be, for example, certain source data 150 from image server 112 and/or from central server 110. Source data 150 may be used by VWL application 158 as the input image(s) that may be marked up in order to create VWL images 170, which may also be stored in local image cache 176, that show in a graphical (or other) manner the dig area.

V. Central Server

With reference again to FIG. 4, as noted earlier central server 110 may be a centralized or distributed computer system operated by an entity that receives locate request tickets and that oversees locate operations pursuant to such tickets (e.g., a locate contractor/locate service provider, a facility owner, a municipality, etc.). For purposes of the following discussion, a locate service provider is taken as an exemplary ticket recipient and responsible for overseeing a technician workforce to perform locate operations; however, it should be appreciated that the invention is not limited in this respect, as various parties may receive tickets and operate a central server similar to that described herein. Additionally, it should be appreciated that not only may various ticket recipients implement a central server having the various functionality described herein, but other entities such as regulatory authorities, industry associations (e.g., consortia/alliances), insurance companies, damage investigators, and the like may similarly implement such central server systems, and any of the various functionality associated therewith, to accommodate their interests in, and/or audit needs, in connection with locate operations.

In some implementations, the central server 110 essentially serves as the "heart" of the facilities locate management system 100 shown in FIG. 4, in that many of the salient functions of the management process discussed in connection with FIG. 5 are performed and/or initiated via one or more applications executing on the central server 110; additionally, significant information germane to the management of locate operations generally flows through, or under the direction of, applications executing on the central server 110. To this end, the central server 110 includes one or more processing units 117, memory 115, and one or more communication interfaces 128. While the central server 110 may be utilized for managing the overall operations of facilities locate management system 100, it should be appreciated that one or more applications and/or information that reside on central server 110 may be accessible by any other elements/entities that communicate with or form part of the facilities locate management system 100 via network 126. For example, central server 110 may further include a data store 144 for storing any information that may be useful to, or generated by, various elements/entities and/or instrumentation associated with the facilities locate management system 100.

Figure 8:
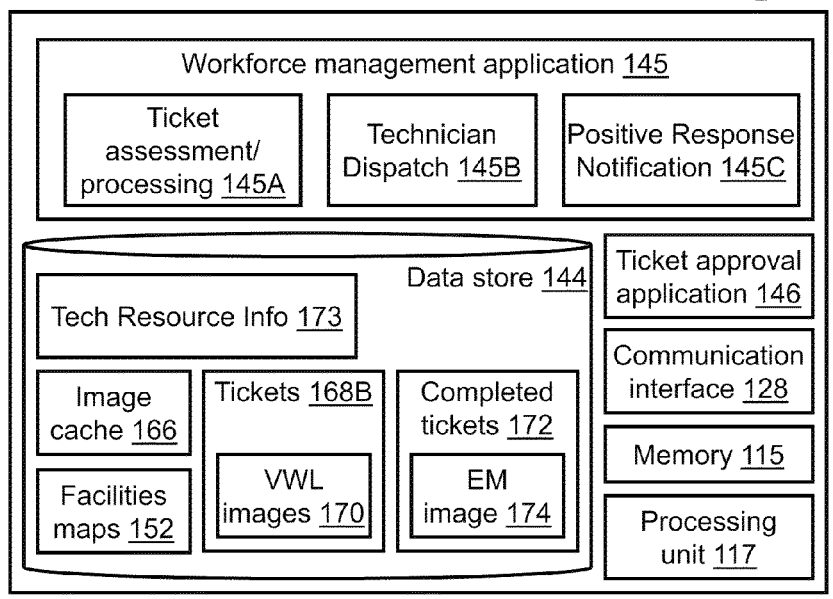
FIG. 8 illustrates a functional block diagram that shows additional details of a central server of the facilities locate management system of FIG. 4, according to one embodiment of the present invention.

FIG. 8 illustrates a functional block diagram that shows additional details of central server 110. FIG. 8 shows communication link 128, data store 144, and ticket approval application 146 which were also illustrated in FIG. 4, plus additional details of the central server 110. In the central server 110 shown in FIG. 8, data store 144 may reside on the hard disk of central server 110. Data store 144 may be any substantially permanent storehouse of data. In one example, data store 144 may be a relational database that is created and maintained by any suitable database software. For example, data store 144 may store all data relevant to any combination of relationships or requirements among facility owners, one-call centers, facility locate service providers, excavators, regulators and insurers including, without limitation, locate request tickets 168B, completed tickets 172, VWL applications 156 or 158, EM application 164, ticket approval application 146, source data 150, information returned from each locate operation, facility damage claims and so on.

An image cache 166 may reside at data store 144. Image cache 166 may be used to store cached images, such as cached source data 150 from image server 112, and the like. For example, the cached source data 150 of image cache 166 may be used by certain applications of facilities locate management system 100, such as, but not limited to, ticket approval application 146, VWL applications 156 or 158, and EM application 164. Additionally, any collection of facilities maps 152 or facilities map information from facilities maps server 114 may reside at data store 144. Additionally, a collection of locate request tickets 168B that are generated by and received from one-call center 116 may reside at data store 144. As discussed above, each locate request ticket 168B may include a VWL image 170 and/or image information relating to the contents of a VWL image.

The central server 110 may also be configured to execute a workforce management application 145, which may have various components to facilitate assessment and/or processing of locate request tickets 168B, dispatching of technicians (locate personnel 160) to perform locate operations pursuant to locate request tickets, and/or provide various notifications ("positive response notifications") to requesting parties or other parties regarding the status of locate operations and/or various information attendant thereto.

For example, in one implementation, the workforce management application 145 may include a ticket assessment and/or processing component 145A. In exemplary aspects, the ticket assessment and/or processing component 145A may parse received tickets to extract relevant information, and/or perform a comprehensive assessment process based on information extracted from the ticket (i.e., "ticket information"), to facilitate efficient scheduling of locate activities and appropriate allocation of technician resources to locate operations. In other aspects, the ticket assessment and/or processing component 145A may review received tickets to establish the integrity, accuracy, and/or completeness of ticket information in connection with specified location of planned excavation, and provide assessments relating to scope of work (amount and nature of work), complexity involved, duration (amount of time required), risk (potential liability for damages), business value (penalty and/or profitability), and skill/certification requirements for technicians in performing the operation. Additional details of the ticket assessment and/or processing component 145A are discussed in U.S. provisional patent application No. 61/220,491, filed Jun. 25, 2009, entitled, "Methods and Apparatus for Assessing Field Service Operation Tickets," which application is hereby incorporated herein by reference.

As shown in FIG. 8, the workforce management application 145 also may include a technician dispatch component 145B. In one implementation of the technician dispatch component, ticket assessment outcomes provided by the ticket assessment and/or processing component 145A may be used as inputs to the technician dispatch component to inform a scheduling process for dispatching technicians. In other implementations, more generally, the technician dispatch component 145B may provide for scheduling of technicians and allocation of technicians to particular locate operations based at least in part on one or more of: performance deadlines for the locate operations and relevant shift times of available technicians; various parameters relating to the operations themselves (job performance information and/or quality assessment information), technicians (e.g., historical efficiencies, particular skills/certification, security clearance), and/or relevant environmental conditions (e.g., weather, traffic); ticket assessment outcomes (e.g., risk information; penalty or profitability information; complexity information; technician skill/certification requirements); contractual obligations between the entity dispatching technicians and responsible for/overseeing the locate operations, and one or more parties for which the operation(s) is/are being performed; statutory and/or regulatory requirements, such as wage and hour compliance for resources (e.g., availability of resources for scheduling complies with applicable wage and hour statutes/regulations), and/or the time and/or manner in which a given operations needs to be performed pursuant to applicable statutes/regulations. In one aspect, the technician dispatch component 145B may also access technician resource information 173, which may be stored in the data store 144 of the central server and which may contain a variety of information regarding technician resources, to facilitate allocation of locate operations to available technician resources and scheduling of locate operations. Additional details of the technician dispatch component 145B are discussed in U.S. non-provisional application Ser. No. 12/699,921, filed on Feb. 4, 2010, entitled "Methods, Apparatus, and Systems for Dispatching Service Technicians," which application is hereby incorporated herein by reference.

In yet another aspect of the workforce management application 145 of the central server 110 shown in FIG. 8, the ticket assessment/processing component 145A further may provide a process guide to a technician, once dispatched, to facilitate performance of the locate operation. For example, ticket information (which may include an original locate request ticket issued by a one-call center, a work order derived from one or more locate request tickets, or other process guide) may be displayed and/or processed on one or more pieces of locating equipment used in the field by a technician, and/or one or more other computing devices (e.g., tablet computer, personal digital assistant, smart phone, or other portable/handheld computing device). As part of performing the locate operation, the technician may provide some input to generate an electronic record or log of technician activity during the operation.

In one exemplary implementation, pursuant to execution at the central server 110 of the ticket assessment/processing component 145A, a process guide in the form of a checklist may be generated (e.g., based at least in part on the ticket information), for example at the central server 110 and then downloaded to the locating equipment (e.g., locate device 119 and/or marking device 120 shown in FIG. 4) and/or locate personnel devices 122 or onsite computers 124, and may be displayed locally to the technician as a guide to perform and verify various aspects of the locate operation. In another exemplary implementation, a set of instructions or "workflow" may be generated on the central server, and then downloaded to locating equipment, locate personnel devices or onsite computers, to guide the technician through a sequence of steps to perform the locate operation. Performance via a process guide (e.g., checklist or workflow) may be interactive in that the technician may provide input, or automated/semi-automated by analyzing various information collected by the locating equipment with respect to the ticket information and/or other available information germane to the operation(s). Additional details of the functionality of the ticket assessment and/or processing component 145A in connection with the generation of process guides are discussed in detail in U.S. non-provisional application Ser. No. 12/703,809, filed Feb. 11, 2010, entitled "Marking Apparatus Equipped with Ticket Processing Software for Facilitating Marking Operations, and Associated Methods," which application is hereby incorporated herein by reference.

As discussed further below, once a technician is dispatched, arrives at a work site, and perform a locate operation, a wide variety of information may be available and acquired to electronically document performance of the operation, as well as environmental and other information germane to the locate operation, the technician, and/or the work site. Performance of a locate operation typically is associated with a "completed" ticket, wherein a technician provides some electronic communication or indication that the locate operation was at least attempted, if not completed pursuant to the locate request ticket. As discussed above, for purposes of the present disclosure, a "completed" electronic locate request ticket refers to an electronic communication generated by a technician indicating that a locate operation has been attempted or performed, at least to some extent. Accordingly, it should be appreciated that a "completed" ticket does not necessarily imply that a locate operation itself was successfully performed in its entirety (as dictated by one or more locate request tickets), but that it was at least initiated and attempted in some fashion. For example, a technician may be dispatched to a work site, may begin performing a locate operation, and may encounter some unforeseen impediment to completing the operation, or some condition or circumstance that warrants special action or attention. Accordingly, the technician may generate a "completed" ticket that reflects the attempted operation but in some manner reflects the anomalous situation attendant to the attempted locate operation.

With reference again to FIG. 8, the data store 144 of the central server 110 accordingly may store a collection of completed tickets 172 received by the central server 110, for example, from one or more locate personnel devices 122, onsite computers 124, or various locating equipment used to perform the locate operation (e.g., locate device 119, marking device 120). As discussed in greater detail below, a completed ticket 172 may include an electronic manifest (EM) image 174. In some embodiments, an EM image 174 may be based on a previously-generated VWL image 170, i.e., source data 150 that has been marked-up with virtual white lines, wherein the VWL image is further marked-up to show the work performed during the locate operation (e.g., detection and/or marking of one or more underground facilities). EM images 174 may be generated at least in part by locate personnel 160 using EM application 164 on his/her locate personnel device 122 (or onsite computer 124), and/or at least in part based on information acquired by various locating equipment used for the locate operation.

More specifically, an EM image 174 may show the original dig area indicator(s) from the original VWL image 170. Additionally, the EM image 174 may show one or more types of facilities, the presence of which have been determined (detected and/or marked) during the locate operation. Each facility type may be graphically represented with a certain color line in EM image 174; as discussed above, in some implementations such a line represents where a presence of a facility was detected (e.g., electronic detection marks) and/or where physical locate marks were applied to the dig area to indicate the presence of the facility (e.g., electronic locate marks). Additionally, the EM image 174 may show one or more environmental landmarks. An environmental landmark may be any location specified by any means that is used or can be used as a reference point for measurement or orientation. Examples of an environmental landmark may include, but are not limited to, a tree, a curb, a driveway, a utility pole, a fire hydrant, a storm drain, a pedestal, a water meter box, a manhole lid, a building structure, a light post, or a set of global positioning system coordinates. An example of an EM image 174 is shown with reference to FIG. 11C.

As also noted above, in some implementations an EM image 174 need not include one or more dig area indicators previously placed on an input image by an excavator, other requesting party, or one-call center to indicate a dig area, but may merely include one or more electronic detection marks and/or electronic locate marks to digitally represent the presence of an underground facility. Also, as noted above, in some completed tickets an EM image 174 may have no markings on it at all, and nonetheless be useful for documenting a "clear" locate operation in which no underground facilities were found.

In sum, with respect to completed locate request tickets 172, a completed ticket may include one or both of image data and non-image data associated with the dig area. The image data may include at least one image of a geographic area including the dig area, wherein the image(s) may not be marked-up at all (e.g., in the case of a "clear"), or the image(s) may be marked-up images including one or more dig area indicators (e.g., virtual white lines) to provide an indication of the dig area, and/or one or more electronic detection marks and/or electronic locate marks to indicate a presence (or in some cases an absence) of one or more underground facilities. Examples of non-image data that may be included in or otherwise associated with the completed locate request ticket may include, but are not limited to, one or more of the following: a text description of the dig area; a plurality of geographic coordinates associated with one or more dig area indicators and/or one or more electronic detection marks or electronic locate mark indicators; an address or a lot number of at least one property within which the dig area is located; a street intersection in a vicinity of the dig area; a date and/or time of day for an excavation of the dig area; a first identifier associated with an excavator to perform the excavation activities; a second identifier associated with at least one environmental landmark in the vicinity of the dig area; a ticket identifier for the locate request ticket; a timestamp to indicate when a locate operation was performed; one or more identifiers (e.g., name, ID number, phone number, address, signature, etc.) for a locate technician, a locate company, and/or a utility associated with one or more underground facilities. The image data and the non-image data may be formatted in any of a number of ways; for example, the non-image data may be associated with the image data as a separate data set linked to the image data, as metadata to the image data, as some other type of combined file including both image and non-image data, etc., so as to create a searchable electronic record that may be consulted to verify that the locate operation was indeed completed, and assess the integrity (e.g., quality, timeliness, accuracy, etc.) of the locate operation.

To this end, the central server 110 shown in FIG. 8 also may be configured to execute a ticket approval application 146 for the purpose of performing a quality assessment on completed tickets. In one exemplary embodiment, one or more approvers 148 may be associated with execution and/or monitoring of ticket approval application 146. Approvers 148 may be, for example, any personnel associated with the underground facility locate service provider (or other entity receiving locate request tickets), such as, but not limited to, the supervisors of locate technicians that are dispatched into the field, quality control supervisors, and/or any management personnel. In another example, approvers 148 may be any personnel associated with excavators 154 such as, but not limited to, the supervisors of excavators that are dispatched into the field, quality control supervisors, and/or any management personnel. In additional examples, approvers 148 may be any personnel associated with one-call centers 116, underground facility owners (not shown) and/or federal, state or local regulatory agencies (not shown).

In some implementations, ticket approval application 146 may use and share the information of each completed ticket 172 that has an EM image 174 in order to rapidly access the quality of the work performed in the field. This assessment may be by visual inspection of each completed ticket 172 by one or more approvers 148 and/or by processing the information contained in a completed ticket to assess compliance with a predetermined quality standard for the locate operation. For example, in one implementation, the information of each completed ticket 172 that has an EM image 174 may be analyzed by comparing the EM image against one or more facilities maps 152 or facilities map information that correspond to the geographic location associated with the completed ticket 172.

Thus, ticket approval application 146 provides for quality control and/or assessment of compliance functions (e.g., compliance with a predetermined quality standard for the locate operation). In exemplary implementations, the ticket approval process may comprise obtaining a field service ticket, performing a task according to the field service ticket, collecting data associated with the field service ticket and transmitting the data to a work management server that includes a database and approval applications for processing and analyzing information contained in the ticket and assessing compliance with a predetermined quality standard. In yet other aspects of the ticket approval application 146, completed tickets may be reviewed, in essentially real-time during performance of a locate operation, and/or at any time following attempt/completion of a locate operation, to provide a quality assessment of the locate operation (e.g., an assessment of the completeness, accuracy, and/or efficiency of the operation).

In sum, quality assessment processes according to various embodiments, as facilitated by the ticket approval application 146, may be primarily under the discretion of a human reviewer, albeit facilitated in some respects by computer-aided display of information, and electronic record keeping and communication functions associated with the quality assessment result(s). In other embodiments, information related to a locate operation (e.g., electronic manifest information accompanying or constituting a completed ticket) is electronically analyzed such that a quality assessment is based at least in part on some predetermined criteria and/or metrics that facilitate an automated determination of quality assessment. In one aspect, if the locate operation represented by the completed ticket complies with a predetermined quality standard (e.g., based on predetermined criteria and/or metrics), the locate operation may be "approved" (e.g., a quality assessment process/engine may generate an "approved completed locate request ticket"). In another aspect, real-time quality assessment during performance of a locate operation may facilitate identification of risks or problems that may be flagged for proactive corrective action (e.g., immediately, or as soon as practicable).

Additional details regarding the ticket approval application 146 and execution of same by the central server are described in the following applications, each of which is incorporated herein by reference: U.S. patent application Ser. No. 12/493, 109, filed on Jun. 26, 2009, entitled "Methods and Apparatus for Quality Assessment of a Field Service Operation;" U.S. patent application Ser. No. 12/557,732, filed on Aug. 7, 2009, entitled "Methods and Apparatus for Quality Assessment of a Field Service Operation Based on Geographic Information;" U.S. patent application Ser. No. 12/571,356, filed on Sep. 30, 2009, entitled "Methods and Apparatus for Analyzing Locate and Marking Operations with Respect to Facilities Maps;" U.S. patent application Ser. No. 12/572,202, filed on Oct. 1, 2009, entitled "Methods and Apparatus for Analyzing Locate and Marking Operations with Respect to Historical Information;" U.S. patent application Ser. No. 12/568,087, filed on Sep. 28, 2009, entitled "Methods and Apparatus for Generating an Electronic Record of Environmental Landmarks Based on Marking Device Actuations;" and U.S. patent application Ser. No. 12/572,260, filed on Oct. 1, 2009, entitled "Methods and Apparatus for Analyzing Locate and Marking Operations with Respect to Environmental Landmarks."

For example, in accordance with various embodiments described in above-referenced applications, a quality assessment of a locate operation may be performed based on the collected locating equipment data (which may or may not form part of an EM image or the date underlying same), with or without human input. In some embodiments, the collected locating equipment data may be compared to "reference information" or "reference data" (which in some instances is derived from information/data contained in a "reference" electronic record). Examples of types of reference information/data used in a quality assessment process may include, but are not limited to: 1) information/data derived from or relating to one or more facilities maps that illustrate the presumed locations of underground facilities purportedly present in a geographic area proximate to or surrounding and subsuming the work site; 2) information/data derived from or relating to one or more previous locate and/or marking operations at or near the work site (referred to herein as "historical tickets" or "historical data"); and/or 3) information/data relating to one or more environmental landmarks present in a geographic area proximate to or surrounding and subsuming the dig area (e.g., the work site and its environs), or within the dig area itself (referred to herein as "landmark information," which may be available, for example, from facilities maps, historical tickets, and/or field data collected at or around the time of the locate and/or marking operation being assessed). For each type of reference information, suitable criteria and/or metrics may be developed to facilitate an automated determination of quality assessment.

In yet other aspects, various quality assessment functions may be implemented in a centralized or distributed fashion. For example, in one implementation, alternatively to or in addition to the central server 110 receiving and analyzing completed tickets, other computing device(s) operated by a locate service provider or other entity may collect relevant information from the field relating to locate operations and perform quality assessments of same. In some implementations discussed in further detail below, intelligent locating equipment may be configured to perform some degree of quality assessment local to the work site; for example, intelligent locating equipment may be configured to acquire information about the locate operation and its environs, compare elements of acquired information to various criteria relating to functionality and/or use of the locating equipment, and/or one or more environmental conditions proximate to the locating equipment and/or work site in which it is being used, and provide one or more local alerts (e.g., visual, audible, and/or tactile indications) to a technician to indicate any detected out-of-tolerance conditions. Such locally detected conditions also may be transmitted by intelligent locating equipment to one or more other pieces of intelligent locate equipment in the area, and or one or more remote computing devices, for further and/or corroborative quality assessment or other analysis. In this fashion, a host of quality assessment functionality may be facilitated at various organizational levels, and/or amongst multiple distributed computing resources.

Figure 12A:
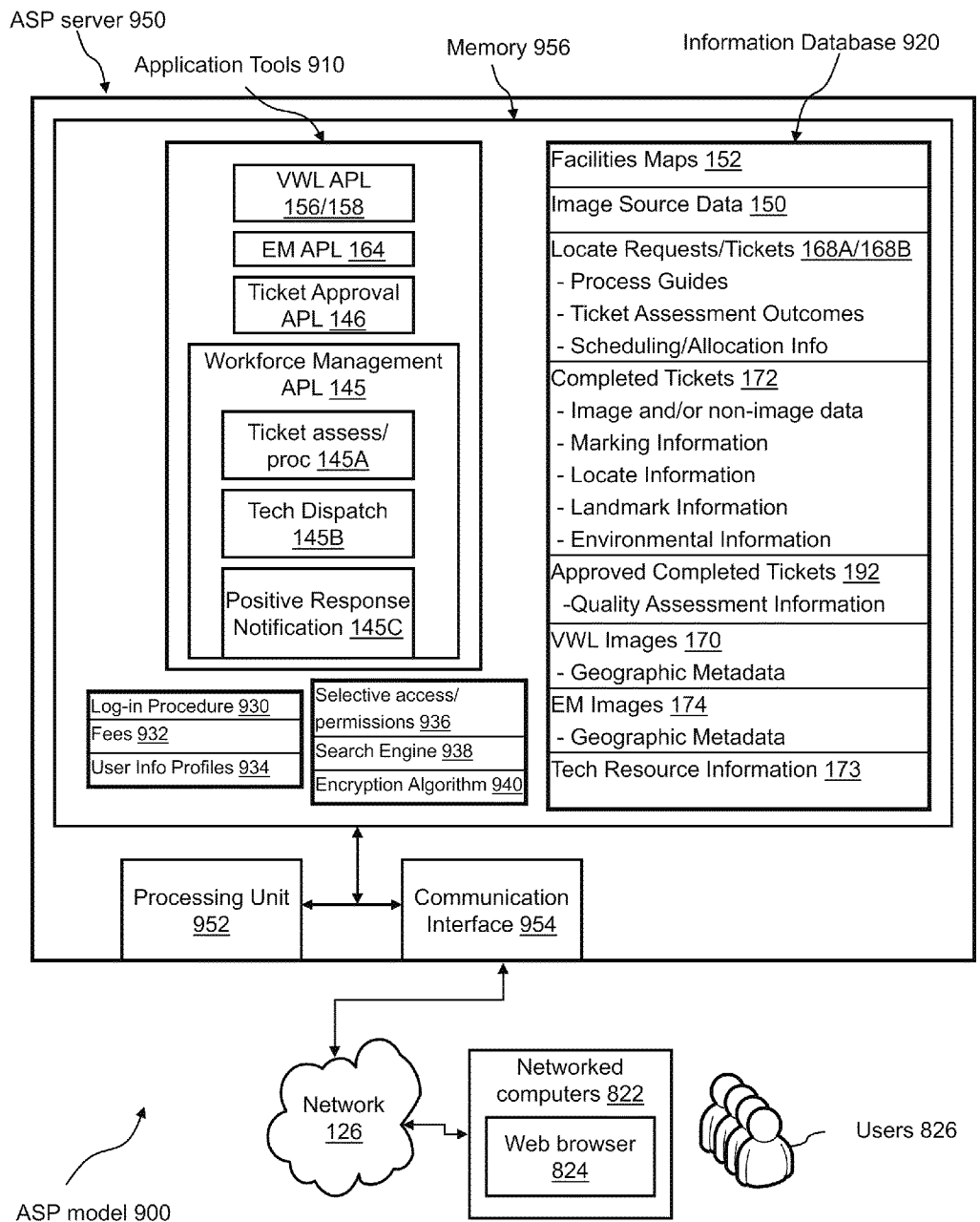
FIGS. 12A and 12B illustrate examples of an application service provider (ASP) model for implementing various aspects of a locate operation management system, apparatus and methods according to one embodiment of the present invention.

In other aspects, any information acquired in connection with the locate operation (e.g., electronic records acquired by intelligent locating equipment, electronic manifests), as well as quality assessment results, may be archived (e.g., in a database and/or central data store, e.g. data store 144 of central server 110, or memory 956 of ASP server 950 in FIG. 12A) for future reference/access by various parties that may be interested in such information (e.g., excavators, one-call centers, facility owners, locate contractors, municipalities, regulatory authorities, damage investigators/assessors, insurance companies, etc.). In particular, any information relating to an approved completed locate request ticket may be electronically transmitted and/or electronically stored so as to provide a searchable, secure, and unalterable electronic record of the locate operation (e.g., using any of a variety of conventionally available encryption algorithms, such as TripleDES/TDEA, or the Blowfish keyed symmetric block cipher—see encryption algorithm 940 in FIG. 12A). Such an electronic record provides for improved visibility, quality control and audit capability for underground facility locate operations.

In yet other embodiments, the workforce management application 145 of the central server 100 may include a positive response notification component 145C. Via execution of this component, at one or more points during the processes discussed above, one or more "positive response" notifications indicating a status of the locate operation and/or disposition of the technician, and/or more detailed information about the progress of the locate operation, may be electronically transmitted and/or stored so as to inform at least one party associated with requesting the operation of the status of the operation and/or details thereof. In one aspect, a requesting party may designate a particular format, content, and/or method of receiving notifications regarding the locate operation. In another aspect, the central server, via execution of the positive response notification component 145C, may generate and send to a one-call center, and/or an excavator device (or any portal, such as a web page made available to a requesting part) a computer-generated GUI may be provided to facilitate submission of locate requests, generation of image information to indicate one or more dig areas on a digital image of a work site as part of a locate request, and/or selection of notifications and preferences for same. In yet another aspect, a requesting party may provide an acknowledgement of receipt (e.g., a "return receipt") for one or more received notifications. Additional details of the positive response notification component are discussed in U.S. non-provisional application Ser. No. 12/703,313, filed on Feb. 10, 2010, entitled "Methods, Apparatus, and Systems for Exchanging Information Between Excavators and Other Entities Associated with Underground Facility Locate and Marking Operations," which application is hereby incorporated by reference herein.

VI. Locate Personnel and Locating Equipment

Multiple locate personnel 160 may be associated with facilities locate management system 100. Locate personnel 160 may be, for example, locate technicians and/or quality control technicians. Each locate personnel 160 may utilize a locate device 119, a marking device 120, and/or a combined locate and marking device (not shown), in combination with a locate personnel device 122 that has an electronic manifest (EM) application 164 installed thereon. As discussed above, in some exemplary implementations, conventional locate devices and conventional marking devices may be employed, and the creation of an electronic manifest via the electronic manifest application 164 may be an essentially manual process performed by the technician as part of completing a ticket. In yet other implementations, intelligent locating equipment, e.g., one or more of a locate device 119, a marking device 120, or a combined locate and marking device, which have a variety of data acquisition, processing and storage functionality, may be employed by the technician to perform a locate operation. In this manner, the intelligent locating equipment itself may provide a host of information relating to the locate operation that can be used to facilitate automated or semi-automated generation of an electronic manifest, and/or provide one or more electronic records of valuable information that may be included in and/or accompany a completed ticket. Examples of intelligent locating equipment that may be employed in connection with various embodiments of the facilities locate management system described herein are discussed in U.S. non-provisional application Ser. No. 12/569, 192, filed Sep. 29, 2009, entitled "Methods, Apparatus, and Systems for Generating Electronic Records of Locate and Marking Operations, and Combined Locate and Marking Apparatus for Same," which application is incorporated herein by reference.

A. Locate Devices

Figure 2:
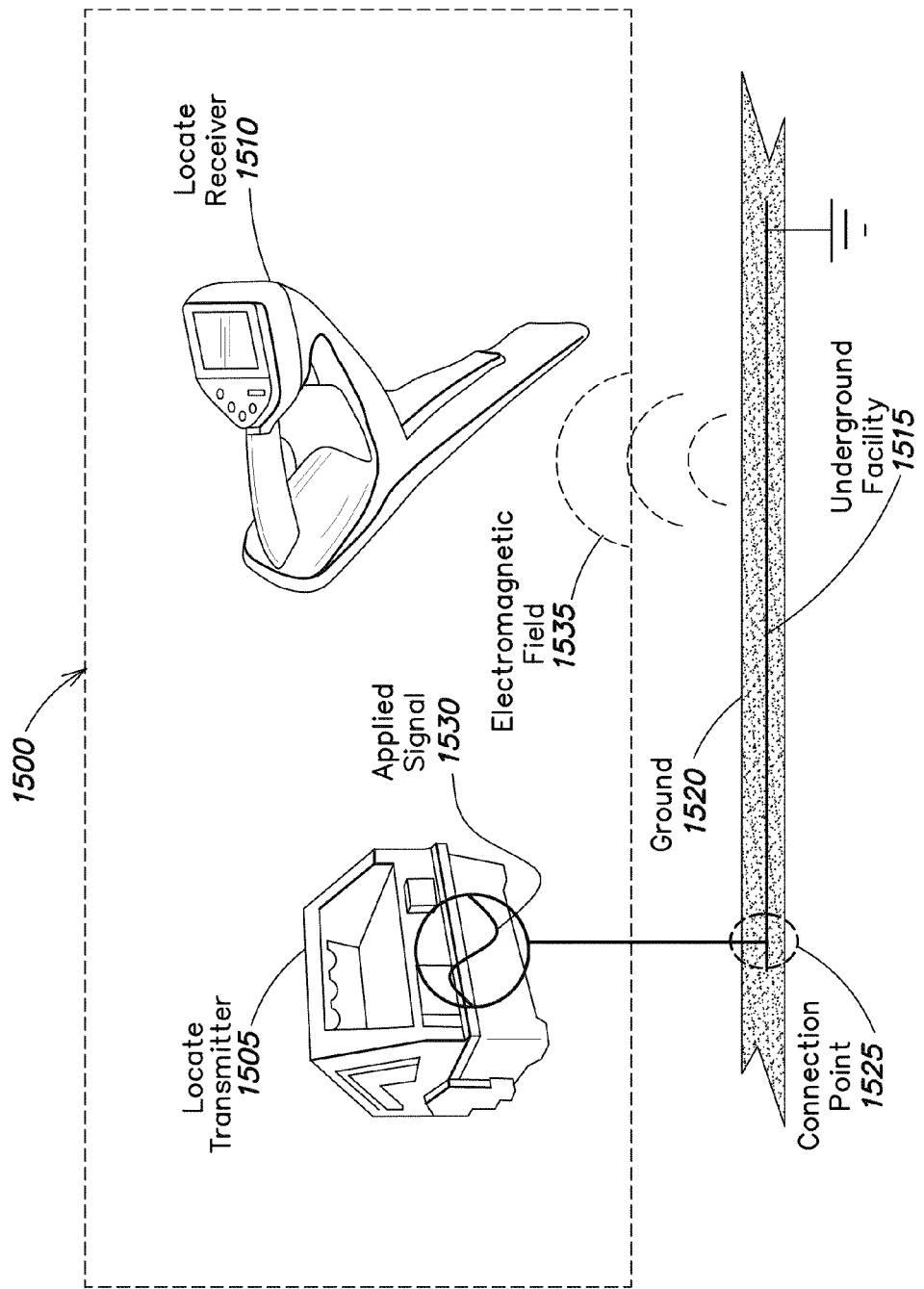
FIG. 2 illustrates one example of a conventional locate instrument set including a locate transmitter and a locate receiver.

As discussed above in connection with FIGS. 2A and 2B, locate device 119 shown in FIG. 4 generally is an instrument for detecting the presence or absence of facilities that are concealed in some manner, such as cables and pipes that are located underground. An underground facility locate device is used to detect electromagnetic fields that are generated by a detection signal that is provided along the target facility. A signal detected by the underground facility locate device indicates the presence of the target facility.

Figure 9:
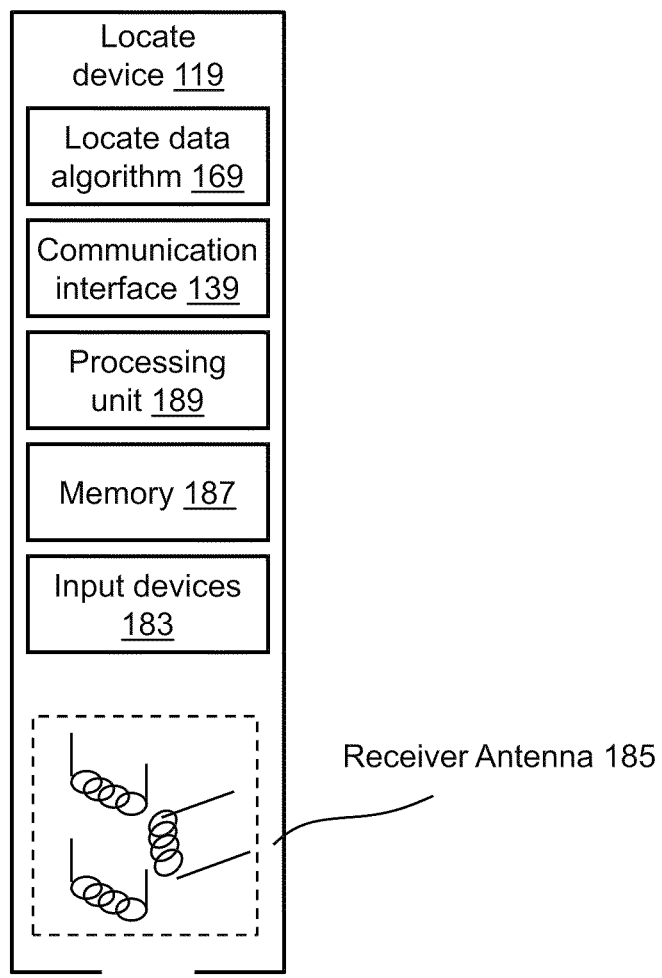
FIG. 9 illustrates a functional block diagram that shows additional details of a locate device of the facilities locate management system of FIG. 4, according to one embodiment of the present invention.

In one embodiment, the locate device 119 may be an intelligent locate device, as illustrated in FIG. 9. In particular, locate device 119 may be a global positioning system (GPS)-enabled electronic marking device that includes certain components for sensing and logging the operations performed therewith during a locate operation. Locate device 119 may include a locate data algorithm 169 for processing the information received and/or generated by locate device 119. For example, locate data algorithm 169 may be used for analyzing locate operations based on actuations of the locate device 119; for example, for each actuation of locate device 119, certain information may be captured and logged that may be subsequently analyzed in order to render a recreation of the locate operation. The information that is captured with each actuation may include, but is not limited to, location information relating to where one or more facilities are detected, characteristics of a magnetic field received/detected by one or more antennas of the locate device, and timestamp data. Further, locate device 119 is able to communicate this information to other applications and instruments of facilities locate management system 100 via communications interface 139.

FIG. 9 illustrates a functional block diagram that shows additional details of intelligent locate device 119. As shown in FIG. 9, the locate device may include a communication interface 139, memory 187 and a processing unit 189, as well as a locate data algorithm 169 (e.g., that may be stored in the memory and executed by the processing unit of the marking device).

Locate device 119 further includes one or more input devices 183, which may be any devices that are capable of returning useful information with respect to an underground facility location application. By way of example, input devices 183 may include, but are not limited to, a timing system (e.g., for generating a timestamp), a location tracking system (e.g., GPS technology), an underground probe (e.g., for capturing accurate facility location data by traversing the underground facility), survey apparatus, a temperature sensor, a humidity sensor, a light sensor, a compass, an inclinometer, an accelerometer, a digital camera, an audio recorder, an illumination source, and one or more receiver antenna 185 to facilitate detection of magnetic fields generated by underground facilities. Locate device 119 may also include control software (e.g., stored in the memory) for managing the overall operations of the locate device 119. Additionally, the locate device may include any device-specific control software or electronics for managing input devices 183 and/or processing information from input devices 183.

The information that is returned from input devices 183, also referred to as "locate information," may be processed and/or otherwise analyzed by use of locate data algorithm 169, and/or transmitted to the central server 110 via the network 126 for processing, analysis, and/or storage. In particular, locate data algorithm 169 may use the locate information acquired from input devices 183 for analyzing locate operations and creating an electronic record, in some instances in order to render a recreation of the locate operation. In one exemplary implementation, the processing unit of the locate device, executing the locate data algorithm, may generate locate information relating to the geographic location of detected facilities, and this location information may be in turn conveyed to other entities of the management system (e.g., to the locate personnel device 122) via the communication interface 139 of the locate device and the communication interface associated with the entity (e.g., the communication interface 140). Additional details of an intelligent locate device are described in U.S. non-provisional application Ser. No. 12/704,087, filed Feb. 11, 2010, entitled "Locate Apparatus having Enhanced Features for Underground Facility Locate Operations, and Associated Methods and Systems," which application is hereby incorporated by reference herein.

B. Marking Devices

As discussed above in connection with FIGS. 3A and 3B, marking device 120 shown in FIG. 4 may be any device for dispensing the marking material during an underground facility locate operation. Once the presence of the target facility has been located via the underground facility locate device 119, a marking device, such as marking device 120, is used for dispensing the marking material onto the surface of the ground at the location of the target facility.

Figure 10:
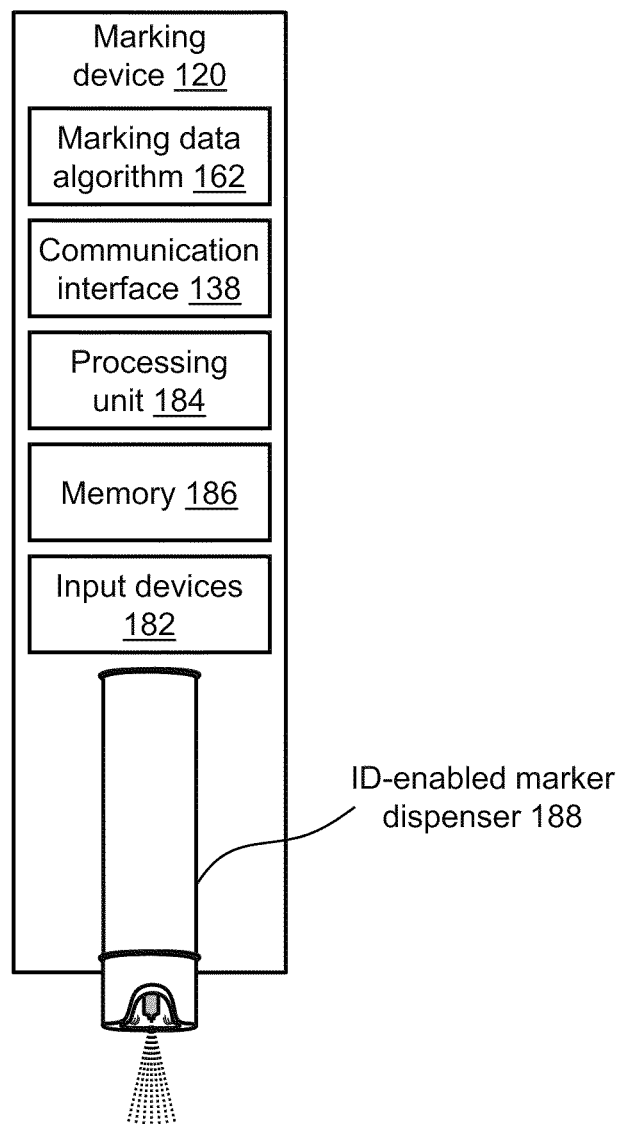
FIG. 10 illustrates a functional block diagram that shows additional details of a marking device of the facilities locate management system of FIG. 4, according to one embodiment of the present invention.

In one embodiment, the marking device 120 is an intelligent marking device, in that it may be a global positioning system (GPS)-enabled electronic marking device that includes certain mechanisms for sensing and logging the operations performed therewith during a locate operation. With reference to FIG. 10, marking device 120 may include a marking data algorithm 162 for processing the information received and/or generated by marking device 120. For example, marking data algorithm 162 may be used for analyzing locate operations based on actuations of marking device 120; for each actuation of marking device 120, such as for each actuation to dispense the marking material, certain information may be captured and logged that may be subsequently analyzed in order to render a recreation of the locate operation. The information that is captured with each actuation may include, but is not limited to, location information relating to where a physical locate mark was applied to the dig area (geo-location data), timestamp data, information about the making material, such as color, that may be correlated to the type of facility that is the target of the locate operation, and so on. Further, marking device 120 is able to communicate this information to other applications and instruments of facilities locate management system 100 via communications link 138.

Marking device 120 may be based, for example, on the marking device that is described in the following U.S. published patent applications: U.S. publication no. 2008-0228294-A1, published Sep. 18, 2008, filed Mar. 13, 2007, and entitled "Marking System and Method With Location and/or Time Tracking;" and U.S. publication no. 2008-0245299-A1, published Oct. 9, 2008, filed Apr. 4, 2007, and entitled "Marking System and Method." In an alternative embodiment, the separate marking and locate devices (e.g., locate device 119 and marking device 120) may be replaced with a combination locate and marking device, as noted above.

FIG. 10 illustrates a functional block diagram that shows additional details of marking device 120 that may be used in connection with one embodiment of the facilities locate management system shown in FIG. 4. As illustrated in FIG. 10, the marking device 120 includes a communication interface 138, memory 186 and a processing unit 184, as well as a marking data algorithm 162 (e.g., that may be stored in the memory and executed by the processing unit of the marking device).

Marking device 120 further includes one or more input devices 182, which may be any devices that are capable of returning useful information with respect to an underground facility location application. By way of example, input devices 182 may include, but are not limited to, a timing system (e.g., for generating a timestamp), a location tracking system (e.g., GPS technology), an underground probe (e.g., for capturing accurate facility location data by traversing the underground facility), survey apparatus, a temperature sensor, a humidity sensor, a light sensor, a compass, an inclinometer, an accelerometer, a digital camera, an audio recorder, an illumination source, and a marking material detection mechanism (e.g., radio-frequency identification (RFID) technology). Marking device 120 may also include control software (e.g., stored in the memory) for managing the overall operations of marking device 120. Additionally, the marking device may include any device-specific control software or electronics for managing input devices 182 and/or processing information from input devices 182.

FIG. 10 also shows an identification-enabled (ID-enabled) marker dispenser 188 that is installed in marking device 120, which is the source of the marking material that is dispensed by marking device 120. ID-enabled marker dispenser 188 may be an aerosol canister that contains a quantity of a commercially available marking material. In one example, the ID mechanism that is installed in or on ID-enabled marker dispenser 188 may be an RFID tag that includes, for example, a serial number and/or any other product information about the marking material. In this example, the marking material detection mechanism of input devices 182 may include an RFID reader for extracting information about the marking material that is being dispensed from marking device 120 that is encoded in the RFID tag. An example of this information may include, but is not limited to, a serial number and/or product code, as well as color information.

The information that is returned from input devices 182 of marking device 120 may be captured, for example, with each actuation of marking device 120, such as with, but not limited to, each actuation to dispense marking material from ID-enabled marker dispenser 188. The information that is returned from input devices 182, which is hereafter referred to as "marking information," may be processed and/or otherwise analyzed by use of marking data algorithm 162. In particular, marking data algorithm 162 may use the marking information from input devices 182 for analyzing locate operations based on actuations of marking device 120 and in order to render a recreation of the locate operation. In one exemplary implementation, the processing unit of the marking device, executing the marking data algorithm, may generate marking information relating to the geographic location of locate marks that are applied to the dig area via the marker dispenser 188, and this location information may be in turn conveyed to other entities of the management system (e.g., to the locate personnel device 122) via the communication interface 138 of the marking device 120 and the communication interface associated with the entity (e.g., the communication interface 140).

Additional details of an intelligent locate device are described in U.S. non-provisional application Ser. No. 12/703,958, filed Feb. 11, 2010, entitled "Marking Apparatus having Enhanced Features for Underground Facility Marking Operations, and Associated Methods and Systems," which application is hereby incorporated by reference herein.

C. Locate Personnel Devices

Locate personnel device 122 may be a computing device, such as portable computer, a personal computer, a tablet device, a PDA, a cellular radiotelephone, a mobile computing device, a touch-screen device, a touchpad device, or generally any device including, or connected to, a processor and a display. Preferably, locate personnel device 122 is a portable computing device, such as laptop computer, tablet device, smart phone, and the like.

As discussed above, an "Electronic Manifest" or "EM" application 164 that resides on locate personnel device 122 may be a drawing application, which, in underground facility locate operations, may be used by locate personnel 160 as a locate operation "digital" marking tool to create a searchable electronic record of a locate operation. More specifically, EM application 164 may be used by locate personnel 160 to add one or more electronic detection marks and/or electronic locate marks (generally referred to as "locate mark indicators") to a displayed input image of the dig area in order to graphically depict (digitally represent) on the displayed image one or more detected facilities and/or physical locate marks applied to the dig area during the locate operation. In exemplary implementations, locate personnel 160 may add such locate mark indicators to the displayed image via a user input device associate with a display device displaying the image (e.g., via a stylus, keyboard, touchpad, touch-screen, mouse, etc. associated with the locate personnel device 122). EM application 164 may superimpose over or otherwise display these locate mark indicators on any of a variety of input images (e.g., received from image server 112 or facilities maps server 114), including input images that have been previously marked-up with one or more dig area indicators as discussed above. The locate mark indicators may include lines, grids, drawing shapes, shades, points, symbols, coordinates, data sets, or other indicators to graphically depict the work performed in the locate operation (i.e., the detection of one or more underground facilities and/or the physical marking of the dig area to indicate a presence or an absence of one or more underground facilities).

Alternatively, EM application 164 may read in locate information and/or marking information about the locate operation from locate device 119 and/or marking device 120 (or a combined locate and marking device), which may then be rendered into a graphical (or other) depiction of the work performed in the locate operation. More specifically, information provided by locate device 119 and/or marking device 120 to the locate personnel device 122 (e.g., via communication link 140) may include geographic information relating to a location of one or more detected facilities, and/or the applied physical locate mark(s), which is processed by EM application 164 to provide on an input image one or more locate mark indicators to digitally represent the detection and/or physical locate mark(s). Such a graphical depiction of the locate operation may be superimposed over or otherwise displayed on the input image (which, as discussed above, may have been previously marked-up with one or more dig area indicators). Additional details of locate personnel device 122 and the components thereof are described with reference to FIGS. 11A, 11B, and 11C.

In some locate operations, no underground facilities are determined to be present in a designated dig area. Such locate operations are sometimes referred to as "clears." In some implementations of the inventive concepts discussed herein, the EM application 164 may nonetheless be employed to provide an electronic record of a "clear;" more specifically, although no locate mark indicators may be added to an input image (because there are no physical locate marks to digitally represent), the EM application may be employed to provide other information associated with the "clear" locate operation (e.g., a timestamp of when the locate operation was performed, an identifier for a technician or locate company performing the locate operation, a text address or other geographical identifier for the dig area, etc.) and this other information may be associated with the input image (e.g., as a separate data set linked to the input image, as metadata, a combined file of image and non-image data, etc.) to create a searchable electronic record that may be consulted to verify that the locate operation was indeed completed, even though no underground facilities were found.

Figure 11A:
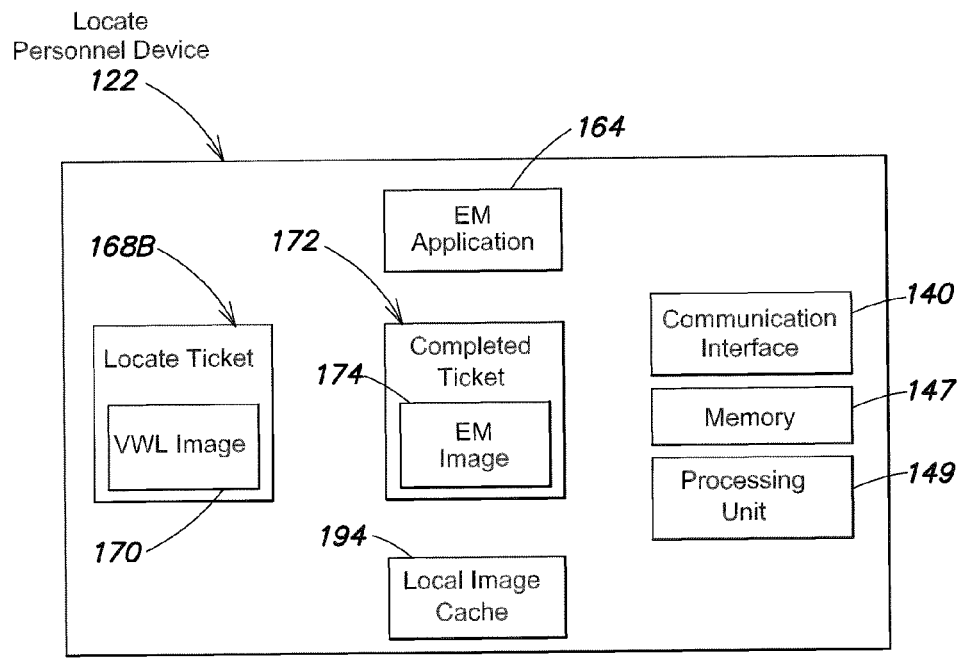
FIG. 11A illustrates a functional block diagram that shows additional details of a locate personnel device of the facilities locate management system of FIG. 4, according to one embodiment of the present invention.

FIG. 11A illustrates a functional block diagram that shows more details of locate personnel device 122 of the facilities locate management system of the present disclosure. FIG. 11A shows communication interface 140 and EM application 164, which may be stored in memory and executed by a processing unit of the locate personnel device 122. Locate personnel device 122 may be used by locate personnel 160 in order to receive a locate request ticket 168B that has an associated VWL image 170. The locate request ticket 168B may originate from one-call center 116 and may then be passed through central server 110 to a certain locate personnel device 122 of a certain locate personnel 160. The locate request ticket 168B may be exchanged via network 126.

Figure 11B:
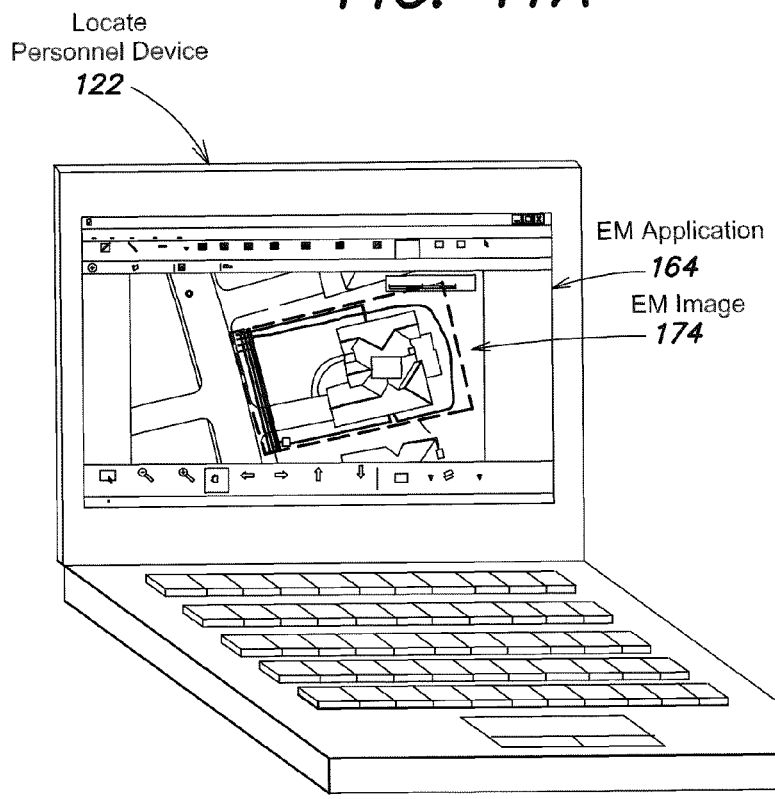
FIG. 11B illustrates an example of an electronic manifest (EM) application when in use on the locate personnel device of FIG. 11A, according to one embodiment of the present invention.

FIG. 11B illustrates an example of EM application 164 when in use on locate personnel device 122 by, for example, a certain locate personnel 160. In this example, locate personnel device 122 is a portable computer that has EM application 164 executing thereon. FIG. 11B shows a graphical user interface (GUI) of EM application 164 that may be presented to the user via the display of locate personnel device 122. More specifically, a certain VWL image 170 that corresponds to the current locate request ticket 168B is read into EM application 164 and displayed on locate personnel device 122. The locate personnel 160 may then use standard drawing tools (e.g., color pallet, lines, shapes, etc.) that are provided on the GUI of EM application 164 in order elec-tronically to sketch one or more lines, grids, shapes, shades, points, symbols, coordinates, or other indicators in order to generate a graphical (or other) representation of the locate operation. For example, one or more locate mark indicators may be added to the displayed VWL image, via a user input device associated with the locate personnel device 122, to digitally represent one or more physical locate marks that have been applied to the dig area based on the presence (or absence) of an underground facility. As discussed above, in some locate operations no underground facilities are detected; accordingly, in the case of such "clears," in some implementations the EM image 174 may not include any particular locate mark indicators.

In some implementations, as discussed above EM application 164 may read in locate information from locate device 119, and/or marking information from marking device 120 Subsequently, EM application 164 may superimpose over or otherwise display this information on VWL image 170.

In either case, an EM image 174 is formed that shows the original VWL image 170 and a representation of the locate operation marked thereon. Alternatively, in either case, the EM image 174 may be any input image represented by source data 150, rather than a VWL image 170, that has a representation of the locate operation marked thereon, or perhaps no locate mark indicators in the case of a "clear."

Figure 11C:
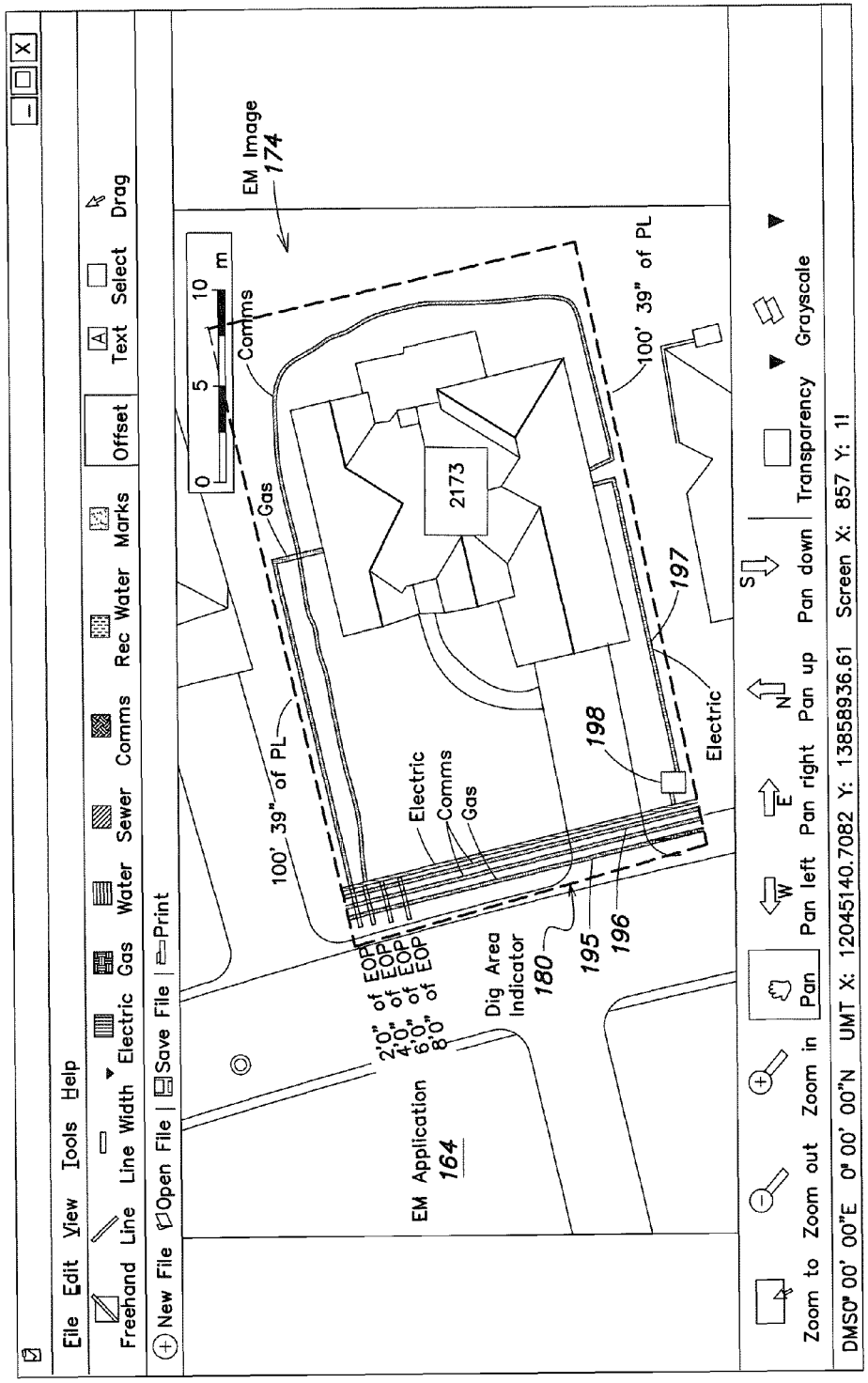
FIG. 11C illustrates exemplary details of an electronic manifest (EM) image generated by the electronic manifest application when in use on the device of FIG. 11A, showing a graphical representation of the locate operation according to one embodiment of the present invention.

FIG. 11C illustrates an example of an image that shows a graphical representation of the locate operation. For example, FIG. 11C shows EM application 164 and an example of an EM image 174 that is generated by use of EM application 164 on locate personnel device 122. In this example, EM image 174 shows various types of underground facilities and/or various environmental landmarks as multiple locate mark indicators that are superimposed on EM image 174. The differentiation between the different types of underground facilities and/or various environmental landmarks may be indicated by color, shape, size, line-type, symbol-type, etc, of the respective locate mark indicators. For example, FIG. 11C shows a first underground facility type locate mark indicator 195, a second underground facility type locate mark indicator 196, and a third underground facility type locate mark indicator 197 that are superimposed on EM image 174. Additionally, FIG. 11C shows an environmental landmark indicator 198 that is superimposed on EM image 174. FIG. 11C also illustrates a dig area indicator 180 to provide an indication of the dig area in which the locate operation is performed.

Referring again to FIG. 11A, having rendered an EM image 174 for the current locate request ticket 168B, a completed ticket 172 may be saved on locate personnel device 122. The EM image 174 is associated with and, therefore, attached to completed ticket 172, which may then be transmitted to central server 110 for processing in order to initiate, for example, a quality control operation, an audit or any other form of review by approvers 148 using network 126. A local image cache 194 on locate personnel device 122 may be used to store, for example, certain source data 150, certain VWL images 170, and/or certain EM images 174.

VII. Application Service Provider Models

It should also be appreciated that the various functionalities described herein in connection with inventive locate operation management techniques may be implemented as an application service provider (ASP) model. FIG. 12A shows various elements of such an ASP model 900, in which various entities 826 may access (e.g., via network 126, using one or more networked computers 822 and a web browser 824) application tools 910 and one or more information databases 920 operated and managed by an ASP, so as to perform various aspects of locate operation management. For example, any one or more of the VWL applications 156 and 158, the EM application 164, the ticket approval application 146, the workforce management application 145, as well as facilities maps 152, image source data 150, locate requests/tickets 168A/168B, completed tickets 172, approved completed tickets 192, and any of the constituent image data and non-image data described herein may be resident on one or more ASP servers 950 and available for access to a user/subscriber 826 of the ASP. In various implementations, an ASP may be any of the entities described herein most closely related to managing locate operations (e.g., excavators, one-call centers, locate companies), other entities with interests involving locate operations (e.g., utility companies, utility or other government regulators, insurance companies, etc.) or other entities.

In exemplary implementations of an ASP model 900, a user/subscriber 826 may access the application tools 910 and information database(s) 920 resident on ASP server(s) 950 (including at least one processing unit 952, at least one communication interface 954, and at least one memory 956) via a website using a log-in procedure 930 to facilitate secure access to the server(s) (e.g., via user name and password, etc.). Fees 932 may be associated with access to the ASP website (e.g., on a per use, multiple use, periodic use, or other basis). Users/subscribers 826 may maintain information profiles 934 on the ASP server(s) 950 to identify themselves and/or provide preferences for access to certain applications/information database(s). The ASP also may maintain information in connection with such user/subscriber profiles relating to any selective access permissions 936 or restrictions regarding the available applications/information database(s). A user/subscriber access procedure may include information entry by a user/subscriber to provide relevant information to initiate a locate request (e.g., an excavator providing relevant information to begin a request), and also may include a search engine 938, such that the user/subscriber 826 may find relevant information based on a host of indicia associated with a locate operation for which a locate request ticket already has been generated (address of dig area, ticket numbers, excavator and/or locate company identifiers, utility company identifiers, etc.).

From the foregoing, it should be readily appreciated that the various information compiled during the locate operation management process described herein, and particularly various stages of the locate request ticket and especially an approved completed locate request ticket, may be readily generated and made readily available as searchable electronic records to significantly improve the execution of locate operations and the integrity of such operations. More specifically, a database of searchable electronic records of locate operations facilitates auditing of such records by regulators, insurance companies, utility companies, and other parties to improve quality and efficiency of locate operations.

Figure 12B:
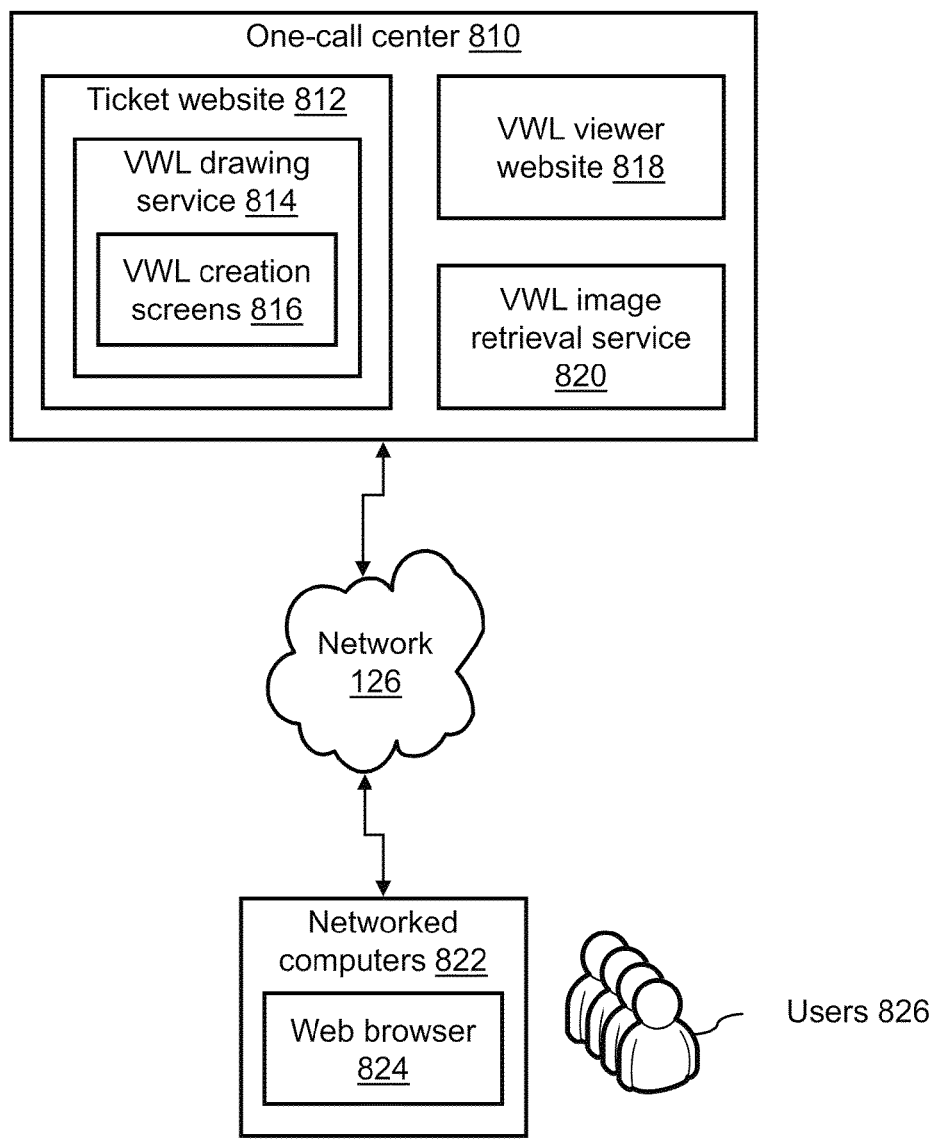

FIG. 12B illustrates an example of an application service provider (ASP) model for implementing various aspects of locate operation management system, apparatus and methods according to the present disclosure. In the example of FIG. 12B, a one-call center 810 serves as an ASP for providing a VWL application server system 800, which may be accessed via network 126 by users 826 (e.g., excavators) using a networked computer 822 and a web browser 824. The one-call center 810 serving as an ASP may operate/manage an ASP server which provides a ticket creation application 812, a VWL drawing service 814 and creation screens 816 (e.g., components of VWL applications 156 and 158), a VWL viewing application 818 and an image retrieval application 820. As noted above, users may access this ASP via a website and a login procedure, and generate, store and retrieve tickets including VWL images. While the example of FIG. 12B is provided in the particular context of one-call centers and VWL applications, as discussed above it should be appreciated that the ASP model may be extended to an entity providing one or more applications and or information storage capabilities germane to the management of locate operations.

VIII. Conclusion

With respect to providing improved visibility, quality control, audit capability and automation in underground facility locate operations and referring to FIGS. 4 through 12A and 12B, the use of the VWL application (e.g., VWL application 156 and 158) avoids the ambiguity of verbal descriptions of the planned geographic locations of the proposed dig areas. For example, verbal descriptions may ultimately be reduced to text, which can be very imprecise as to exact physical locations. By contrast, the VWL application provides an accurate mechanism for delimiting the proposed dig areas by providing an electronic sketch of the proposed dig areas via VWL images 170, which may be associated with and attached to the corresponding locate requests 168A. Additionally, the use of the VWL application provides a way to generate a substantially permanent indication of the dig area as compared with physical white lines that provide only a temporary indication of the dig area because physical white lines may deteriorate or be eliminated over time. Network 126 provides a convenient means for exchanging locate request tickets 168B and the associated VWL images 170 between excavator devices 118, onsite computer 124, one-call center 116, central server 110, and locate personnel devices 122.

With respect to providing improved visibility, quality control, audit capability and automation in underground facility locate operations and referring to FIGS. 4 through 12A and 12B, image server 112 and facilities maps server 114 provide back-end support to the process by supplying a store of source data 150 and facilities maps 152, respectively, that may be conveniently accessed by any application of facilities locate management system 100 via network 126.

With respect to providing improved visibility, quality control, audit capability and automation in underground facility locate operations and referring to FIGS. 4 through 12A and 12B, central server 110 provides a centralized system management function for facilities locate management system 100. In particular, central server 110 provides a centralized entity through which information may be exchanged and processed. Additionally, ticket approval application 146 of central server 110 provides a mechanism for collecting data associated with the field service tickets, such as completed tickets 172, and reviewing the data that is received for quality control or audit purposes in real time and/or non-real time by approvers 148.

With respect to providing improved visibility, quality control, audit capability and automation in underground facility locate operations and referring to FIGS. 4 through 12A and 12B, locate device 119 and marking device 120 provides intelligent locating equipment by which information about the locate operation may be processed in order to generate an electronic representation of the locate operation. Information collected via various intelligent locating equipment includes, but is not limited to, timestamp information, geo-location information, marking material information (e.g., color information that can be correlated to facility type), ambient temperature information, ambient humidity information, ambient light information, device heading information, angle of spray information, motion information, digital image information, and audio information. The electronic representation of the locate operation may indicate the geo-locations and types of facilities whose presence have been located via, for example, locate device 119 and then marked via marking device 120. Additionally, the electronic representation of the locate operation may indicate the geo-locations and types of environmental landmarks that are present at the locate site. As a result, the locate information provided by locate device 119, and/or the marking information provided by marking device 120, provides a mechanism for easily and automatically generating an accurate representation of the current locate operation that is available in electronic form that may be transmitted via network 126 to any application or instrument of facilities locate management system 100 and used for verification of the current locate operation.

In one example, with respect to providing improved visibility, quality control, audit capability and automation in underground facility locate operations and referring to FIGS. 4 through 12A and 12B, EM application 164 of locate personnel device 122 may read in the locate information from the locate device 119, and/or the marking information from the marking device 120. Subsequently, this information may be used to generate an EM image 174, which provides an accurate graphical representation of the locate operation. This EM image 174 of the current locate operation may then be transmitted along with its corresponding completed ticket 172 to ticket approval application 146 of central server 110. By use of ticket approval application 146, quality control and/or audit operations may occur for the current locate operation. For example, ticket approval application 146 allows one or more approvers 148 to view the information of completed tickets 172 and the associated EM images 174 and to assess the quality of the work performed in the field. This assessment may be accomplished by different approvers in real time and/or non-real time. When it is determined by one or more approvers 148 that the performance of a certain locate operation is satisfactory, the corresponding completed ticket 172 may be closed and no further action is required. However, when it is determined by one or more approvers 148 that the quality of a certain locate operation is not satisfactory, the corresponding completed ticket 172 may be referred for further quality control or other action, such as returning to the locate site in order to investigate, correct and/or verify a certain issue of the locate operation.

Additionally, a feature of ticket approval application 146 and/or a separate application of central server 110 may include the ability to assess locate operations with respect to historical records of facilities maps (e.g., facilities maps 152 of facilities maps server 114). In one example, the assessment of locate operations with respect to historical facilities maps may be performed.

Additionally, a feature of ticket approval application 146 and/or a separate application of central server 110 may include the ability to assess locate operations with respect to historical records of tickets (e.g., historical records of completed tickets 172 of central server 110). In one example, the assessment of locate operations with respect to historical tickets may be performed.

Additionally, a feature of ticket approval application 146 and/or a separate application of central server 110 may include the ability to assess locate operations with respect to historical records of environmental landmarks (not shown). In one example, the assessment of locate operations with respect to historical environmental landmarks may be performed.

Referring again to FIGS. 4 through 2A and 12B, an aspect of the facilities locate management system 100 of the present disclosure is that it provides searchable, secure, and unalterable electronic records including image data and/or non-image data (e.g., one or more images, geographic coordinates for various features of a dig area, including boundaries of the dig area and/or location of physical marks applied to the dig area, text descriptions of the dig area, time stamp, technician and locate company information, quality control and compliance information, etc.) as a record of work performed. These electronic records and images are inherently more accurate than current methods of recording activities that are associated with locate operations, such as textual descriptions. Additionally, a network is provided by which electronic records and images that are associated with an underground facility locate operation are easily accessed by entities thereof. As a result, improved quality control, automation, and operating efficiency in underground facility locate operations may be achieved.

Referring again to FIGS. 4 through 12A and 12B, another aspect of the facilities locate management system 100 of the present disclosure is that it provides a convenient archive of searchable, secure and unalterable electronic records and images that are associated with an underground facility locate operation. This convenient store of electronic records and images may be easily accessible, such as via network 126, by entities of facilities locate management system 100, such as by excavators, one-call centers, facility owners, federal, state or local regulators and underground facility locate service providers, in order to monitor and enforce quality control, audit performance of relevant customer-supplier agreements, audit compliance with applicable federal, state and local regulations, inform planning, improve operating efficiency, and so on. In one example, these electronic records and images may be accessible for a limited period of time, such as the legal amount of time that is allowed before a new locate operation is required. For example, in certain regions and/or municipalities, the legal allowable time before a new locate operation is required may be about 2 weeks. In another example, these electronic records and images may be stored on central server 110 or in data store 144 and made accessible via network 126 for any length of time. As also noted above, an ASP model may be useful for generating, maintaining and providing access to such electronic records.

Referring again to FIGS. 4 through 12A and 12B, yet another aspect of the facilities locate management system 100 of the present disclosure is that it may provide a way to "certify" each step of the underground facility locate process. For example, at the end of the process or during each stage of the process, a supervisor of an underground facility locate service provider and/or automated mechanisms of locate management system 100 may certify a locate operation, which may mean, for example, that substantially all quality standards have been met.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Any of the computing devices discussed herein (e.g., servers, computers, locate personnel devices, marking devices, locate devices, excavator devices, etc.) may include memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computing device to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for managing and evaluating a locate operation to identify, in response to at least one locate request ticket, a presence or an absence of at least one underground facility within a dig area at a work site of excavation activities, wherein at least a portion of the dig area is planned to be excavated or disturbed during the excavation activities, the apparatus comprising:
   at least one piece of locating equipment;
   a communication interface;
   a memory to store processor-executable instructions; and
   a processing unit communicatively coupled to the at least one piece of locating equipment, the communication interface, and the memory, wherein upon execution of the processor-executable instructions by the processing unit, the processing unit:
   A) controls the communication interface to receive first ticket information relating to the at least one locate request ticket and describing the locate operation to be performed by a field technician, the locate operation comprising:
      identifying the presence or the absence of the at least one underground facility within the dig area using at least one physical locate mark placed by the field technician on ground, pavement, or other surface within the dig area, wherein the first ticket information includes image information and/or geospatial metadata relating to the dig area and/or the work site at which the locate operation is to be performed by the field technician;
   B) controls at least one of the communication interface and the at least one piece of locating equipment to receive field information relating to the locate operation as at least partially performed by the field technician, and environmental information relating to the dig area and/or the work site at which the locate operation is at least partially performed by the field technician, wherein:
      1) the field information comprises:
         a) marking information relating to use of the at least one piece of locating equipment by the field technician to physically mark the dig area, the marking information including at least one of color and geo-location data corresponding to the at least one physical locate mark applied by the field technician to the ground, pavement, or other surface within the dig area to indicate the presence or the absence of the at least one underground facility during the at least partial performance of the locate operation; and
      2) the environmental information comprises:
         a) weather conditions including at least one of temperature, humidity, and light relating to the dig area and/or the work site at which the locate operation is at least partially performed and obtained via at least one sensor in the at least one piece of locating equipment operated by the field technician during the at least partial performance of the locate operation;
   C) automatically scores the field information and the environmental information based on a series of two or more predetermined thresholds to determine a quality assessment of the locate operation as at least partially performed by the field technician under the weather conditions; and D) automatically controls at least one of the memory to electronically store, and the communication interface to electronically transmit to at least one entity associated with the locate operation, at least some information relating to the quality assessment so as to facilitate at least one of tracking, auditing, and archiving an indication of at least one of a completeness, an accuracy, and an efficiency associated with the locate operation as at least partially performed by the field technician under the weather conditions.

2. The apparatus of claim 1, wherein in A), the first ticket information includes at least one of:
a marked-up image of a geographic area including the dig area, the marked-up image including at least one dig area indicator to provide an indication of the dig area; and
geographic information relating to the at least one dig area indicator.

3. The apparatus of claim 1, wherein after A), the processing unit:
A1) automatically processes the first ticket information so as to allocate available resources to the locate operation.

4. The apparatus of claim 3, wherein the first ticket information includes:
a marked-up image of a geographic area including the dig area, the marked-up image including at least one dig area indicator to provide an indication of the dig area; and
geographic information relating to the at least one dig area indicator to provide the indication of the dig area,
wherein in A1), the processing unit:
automatically assesses the first ticket information to determine, based on the indication of the dig area, one or more of a scope of work, a complexity, a performance time, a risk, a business value, and a technician skill or certification requirement associated with the locate operation so as to allocate available resources to the locate operation.

5. The apparatus of claim 1, wherein after A), the processing unit:
A1) automatically processes the first ticket information so as to schedule dispatch of at least one technician to perform the locate operation.

6. The apparatus of claim 5, wherein in A1), the processing unit:
automatically processes the first ticket information and scheduling information relating to one or more of multi-day performance windows, shift information relating to available technician resources, technician skill set and history, and job complexity so as to schedule the dispatch of the at least one technician.

7. The apparatus of claim 1, wherein after A), the processing unit:
A1) automatically controls the communication interface to transmit second ticket information to at least one first party associated with the locate operation, wherein the second ticket information is derived from the first ticket information.

8. The apparatus of claim 7, wherein in A1), the processing unit:
automatically the communication interface to transmit the second ticket information to at least one locate personnel device and/or at least one piece of locating equipment used by the field technician to at least partially perform the locate operation.

9. The apparatus of claim 7, wherein the second ticket information includes a process guide.

10. The apparatus of claim 9, wherein the process guide includes at least one of a work order, a checklist, and a workflow.

11. The apparatus of claim 1, wherein:
the locate operation further comprises detecting the presence or the absence of the at least one underground facility within the dig area via the at least one piece of locating equipment used by the field technician;
in B), the field information further comprises:
b) locate information relating to use of the at least one piece of locating equipment by the field technician to detect the presence or the absence of the at least one underground facility within the dig area during the locate operation and including at least one of gain and signal strength data corresponding to the detected presence or the detected absence of the at least one underground facility; and
in C), the processing unit automatically scores the marking information, the locate information, and the environmental information based on a series of three or more predetermined thresholds to determine the quality assessment of the locate operation as at least partially performed by the field technician.

12. The apparatus of claim 11, wherein the field information further comprises at least one of:
c) landmark information relating to at least one landmark present in or proximate to the dig area and/or the work site during the locate operation.

13. The apparatus of claim 12, wherein the at least one piece of locating equipment includes at least one of:
at least one intelligent locate device to provide at least some of the locate information and/or at least some of the landmark information; and
at least one intelligent combined locate and marking device to provide at least some of the marking information, at least some of the locate information, and/or at least some of the landmark information.

14. The apparatus of claim 12, wherein the at least one piece of locating equipment includes:
at least one intelligent marking device to provide at least some of the marking information and/or at least some of the landmark information.

15. The apparatus of claim 1, wherein in B), the field information includes at least one of:
a timestamp for the locate operation;
geographic information associated with the dig area; and
at least one identifier for a locate technician and/or a locate company.

16. The apparatus of claim 1, wherein in B), the field information includes at least one electronic manifest for the locate operation.

17. The apparatus of claim 16, wherein the electronic manifest includes at least one of the marking information, locate information, and landmark information.

18. The apparatus of claim 16, wherein the electronic manifest includes at least one digital image, and wherein the at least one digital image includes at least one dig area indicator.

19. The apparatus of claim 1, wherein after B), the processing unit:
automatically generates an electronic manifest for the locate operation based at least in part on the field information and/or the environmental information.

20. The apparatus of claim 19, wherein in C), the processing unit:
automatically scores the field information and the environmental information based on the series of two or more predetermined thresholds by automatically processing the electronic manifest to score the field information based on at least one of the series of two or more predetermined thresholds to determine the quality assessment of the locate operation as at least partially performed by the field technician under the weather conditions.

21. The apparatus of claim 1, wherein in B), the processing unit:
automatically controls the at least one of the communication interface and the at least one piece of locating equipment to receive the field information and/or the environmental information in essentially real-time during the at least partial performance of the locate operation.

22. The apparatus of claim 21, wherein in C), the processing unit:
automatically scores the field information and/or the environmental information based on the series of two or more predetermined thresholds in essentially real-time during the at least partial performance of the locate operation to determine the quality assessment.

23. The apparatus of claim 1, wherein in D), the processing unit further:
D1) encrypts the at least some information relating to the quality assessment of the locate operation so as to facilitate secure access to the at least some information relating to the quality assessment of the locate operation.

24. The apparatus of claim 1, wherein in D), the processing unit further:
D1) controls the at least one of the communication interface and the memory so as to allow access to the at least some information relating to the quality assessment only for a limited time period.

25. The apparatus of claim 1, wherein in D), the processing unit further:
D1) controls the at least one of the communication interface and the memory so as to allow access to the at least some information relating to the quality assessment via a log-in procedure so as to facilitate secure access to the at least some information relating to the quality assessment of the locate operation.

26. The apparatus of claim 1, wherein in D), the processing unit further:
D1) controls the at least one of the communication interface and the memory so as to allow access to the at least some information relating to the quality assessment for a fee.

27. The apparatus of claim 1, wherein in D), the processing unit further:
D1) controls the communication interface so as to receive one or more search indicia associated with the locate operation; and
D2) implements a search engine so as to provide access to and/or transmit, in response to D1), the at least some information relating to the quality assessment.

28. The apparatus of claim 1, wherein the processing unit further controls the communication interface so as to automatically communicate to at least one first party at least one notification indicating at least one of:
a status of the locate operation;
a disposition of the technician; and
the at least some information relating to the quality assessment of the locate operation.

29. The apparatus of claim 28, wherein the at least one first party includes at least one of:
a requesting party that requests the locate operation;
a regulator;
an auditor;
an insurer;
a damage investigator; and
an assessor.

30. The apparatus of claim 28, wherein:
the at least one notification is communicated to the at least one first party on behalf of at least one second party associated with the locate operation; and
the at least one notification includes reporting requirements for the at least one second party, the reporting requirements regarding at least one of:
activities of the at least one second party;
facilities under a jurisdiction of the at least one second party; and
geographic areas under the jurisdiction of the at least one second party.

31. The apparatus of claim 30, wherein the at least one second party includes at least one of:
an excavator;
a one-call center;
a locate service provider/contractor; and
a facility owner.

32. The apparatus of claim 31, wherein the at least one first party includes at least one of:
a requesting party that requests the locate operation;
a regulator;
an auditor;
an insurer;
a damage investigator; and
an assessor.

33. The apparatus of claim 28, wherein the processing unit further controls the communication interface so as to receive at least one acknowledgement of receipt of the at least one notification.

34. The apparatus of claim 1, wherein the environmental information further comprises:
b) traffic conditions relating to the dig area and/or the work site and/or access to the dig area and/or the work site at which the locate operation is at least partially performed.

35. A method for managing and evaluating a locate operation to identify, in response to at least one locate request ticket, a presence or an absence of at least one underground facility within a dig area at a work site of excavation activities, wherein at least a portion of the dig area is planned to be excavated or disturbed during the excavation activities, the method facilitated by an apparatus including at least one processor, at least one memory, at least one communication interface, and at least one piece of locating equipment, the method comprising:
A) electronically receiving, via the at least one communication interface, first ticket information relating to the at least one locate request ticket and describing the locate operation to be performed by a field technician, the locate operation comprising:
identifying the presence or the absence of the at least one underground facility within the dig area using at least one physical locate mark placed by the field technician on ground, pavement, or other surface within the dig area, wherein the first ticket information includes image information and/or geospatial metadata relating to the dig area and/or the work site at which the locate operation is to be performed by the field technician;
B) electronically receiving, via at least one of the at least one communication interface and the at least one piece of locating equipment, field information relating to the locate operation as at least partially performed by the field technician, and environmental information relating to the dig area and/or the work site at which the locate operation is at least partially performed by the field technician, wherein:
1) the field information comprises:
   a) marking information relating to use of the at least one piece of locating equipment by the field technician to physically mark the dig area, the marking information including at least one of color and geolocation data corresponding to the at least one physical locate mark applied by the field technician to the ground, pavement, or other surface within the dig area to indicate the presence or the absence of the at least one underground facility during the at least partial performance of the locate operation; and
2) the environmental information comprises:
   a) weather conditions including at least one of temperature, humidity, and light relating to the dig area and/or the work site at which the locate operation is at least partially performed and obtained via at least one sensor in the at least one piece of locating equipment operated by the field technician during the at least partial performance of the locate operation;
C) automatically scoring, via the at least one processor, the field information and the environmental information based on a series of two or more predetermined thresholds to determine a quality assessment of the locate operation as at least partially performed by the field technician under the weather conditions; and
D) automatically at least one of electronically storing in the at least one memory and electronically transmitting, via the at least one communication interface, to at least one entity associated with the locate operation at least some information relating to the quality assessment so as to facilitate at least one of tracking, auditing, and archiving an indication of at least one of a completeness, an accuracy, and an efficiency associated with the locate operation as at least partially performed by the field technician under the weather conditions.

36. The method of claim 35, wherein in A), the first ticket information includes at least one of:
a marked-up image of a geographic area including the dig area, the marked-up image including at least one dig area indicator to provide an indication of the dig area; and
geographic information derived from or relating to the marked-up image relating to the at least one dig area indicator.

37. The method of claim 35, wherein after A), the method comprises:
A1) automatically processing the first ticket information, via the at least one processor, so as to allocate available resources to the locate operation.

38. The method of claim 37, wherein the first ticket includes:
a marked-up image of a geographic area including the dig area, the marked-up image including at least one dig area indicator to provide an indication of the dig area; and
geographic information relating to the at least one dig area indicator to provide the indication of the dig area,
wherein A1) comprises:
   automatically assessing the first ticket information, via the at least one processor, to determine, based on the indication of the dig area, one or more of a scope of work, a complexity, a performance time, a risk, a business value, and a technician skill or certification requirement associated with the locate operation so as to allocate available resources to the locate operation.

39. The method of claim 35, wherein after A), the method comprises:
A1) automatically processing the first ticket information, via the at least one processor, so as to schedule dispatch of at least one technician to perform the locate operation.

40. The method of claim 39, wherein A1) comprises:
automatically processing the first ticket information and scheduling information relating to one or more of multi-day performance windows, shift information relating to available technician resources, technician skill set and history, and job complexity, via the at least one processor, so as to schedule the dispatch of the at least one technician.

41. The method of claim 35, wherein after A), the method comprises:
A1) electronically transmitting, by the at least one processor, second ticket information to at least one first party associated with the locate operation, wherein the second ticket information is automatically derived from the first ticket information.

42. The method of claim 41, wherein A1) comprises:
automatically transmitting the second ticket information to at least one locate personnel device and/or at least one piece of locating equipment used by the technician to perform the locate operation.

43. The method of claim 41, wherein in A1), the second ticket information includes a process guide.

44. The method of claim 43, wherein the process guide includes at least one of a work order, a checklist, and a workflow.

45. The method of claim 35, wherein:
the locate operation further comprises detecting the presence or the absence of the at least one underground facility within the dig area via the at least one piece of locating equipment by the field technician;
in B), the field information further comprises:
   b) locate information relating to use of the at least one piece of locating equipment by the field technician to detect the presence or the absence of the at least one underground facility within the dig area during the locate operation and including at least one of gain and signal strength data corresponding to the detected presence or the detected absence of the at least one underground facility; and
C) comprises automatically scoring, via the at least one processor, the marking information, the locate information, and the environmental information based on a series of three or more predetermined thresholds to determine the quality assessment of the locate operation as at least partially performed by the field technician under the weather conditions.

46. The method of claim 45, wherein the field information further comprises at least one of:
   c) landmark information relating to at least one landmark present in or proximate to the dig area and/or the work site during the locate operation.

47. The method of claim 46, wherein the at least one piece of locating equipment includes at least one of:
at least one intelligent locate device to provide at least some of the locate information and/or at least some of the landmark information; and
at least one intelligent combined locate and marking device to provide at least some of the marking information, at least some of the locate information, and/or at least some of the landmark information.

48. The method of claim 46, wherein the at least one piece of locating equipment includes at least one intelligent marking device to provide at least some of the marking information and/or at least some of the landmark information.

49. The method of claim 35, wherein in B), the field information includes at least one of:
- a timestamp for the locate operation;
- geographic information associated with the dig area; and
- at least one identifier for a locate technician and/or a locate company.

50. The method of claim 35, wherein in B), the field information includes at least one electronic manifest for the locate operation.

51. The method of claim 50, wherein the electronic manifest includes at least one of the marking information, locate information and landmark information.

52. The method of claim 50, wherein the electronic manifest includes at least one digital image, and wherein the at least one digital image includes at least one dig area indicator.

53. The method of claim 35, wherein after B), the method comprises:
- automatically generating an electronic manifest for the locate operation based at least in part on the field information and/or the environmental information.

54. The method of claim 53, wherein in C):
- automatically scoring the field information and the environmental information based on the series of two or more predetermined thresholds comprises automatically processing the electronic manifest to score the field information based on at least one of the series of two or more predetermined thresholds to determine the quality assessment of the locate operation as at least partially performed by the field technician under the weather conditions.

55. The method of claim 35, wherein B) comprises:
- automatically receiving the field information and/or the environmental information, via the at least one of the communication interface and the at least one piece of locating equipment, in essentially real-time during the at least partial performance of the locate operation.

56. The method of claim 55, wherein C) comprises:
- automatically scoring the field information and/or the environmental information based on the series of two or more predetermined thresholds, via the at least one processor, in essentially real-time during the at least partial performance of the locate operation to determine the quality assessment.

57. The method of claim 35, wherein D) comprises:
- D1) encrypting the at least some information relating to the quality assessment of the locate operation as at least partially performed by the field technician so as to facilitate secure access to the at least some information.

58. The method of claim 35, wherein D) comprises:
- D1) allowing electronic access to the at least some information relating to the quality assessment only for a limited time period.

59. The method of claim 35, wherein D) comprises:
- D1) allowing electronic access to the at least some information relating to the quality assessment via a log-in procedure so as to facilitate secure access to the at least some information.

60. The method of claim 35, wherein D) comprises:
- D1) allowing electronic access to the at least some information relating to the quality assessment for a fee.

61. The method of claim 35, wherein D) comprises:
- D1) electronically receiving, by the at least one processor, one or more search indicia associated with the locate operation; and
- D2) implementing a search engine so as to automatically provide electronic access to and/or transmit, by the at least one processor, in response to D1), the at least some information relating to the quality assessment.

62. The method of claim 35, further comprising:
- automatically communicating to at least one first party, by the at least one processor, at least one notification indicating at least one of:
  - a status of the locate operation;
  - a disposition of the technician; and
  - the at least some information relating to the quality assessment of the locate operation as at least partially performed by the field technician.

63. The method of claim 62, wherein the at least one first party includes at least one of:
- a requesting party that requests the locate operation;
- a regulator;
- an auditor;
- an insurer;
- a damage investigator; and
- an assessor.

64. The method of claim 63, wherein:
- the at least one notification is communicated to the at least one first party on behalf of at least one second party associated with the locate operation; and
- the at least one notification includes reporting requirements for the at least one second party, the reporting requirements regarding at least one of:
  - activities of the at least one second party;
  - facilities under a jurisdiction of the at least one second party; and
  - geographic areas under the jurisdiction of the at least one second party.

65. The method of claim 64, wherein the at least one second party includes at least one of:
- an excavator;
- a one-call center;
- a locate service provider/contractor; and
- a facility owner.

66. The method of claim 65, wherein the at least one first party includes at least one of:
- a requesting party that requests the locate operation;
- a regulator;
- an auditor;
- an insurer;
- a damage investigator; and
- an assessor.

67. The method of claim 62, further comprising:
- electronically receiving, by the at least one processor, at least one acknowledgement of receipt of the at least one notification.

68. The method of claim 35, wherein the environmental information further comprises:
- b) traffic conditions relating to the dig area and/or the work site and/or access to the dig area and/or the work site at which the locate operation is at least partially performed.

69. At least one computer-readable storage medium encoded with processor-executable instructions that, when executed on at least one processing unit communicatively coupled to at least one piece of locating equipment, at least one communication interface, and at least one memory, perform a method for managing and evaluating a locate operation to identify, in response to at least one locate request ticket, a presence or an absence of at least one underground facility within a dig area at a work site of excavation activities, wherein at least a portion of the dig area is planned to be excavated or disturbed during the excavation activities, the method comprising:

A) electronically receiving, via the at least one communication interface, first ticket information relating to the at least one locate request ticket and describing the locate operation to be performed by a field technician, the locate operation comprising:

identifying the presence or the absence of the at least one underground facility within the dig area using at least one physical locate mark placed by the field technician on ground, pavement, or other surface within the dig area, wherein the first ticket information includes image information and/or geospatial metadata relating to the dig area and/or the work site at which the locate operation is to be performed by the field technician;

B) electronically receiving, via at least one of the at least one communication interface and the at least one piece of locating equipment, field information relating to the locate operation as at least partially performed by the field technician and environmental information relating to the dig area and/or the work site at which the locate operation is at least partially performed by the field technician, wherein:

1) the field information comprises:

a) marking information relating to use of the at least one piece of locating equipment by the field technician to physically mark the dig area, the marking information including at least one of color and geo-location data corresponding to the at least one physical locate mark applied by the field technician to the ground, pavement, or other surface within the dig area to indicate the presence or the absence of the at least one underground facility during the at least partial performance of the locate operation; and 2) the environmental information comprises:

a) weather conditions including at least one of temperature, humidity, and light relating to the dig area and/or the work site at which the locate operation is at least partially performed and obtained via at least one sensor in the at least one piece of locating equipment operated by the field technician during the at least partial performance of the locate operation;

C) automatically scoring, by the at least one processing unit, the field information and the environmental information based on a series of two or more predetermined thresholds to determine a quality assessment of the locate operation as at least partially performed by the field technician under the weather conditions; and D) automatically at least one of electronically storing in the at least one memory and electronically transmitting via the at least one communication interface to at least one entity associated with the locate operation at least some information relating to the quality assessment so as to facilitate at least one of tracking, auditing, and archiving an indication of at least one of a completeness, an accuracy, and an efficiency associated with the locate operation as at least partially performed by the field technician under the weather conditions.

70. The computer-readable storage medium of claim 69, wherein:

the locate operation further comprises detecting the presence or the absence of the at least one underground facility within the dig area via the at least one piece of locating equipment by the field technician;

in B), the field information further comprises:

b) locate information relating to use of the at least one piece of locating equipment by the field technician to detect the presence or the absence of the at least one underground facility within the dig area during the locate operation and including at least one of gain and signal strength data corresponding to the detected presence or the detected absence of the at least one underground facility; and C) comprises automatically scoring the marking information, the locate information, and the environmental information based on a series of three or more predetermined thresholds to determine the quality assessment of the locate operation as at least partially performed by the field technician under the weather conditions.

71. The computer-readable storage medium of claim 70, wherein the field information further comprises at least one of:

c) landmark information relating to at least one landmark present in or proximate to the dig area and/or the work site during the locate operation.

72. The computer-readable storage medium of claim 71, wherein the at least one piece of locating equipment includes at least one of:

at least one intelligent locate device to provide at least some of the locate information and/or at least some of the landmark information; and at least one intelligent combined locate and marking device to provide at least some of the marking information, at least some of the locate information, and/or at least some of the landmark information.

73. The computer-readable storage medium of claim 69, wherein the environmental information further comprises:

b) traffic conditions relating to the dig area and/or the work site and/or access to the dig area and/or the work site at which the locate operation is at least partially performed.

* * * * *